United States Patent
Ohkubo et al.

(10) Patent No.: US 11,525,076 B2
(45) Date of Patent: Dec. 13, 2022

(54) COMPOSITION CONTAINING REFRIGERANT, AND REFRIGERATION METHOD USING SAID COMPOSITION, OPERATING METHOD FOR REFRIGERATION DEVICE, AND REFRIGERATION DEVICE

(71) Applicant: DAIKIN INDUSTRIES, LTD., Osaka (JP)

(72) Inventors: Shun Ohkubo, Osaka (JP); Mitsushi Itano, Osaka (JP); Yuuki Yotsumoto, Osaka (JP); Akihito Mizuno, Osaka (JP); Tomoyuki Gotou, Osaka (JP); Yasufu Yamada, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/993,582

(22) Filed: Aug. 14, 2020

(65) Prior Publication Data
US 2020/0377777 A1 Dec. 3, 2020

Related U.S. Application Data

(63) Continuation of application No. PCT/JP2019/050501, filed on Dec. 24, 2019.

(30) Foreign Application Priority Data

Jan. 30, 2019 (JP) .............................. JP2019-013979
Jun. 21, 2019 (JP) .............................. JP2019-115584

(51) Int. Cl.
*C09K 5/04* (2006.01)
*B60H 1/32* (2006.01)

(52) U.S. Cl.
CPC ................ *C09K 5/045* (2013.01); *B60H 1/32* (2013.01); *C09K 2205/122* (2013.01); *C09K 2205/22* (2013.01); *C09K 2205/40* (2013.01)

(58) Field of Classification Search
CPC .............. C09K 5/045; C09K 2205/122; C09K 2205/22; C09K 2205/40; B60H 1/32
See application file for complete search history.

(56) References Cited

U.S. PATENT DOCUMENTS

| 8,168,077 B2 | 5/2012 | Spatz |
| 8,961,811 B2 | 2/2015 | Minor et al. |

(Continued)

FOREIGN PATENT DOCUMENTS

| CA | 3 015 523 | 9/2017 |
| CN | 102245731 | 11/2011 |

(Continued)

OTHER PUBLICATIONS

Extended European Search Report dated Apr. 21, 2021 in corresponding European Patent Application No. 19912660.8.

(Continued)

*Primary Examiner* — Andrew J. Oyer
(74) *Attorney, Agent, or Firm* — Wenderoth, Lind & Ponack, L.L.P.

(57) ABSTRACT

The present disclosure provides a composition comprising a refrigerant characterized by having a coefficient of performance (COP) and a refrigerating capacity equivalent to or higher than those of R404A, and having a sufficiently low GWP. Specifically, the present disclosure provides a composition comprising a refrigerant, the refrigerant comprising trans-1,2-difluoroethylene (HFO-1132 (E)) and 2,3,3,3-tetrafluoropropene (HFO-1234yf), wherein HFO-1132 (E) is present in an amount of 35.0 to 65.0 mass %, and HFO-1234yf is present in an amount of 65.0 to 35.0 mass %, based (Continued)

on the total mass of HFO-1132 (E) and HFO-1234yf, and wherein the refrigerant is for use in operating a refrigeration cycle in which the evaporation temperature is −75 to −5° C.

5 Claims, 1 Drawing Sheet

(56) References Cited

U.S. PATENT DOCUMENTS

| | | | |
|---|---|---|---|
| 10,131,827 | B2 | 11/2018 | Fukushima et al. |
| 2010/0122545 | A1 | 5/2010 | Minor et al. |
| 2011/0252801 | A1 | 10/2011 | Minor et al. |
| 2011/0253927 | A1* | 10/2011 | Minor ................ B01F 17/0085 252/68 |
| 2011/0258146 | A1 | 10/2011 | Low |
| 2013/0193368 | A1* | 8/2013 | Low ....................... C09K 5/045 252/68 |
| 2015/0051426 | A1 | 2/2015 | Fukushima et al. |
| 2015/0322232 | A1 | 11/2015 | Hong et al. |
| 2015/0322321 | A1* | 11/2015 | Deur-Bert ............. C09K 5/045 252/67 |
| 2015/0376486 | A1 | 12/2015 | Hashimoto et al. |
| 2016/0002518 | A1 | 1/2016 | Taniguchi et al. |
| 2016/0075927 | A1 | 3/2016 | Fukushima |
| 2016/0333243 | A1* | 11/2016 | Fukushima ............ C09K 5/045 |
| 2016/0333244 | A1 | 11/2016 | Fukushima |
| 2016/0340565 | A1 | 11/2016 | Tasaka et al. |
| 2016/0347980 | A1 | 12/2016 | Okamoto |
| 2017/0002245 | A1 | 1/2017 | Fukushima |
| 2017/0058171 | A1 | 3/2017 | Fukushima et al. |
| 2017/0058172 | A1 | 3/2017 | Fukushima et al. |
| 2017/0058173 | A1* | 3/2017 | Fukushima ................ F25B 1/00 |
| 2017/0058174 | A1 | 3/2017 | Fukushima et al. |
| 2017/0146284 | A1 | 5/2017 | Matsunaga et al. |
| 2017/0218241 | A1 | 8/2017 | Deur-Bert et al. |
| 2018/0051198 | A1 | 2/2018 | Okamoto et al. |
| 2018/0057724 | A1 | 3/2018 | Fukushima |
| 2018/0079941 | A1 | 3/2018 | Ueno et al. |
| 2018/0320942 | A1 | 11/2018 | Hayamizu et al. |
| 2020/0041174 | A1 | 2/2020 | Wakabayashi et al. |
| 2020/0048520 | A1 | 2/2020 | Fukushima |
| 2020/0079986 | A1 | 3/2020 | Fukushima |
| 2020/0385622 | A1 | 12/2020 | Itano et al. |
| 2021/0198549 | A1 | 7/2021 | Fukushima |
| 2022/0089928 | A1 | 3/2022 | Fukushima |

FOREIGN PATENT DOCUMENTS

| | | |
|---|---|---|
| CN | 104837951 | 8/2015 |
| CN | 105164227 | 12/2015 |
| CN | 10545417 | 3/2016 |
| CN | 106029821 | 10/2016 |
| CN | 106029823 | 10/2016 |
| CN | 106133110 | 11/2016 |
| CN | 106414654 | 2/2017 |
| CN | 106414682 | 2/2017 |
| CN | 107614651 | 1/2018 |
| CN | 107614652 | 1/2018 |
| CN | 108699428 | 10/2018 |
| CN | 111032817 | 4/2020 |
| CN | 111479894 | 7/2020 |
| EP | 0 811 670 | 12/1997 |
| EP | 3 012 556 | 4/2016 |
| EP | 3 109 292 | 12/2016 |
| EP | 3 101082 | 12/2016 |
| EP | 3 121 242 | 1/2017 |
| EP | 3 153 559 | 4/2017 |
| EP | 3 153 567 | 4/2017 |
| EP | 3 305 869 | 4/2018 |
| EP | 3 423 541 | 1/2019 |
| EP | 3 666 848 | 6/2020 |
| EP | 3 739 018 | 11/2020 |
| EP | 3 825 382 | 5/2021 |
| FR | 3 000 095 | 6/2014 |
| GB | 2530915 | 4/2016 |
| GB | 2566809 | 3/2019 |
| JP | 9-324175 | 12/1997 |
| JP | 2012-510550 | 5/2012 |
| JP | 2013-529703 | 7/2013 |
| JP | WO2014/203353 | 12/2014 |
| JP | 5689068 | 3/2015 |
| JP | WO2015/136977 | 9/2015 |
| JP | 2015-214927 | 12/2015 |
| JP | 2015-229767 | 12/2015 |
| JP | WO2015/186558 | 12/2015 |
| JP | 2016-11423 | 1/2016 |
| JP | 2016-501978 | 1/2016 |
| JP | 2016-028119 | 2/2016 |
| JP | 6105511 | 3/2017 |
| JP | 2017-145380 | 8/2017 |
| JP | 2018-104565 | 7/2018 |
| JP | 2018-104566 | 7/2018 |
| JP | 2018-177966 | 11/2018 |
| JP | 2018-177967 | 11/2018 |
| JP | 2018-177968 | 11/2018 |
| JP | 2018-177969 | 11/2018 |
| JP | 2018-179404 | 11/2018 |
| JP | 2018-184597 | 11/2018 |
| JP | 2019-34972 | 3/2019 |
| JP | 2019-034983 | 3/2019 |
| JP | 2019-512031 | 5/2019 |
| JP | 2019-207054 | 12/2019 |
| KR | 10-2011-0099253 | 9/2011 |
| KR | 10-2015-0099530 | 8/2015 |
| KR | 10-2018-0118174 | 10/2018 |
| MX | 2018010417 | 11/2018 |
| WO | 2005/105947 | 11/2005 |
| WO | 2010/059677 | 5/2010 |
| WO | 2010/064011 | 6/2010 |
| WO | 2011/163117 | 12/2011 |
| WO | 2014/085973 | 6/2014 |
| WO | 2014/102477 | 7/2014 |
| WO | 2014/178352 | 11/2014 |
| WO | 2014/203356 | 12/2014 |
| WO | 2015/115252 | 8/2015 |
| WO | 2015/125874 | 8/2015 |
| WO | 2015/125885 | 8/2015 |
| WO | 2015/141678 | 9/2015 |
| WO | 2013/186557 | 12/2015 |
| WO | 2015/186557 | 12/2015 |
| WO | 2015/186670 | 12/2015 |
| WO | 2015/186671 | 12/2015 |
| WO | 2016/075541 | 5/2016 |
| WO | 2016/182030 | 11/2016 |
| WO | 2016/190177 | 12/2016 |
| WO | 2016/194847 | 12/2016 |
| WO | 2017/122517 | 7/2017 |
| WO | 2018/193974 | 10/2018 |
| WO | 2019/030508 | 2/2019 |
| WO | 2019/1243 96 | 6/2019 |
| WO | 2019/123782 | 6/2019 |
| WO | 2019/124398 | 6/2019 |
| WO | 2019/124399 | 6/2019 |
| WO | 2019/172008 | 9/2019 |
| WO | 2020/017520 | 1/2020 |
| WO | 2020/017521 | 1/2020 |
| WO | 2020/017522 | 1/2020 |
| WO | 2020/071380 | 4/2020 |
| WO | 2020/256129 | 12/2020 |
| WO | 2020/256131 | 12/2020 |
| WO | 2020/256134 | 12/2020 |

OTHER PUBLICATIONS

Takahashi et al., "Consuuction of Comprehensive Reaction Model for Predicting Tetrafluoroethylene Explosion by High-Pressure Shock Tube", (https://kaken.nii.ac.jp/), Research Result Report of Grants-in-Aid for Scientific Research, 2018, 4 pages.

Otsuka et al., "Development of control method of HFO-1123 disproportionation and investigation of probability of HFO-1123 disproportionation", AGC Research Report, 2018, No. 68, pp. 29-33.

(56) References Cited

OTHER PUBLICATIONS

International Preliminary Report on Patentability dated Jan. 19, 2021 in International (PCT) Application No. PCT/JP2019/027989.
International Search Report dated Sep. 10, 2019 in International (PCT) Application No. PCT/JP2019/027989.
International Preliminary Report on Patentability dated Jan. 19, 2021 in International (PCT) Application No. PCT/JP2019/027988.
International Search Report dated Sep. 10, 2019 in International (PCT) Application No. PCT/JP2019/027988.
International Preliminary Report on Patentability dated Jan. 19, 2021 in International (PCT) Application No. PCT/JP2019/027990.
International Search Report dated Oct. 21, 2019 in International (PCT) Application No. PCT/JP2019/027990.
International Preliminary Report on Patentability dated Jul. 27, 2021 in International (PCT) Application No. PCT/JP2020/002974.
International Search Report dated Apr. 14, 2020 in International (PCT) Application No. PCT/JP2020/002974.
International Search Report dated Sep. 3, 2019 in International (PCT) Application No. PCT/JP2019/027031.
International Search Report dated Jan. 28, 2020 in International (PCT) Application No. PCT/JP2019/047097.
International Search Report dated Mar. 31, 2020 in International (PCT) Application No. PCT/JP2020/003943.
International Search Report dated Mar. 31, 2020 in International (PCT) Application No. PCT/JP2020/003990.
International Search Report dated Jul. 21, 2020 in International (PCT) Application No. PCT/JP2020/016787.
International Search Report dated Jul. 28, 2020 in International (PCT) Application No. PCT/JP2020/17777.
Fei Qian, Editor, Marine Auxiliary Engine, 3rd Ed., p. 224-225, Dalian Maritime University Press, Feb. 2008, with English translation.
International Search Report dated Mar. 31, 2020 in International (PCT) Application No. PCT/JP2019/050501.

* cited by examiner

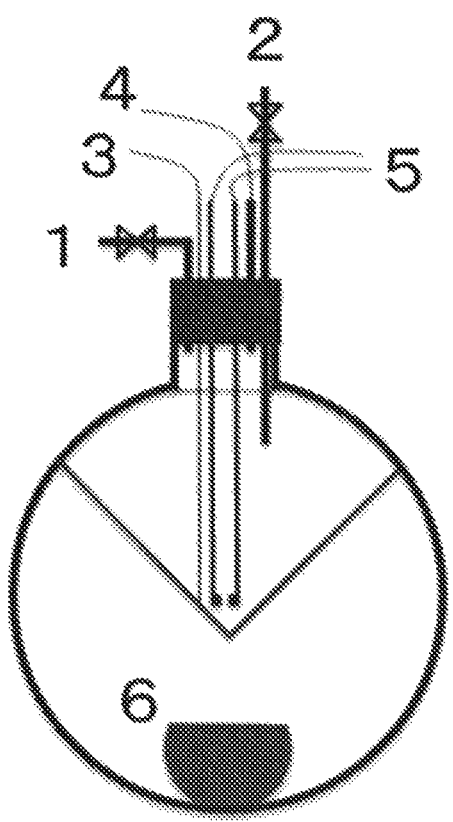

US 11,525,076 B2

COMPOSITION CONTAINING REFRIGERANT, AND REFRIGERATION METHOD USING SAID COMPOSITION, OPERATING METHOD FOR REFRIGERATION DEVICE, AND REFRIGERATION DEVICE

TECHNICAL FIELD

The present disclosure relates to a composition comprising a refrigerant and a refrigeration method, a method for operating a refrigeration apparatus, and a refrigeration apparatus, all of which use the composition.

BACKGROUND ART

Amid worldwide discussion about global warming as a highly serious issue, the development of environmentally friendly air conditioners, refrigeration apparatus, etc. has become increasingly important.

Various mixed refrigerants that have a low global warming potential (GWP) and that can replace R404A, which is used as a refrigerant for air conditioners, such as home air conditioners, have currently been proposed. For example, Patent Literature (PTL) 1 and PTL 2 disclose, as an alternative refrigerant for R404A, a refrigerant composition comprising difluoromethane (R32), pentafluoroethane (R125), 2,3,3,3-tetrafluoropropene (R1234yf), and 1,1,1,2-tetrafluoroethane (R134a).

Additionally, various mixed refrigerants that have a low GWP and that can replace 1,1,1,2-tetrafluoroethane (HFC-134a or R134a), which is used as a refrigerant for air conditioners, such as home air conditioners, have been proposed (e.g., PTL 3).

CITATION LIST

Patent Literature

PTL 1: WO 2010/059677
PTL 2: WO 2011/163117
PTL 3: WO 2005/105947

SUMMARY OF INVENTION

Technical Problem

An object of the present disclosure is to provide a composition comprising a refrigerant characterized by having a coefficient of performance (COP) and a refrigerating capacity (which may be expressed as "cooling capacity" or "capacity") equivalent to or higher than those of R404A, and having a sufficiently low GWP. Another object of the present disclosure is to provide a composition comprising a refrigerant characterized by having a coefficient of performance (COP) and a refrigerating capacity (which may be expressed as "cooling capacity" or "capacity") equivalent to or higher than those of R134a, and having a sufficiently low GWP. Still another object of the present disclosure is to provide a refrigeration method, a method for operating a refrigeration apparatus, and a refrigeration apparatus, all of which use the above composition.

Solution to Problem

The present disclosure provides the invention according to the following embodiments.

Item 1.
A composition comprising a refrigerant,
the refrigerant comprising trans-1,2-difluoroethylene (HFO-1132 (E)) and 2,3,3,3-tetrafluoropropene (HFO-1234yf),
wherein HFO-1132 (E) is present in an amount of 35.0 to 65.0 mass %, and HFO-1234yf is present in an amount of 65.0 to 35.0 mass %, based on the total mass of HFO-1132 (E) and HFO-1234yf, and
wherein the refrigerant is for use in operating a refrigeration cycle in which the evaporation temperature is −75 to −5° C.

Item 2.
The composition according to Item 1, wherein HFO-1132 (E) is present in an amount of 41.3 to 53.5 mass %, and HFO-1234yf is present in an amount of 58.7 to 46.5 mass %, based on the total mass of HFO-1132 (E) and HFO-1234yf.

Item 3.
The composition according to Item 1 or 2, wherein the refrigerant consists of HFO-1132 (E) and HFO-1234yf.

Item 4.
A composition comprising a refrigerant,
the refrigerant comprising trans-1,2-difluoroethylene (HFO-1132 (E)) and 2,3,3,3-tetrafluoropropene (HFO-1234yf),
wherein HFO-1132 (E) is present in an amount of 40.5 to 49.2 mass %, and HFO-1234yf is present in an amount of 59.5 to 50.8 mass %, based on the total mass of HFO-1132 (E) and HFO-1234yf.

Item 5.
The composition according to Item 4, wherein the refrigerant consists of HFO-1132 (E) and HFO-1234yf.

Item 6.
The composition according to Item 4 or 5, wherein the refrigerant is for use in operating a refrigeration cycle in which the evaporation temperature is −75 to 15° C.

Item 7.
The composition according to any one of Items 1 to 6, which is for use as an alternative refrigerant for R12, R22, R134a, R404A, R407A, R407C, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R465A, R502, R507, or R513A.

Item 8.
A composition comprising a refrigerant,
the refrigerant comprising trans-1,2-difluoroethylene (HFO-1132 (E)) and 2,3,3,3-tetrafluoropropene (HFO-1234yf),
wherein HFO-1132 (E) is present in an amount of 31.1 to 39.8 mass %, and HFO-1234yf is present in an amount of 68.9 to 60.2 mass %, based on the total mass of HFO-1132 (E) and HFO-1234yf.

Item 9.
The composition according to Item 8, wherein HFO-1132 (E) is present in an amount of 31.1 to 37.9 mass %, and HFO-1234yf is present in an amount of 68.9 to 62.1 mass %, based on the total mass of HFO-1132 (E) and HFO-1234yf.

Item 10.
The composition according to Item 8 or 9, wherein the refrigerant consists of HFO-1132 (E) and HFO-1234yf.

Item 11.
The composition according to any one of Items 8 to 10, wherein the refrigerant is for use in operating a refrigeration cycle in which the evaporation temperature is −75 to 15° C.

Item 12.

The composition according to any one of Items 8 to 11, which is for use as an alternative refrigerant for R134a, R1234yf, or $CO_2$ (R744).

Item 13.

A composition comprising a refrigerant, the refrigerant comprising trans-1,2-difluoroethylene (HFO-1132 (E)) and 2,3,3,3-tetrafluoropropene (HFO-1234yf), wherein HFO-1132 (E) is present in an amount of 21.0 to 28.4 mass %, and HFO-1234yf is present in an amount of 79.0 to 71.6 mass %, based on the total mass of HFO-1132 (E) and HFO-1234yf.

Item 14.

The composition according to Item 13, wherein the refrigerant consists of HFO-1132 (E) and HFO-1234yf.

Item 15.

The composition according to Item 13 or 14, which is for use as an alternative refrigerant for R12, R22, R134a, R404A, R407A, R407C, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R465A, R502, R507, R513A, R1234yf, or R1234ze.

Item 16.

A composition comprising a refrigerant, the refrigerant comprising trans-1,2-difluoroethylene (HFO-1132 (E)) and 2,3,3,3-tetrafluoropropene (HFO-1234yf), wherein HFO-1132 (E) is present in an amount of 12.1 to 72.0 mass %, and HFO-1234yf is present in an amount of 87.9 to 28.0 mass %, based on the total mass of HFO-1132 (E) and HFO-1234yf, and wherein the refrigerant is for use in an air-conditioning system for vehicles.

Item 17.

The composition according to Item 16, wherein the air-conditioning system is for gasoline vehicles, hybrid vehicles, electric vehicles, or hydrogen vehicles.

Item 18.

The composition according to Item 16 or 17, wherein the refrigerant consists of HFO-1132 (E) and HFO-1234yf.

Item 19.

The composition according to any one of Items 16 to 18, which is for use as an alternative refrigerant for R12, R134a, or R1234yf.

Item 20.

The composition according to any one of Items 1 to 19, comprising at least one substance selected from the group consisting of water, tracers, ultraviolet fluorescent dyes, stabilizers, and polymerization inhibitors.

Item 21.

The composition according to any one of Items 1 to 20, the composition further comprising a refrigerant oil and being for use as a working fluid for a refrigeration apparatus.

Item 22.

The composition according to Item 21, wherein the refrigerant oil contains at least one polymer selected from the group consisting of polyalkylene glycol (PAG), polyol ester (POE), and polyvinyl ether (PVE).

Item 23.

A refrigeration method comprising operating a refrigeration cycle using the composition of any one of Items 1 to 22.

Item 24.

A refrigeration method comprising operating a refrigeration cycle in which the evaporation temperature is −75 to −5° C., using a composition comprising a refrigerant, the refrigerant comprising trans-1,2-difluoroethylene (HFO-1132 (E)) and 2,3,3,3-tetrafluoropropene (HFO-1234yf), wherein HFO-1132 (E) is present in an amount of 35.0 to 65.0 mass %, and HFO-1234yf is present in an amount of 65.0 to 35.0 mass %, based on the total mass of HFO-1132 (E) and HFO-1234yf.

Item 25.

The refrigeration method according to Item 24, wherein HFO-1132 (E) is present in an amount of 41.3 to 53.5 mass %, and HFO-1234yf is present in an amount of 58.7 to 46.5 mass %, based on the total mass of HFO-1132 (E) and HFO-1234yf.

Item 26.

The refrigeration method according to Item 24 or 25, wherein the refrigerant consists of HFO-1132 (E) and HFO-1234yf.

Item 27.

A refrigeration method comprising operating a refrigeration cycle using a composition comprising a refrigerant, the refrigerant comprising trans-1,2-difluoroethylene (HFO-1132 (E)) and 2,3,3,3-tetrafluoropropene (HFO-1234yf), wherein HFO-1132 (E) is present in an amount of 40.5 to 49.2 mass %, and HFO-1234yf is present in an amount of 59.5 to 50.8 mass %, based on the total mass of HFO-1132 (E) and HFO-1234yf.

Item 28.

The refrigeration method according to Item 27, wherein the refrigerant consists of HFO-1132 (E) and HFO-1234yf.

Item 29.

The refrigeration method according to Item 27 or 28, wherein the refrigerant has an evaporation temperature of −75 to 15° C. in the refrigeration cycle.

Item 30.

A refrigeration method comprising operating a refrigeration cycle using a composition comprising a refrigerant, the refrigerant comprising trans-1,2-difluoroethylene (HFO-1132 (E)) and 2,3,3,3-tetrafluoropropene (HFO-1234yf), wherein HFO-1132 (E) is present in an amount of 31.1 to 39.8 mass %, and HFO-1234yf is present in an amount of 68.9 to 60.2 mass %, based on the total mass of HFO-1132 (E) and HFO-1234yf.

Item 31.

The refrigeration method according to Item 30, wherein HFO-1132 (E) is present in an amount of 31.1 to 37.9 mass %, and HFO-1234yf is present in an amount of 68.9 to 62.1 mass %, based on the total mass of HFO-1132 (E) and HFO-1234yf.

Item 32.

The refrigeration method according to Item 30 or 31, wherein the refrigerant consists of HFO-1132 (E) and HFO-1234yf.

Item 33.

The refrigeration method according to any one of Items 30 to 32, wherein the refrigerant has an evaporation temperature of −75 to 15° C. in the refrigeration cycle.

Item 34.

A refrigeration method comprising operating a refrigeration cycle using a composition comprising a refrigerant, the refrigerant comprising trans-1,2-difluoroethylene (HFO-1132 (E)) and 2,3,3,3-tetrafluoropropene (HFO-1234yf), wherein HFO-1132 (E) is present in an amount of 21.0 to 28.4 mass %, and HFO-1234yf is present in an amount of 79.0 to 71.6 mass %, based on the total mass of HFO-1132 (E) and HFO-1234yf.

Item 35.

The refrigeration method according to Item 34, wherein the refrigerant consists of HFO-1132 (E) and HFO-1234yf.

Item 36.

A refrigeration method comprising operating a refrigeration cycle using a composition comprising a refrigerant, the refrigerant comprising trans-1,2-difluoroethylene (HFO-1132 (E)) and 2,3,3,3-tetrafluoropropene (HFO-1234yf), wherein HFO-1132 (E) is present in an amount of 12.1 to 72.0 mass %, and HFO-1234yf is present in an amount of 87.9 to 28.0 mass %, based on the total mass of HFO-1132 (E) and HFO-1234yf, and wherein the refrigerant is for use in an air-conditioning system for vehicles.

Item 37.

The refrigeration method according to Item 36, wherein the air-conditioning system is for gasoline vehicles, hybrid vehicles, electric vehicles, or hydrogen vehicles.

Item 38.

The refrigeration method according to Item 36 or 37, wherein the refrigerant consists of HFO-1132 (E) and HFO-1234yf.

Item 39.

A method for operating a refrigeration apparatus that operates a refrigeration cycle using the composition of any one of Items 1 to 22.

Item 40.

A refrigeration apparatus comprising the composition of any one of Items 1 to 22 as a working fluid.

Item 41.

The refrigeration apparatus according to Item 40, which is an air-conditioning system, a refrigerator, a freezer, a water cooler, an ice maker, a refrigerated showcase, a freezing showcase, a freezing and refrigerating unit, a refrigerating machine for freezing and refrigerating warehouses, an air-conditioning system for vehicles, a turbo refrigerating machine, or a screw refrigerating machine.

Item 42.

The composition according to any one of Items 1 to 22, which is for use as a refrigerant.

Item 43.

The composition according to Item 42, which is for use as a refrigerant in a refrigeration apparatus.

Item 44.

The composition according to Item 43, wherein the refrigeration apparatus is an air-conditioning system, a refrigerator, a freezer, a water cooler, an ice maker, a refrigerated showcase, a freezing showcase, a freezing and refrigerating unit, a refrigerating machine for freezing and refrigerating warehouses, an air-conditioning system for vehicles, a turbo refrigerating machine, or a screw refrigerating machine.

Item 45.

Use of the composition of any one of Items 1 to 22 as a refrigerant.

Item 46.

The use according to Item 45 in a refrigeration apparatus.

Item 47.

The use according to Item 46, wherein the refrigeration apparatus is an air-conditioning system, a refrigerator, a freezer, a water cooler, an ice maker, a refrigerated showcase, a freezing showcase, a freezing and refrigerating unit, a refrigerating machine for freezing and refrigerating warehouses, an air-conditioning system for vehicles, a turbo refrigerating machine, or a screw refrigerating machine.

Advantageous Effects of Invention

The composition comprising a refrigerant according to the present disclosure is characterized by having a coefficient of performance (COP) and a refrigerating capacity equivalent to or higher than those of R404A, and having a sufficiently low GWP. Additionally, the composition comprising a refrigerant according to the present disclosure is characterized by having a coefficient of performance (COP) and a refrigerating capacity equivalent to or higher than those of R134a, and having a sufficiently low GWP.

BRIEF DESCRIPTION OF DRAWINGS

FIG. 1 is a diagram illustrating an experimental apparatus for examining flammability (flammable or non-flammable).

DESCRIPTION OF EMBODIMENTS

To solve the above problems, the present inventors conducted extensive research and found that a composition comprising a mixed refrigerant comprising trans-1,2-difluoroethylene (HFO-1132 (E)) and 2,3,3,3-tetrafluoropropene (HFO-1234yf) has the above characteristics.

The present disclosure has been completed as a result of further research based on the above findings. The present invention encompasses the following embodiments.

Definition of Terms

The numerical range expressed by using "to" in the present specification indicates a range that includes numerical values before and after "to" stated as the minimum and maximum values respectively.

In the present specification, the terms "comprise" and "contain" includes the concepts of "consisting essentially of" and "consisting of."

In the present specification, the term "refrigerant" includes at least compounds that are specified in ISO817 (International Organization for Standardization), and that are given a refrigerant number (ASHRAE number) representing the type of refrigerant with "R" at the beginning; and further includes refrigerants that have characteristics equivalent to those of such refrigerants even if a refrigerant number is not yet given.

Refrigerants are broadly divided into fluorocarbon-based compounds and non-fluorocarbon-based compounds in terms of the structure of the compounds. Fluorocarbon-based compounds include chlorofluorocarbons (CFC), hydrochlorofluorocarbons (HCFC), and hydrofluorocarbons (HFC). Non-fluorocarbon-based compounds include propane (R290), propylene (R1270), butane (R600), isobutane (R600a), carbon dioxide (R744), ammonia (R717), and the like.

The term "composition comprising a refrigerant" used in the present specification at least includes:

(1) a refrigerant itself (including a mixture of refrigerants, i.e., a mixed refrigerant);

(2) a composition that can be used for obtaining a working fluid for a refrigeration apparatus by further comprising one or more other components and mixing with at least a refrigerant oil; and (3) a working fluid for a refrigeration apparatus, containing a refrigerant oil.

Among these three modes, composition (2) is referred to as a "refrigerant composition" in the present specification to distinguish it from a refrigerant itself (including a mixed refrigerant). Further, the working fluid for a refrigeration apparatus (3) is referred to as "a refrigerant oil-containing working fluid" to distinguish it from the "refrigerant composition."

In the present specification, when the term "alternative" is used in a context in which the first refrigerant is replaced with the second refrigerant, the first type of alternative means that equipment designed for operation using the first refrigerant can be operated using the second refrigerant under optimum conditions, optionally with changes of only a few parts (at least one of the following: refrigerant oil, gasket, packing, expansion valve, dryer, other parts) and equipment adjustment. In other words, this type of alternative means that the same equipment is operated with an alternative refrigerant. Embodiments of this type of alternative include drop-in alternatives, nearly drop-in alternatives, and retrofits, in the order in which the extent of changes and adjustment necessary for replacing the first refrigerant with the second refrigerant is smaller.

The term "alternative" also includes a second type of alternative, which means that equipment designed for operation using the second refrigerant is operated for the same use as the existing use with the first refrigerant by using the second refrigerant. This type of alternative means that the same use is achieved with an alternative refrigerant.

In the present specification, the term "refrigeration apparatus" in the broad sense refers to apparatuses in general that draw heat from an object or space to make its temperature lower than the temperature of the ambient air, and maintain the low temperature. In other words, refrigeration apparatuses in the broad sense refer to conversion apparatuses that gain energy from the outside to do work, and that perform energy conversion, in order to transfer heat from where the temperature is lower to where the temperature is higher. In the present disclosure, "refrigeration apparatus" is synonymous with "heat pump" in the broad sense.

In the present disclosure, the term "refrigeration apparatus" is distinguished from "heat pump" in the narrow sense, depending on the difference in the applied temperature range and operating temperature. In this case, an apparatus whose low-temperature heat source is placed in a temperature range lower than the air temperature may be called a "refrigeration apparatus," while an apparatus whose low-temperature heat source is placed near the air temperature to use the heat-release action caused by driving the refrigeration cycle may be called a "heat pump." Additionally, there are apparatuses that have both the function of refrigeration apparatuses in the narrow sense and the function of heat pumps in the narrow sense, despite them being a single machine, such as air conditioners that provide both a cooling mode and a heating mode. In the present specification, unless otherwise indicated, the terms "refrigeration apparatus" and "heat pump" are used in the broad sense throughout the specification.

In the present specification, the term "temperature glide" can be rephrased as an absolute value of the difference between the starting temperature and the ending temperature of the phase change process of the composition comprising a refrigerant according to the present disclosure within the constituent elements of a heat cycle system.

In the present specification, the term "air-conditioning system for vehicles" is a type of refrigeration apparatus for use in vehicles, such as gasoline vehicles, hybrid vehicles, electric vehicles, and hydrogen vehicles. The air-conditioning system for vehicles refers to a refrigeration apparatus that has a refrigeration cycle in which heat exchange is performed by an evaporator using a liquid refrigerant, the evaporated refrigerant gas is absorbed by a compressor, the adiabatically compressed refrigerant gas is cooled and liquefied with a condenser, the liquefied refrigerant is adiabatically expanded by passing it through an expansion valve, and then the refrigerant is supplied again in the form of a liquid to the evaporator.

In the present specification, the term "turbo refrigerating machine" is a type of large chiller refrigeration apparatus and refers to a refrigeration apparatus that has a refrigeration cycle in which heat exchange is performed by an evaporator using a liquid refrigerant, the evaporated refrigerant gas is absorbed by a centrifugal compressor, the adiabatically compressed refrigerant gas is cooled and liquefied with a condenser, the liquefied refrigerant is adiabatically expanded by passing it through an expansion valve, and then the refrigerant is supplied again in the form of a liquid to the evaporator. The term "large chiller refrigerating machine" is a type of chiller and refers to a large air-conditioner that is intended for air conditioning in a unit of a building.

In the present specification, the term "saturation pressure" refers to a pressure of saturated vapor. In the present specification, the term "saturation temperature" refers to a temperature of saturated vapor.

In the present specification, the phrase "evaporation temperature in a refrigeration cycle" refers to a temperature at which a refrigerant liquid absorbs heat and becomes vapor in the evaporation step of the refrigeration cycle. The evaporation temperature in a refrigeration cycle can be determined by measuring the temperature of the evaporator inlet and/or the evaporator outlet. The evaporation temperature of a simple refrigerant or azeotropic refrigerant is constant. However, the evaporation temperature of a non-azeotropic refrigerant is an average value of the temperature at the evaporator inlet and the dew point temperature. More specifically, the evaporation temperature of a non-azeotropic refrigerant can be calculated with the following equation.

Evaporation temperature=(evaporator inlet temperature+dew point temperature)/2.

In the present specification, the term "discharge temperature" refers to a temperature of the mixed refrigerant at the outlet of a compressor.

In the present specification, the term "evaporation pressure" refers to a saturation pressure at an evaporation temperature. In the present specification, the term "condensation pressure" refers to a saturation pressure at a condensation temperature.

In the present specification, the term "critical temperature" refers to a temperature at the critical point, and a temperature boundary; i.e., unless the temperature is equivalent to or lower than the critical temperature, gas would not be converted into a liquid by compressing the gas.

In the present specification, "non-flammable" refrigerants refer to those whose worst case formulation for flammability (WCF), which is the most flammable point in the allowable refrigerant concentration range according to the US ANSI/ASHRAE Standard 34-2013, is classified as Class 1.

In the present specification, "slightly flammable" refrigerants refers to those whose WCF formulation is classified as Class 2L according to ANSI/ASHRAE Standard 34-2013

In the present specification, "weakly flammable" refrigerants refers to those whose WCF formulation is classified as Class 2 according to ANSI/ASHRAE Standard 34-2013.

In the present specification, the GWP (AR4) is evaluated based on the values stated in the Intergovernmental Panel on Climate Change (IPCC) fourth report.

1. Composition

The composition according to the present disclosure comprises a refrigerant. Examples of the refrigerant include Refrigerant 1, Refrigerant 2, Refrigerant 3, Refrigerant 4, and Refrigerant 5. Refrigerant 1, Refrigerant 2, Refrigerant 3, Refrigerant 4, and Refrigerant 5 are described below. In the present specification, "the refrigerant according to the present disclosure" refers to Refrigerant 1, Refrigerant 2, Refrigerant 3, Refrigerant 4, or Refrigerant 5.

1.1 Refrigerant 1

In an embodiment, the refrigerant contained in the composition according to the present disclosure comprises HFO-1132 (E) and HFO-1234yf, wherein HFO-1132 (E) is present in an amount of 35.0 to 65.0 mass %, and HFO-1234yf is present in an amount of 65.0 to 35.0 mass %, based on the total mass of HFO-1132 (E) and HFO-1234yf. This refrigerant may be referred to as "Refrigerant 1."

In the present disclosure, Refrigerant 1 is for use in operating a refrigeration cycle in which the evaporation temperature is −75 to −5° C.

Refrigerant 1 has the above feature and thus has the following characteristics: (1) the GWP is sufficiently low (100 or less); (2) it has a COP equivalent to or higher than that of R404A; and (3) it has a refrigerating capacity equivalent to or higher than that of R404A.

Since Refrigerant 1 comprises HFO-1132 (E) in an amount of 35.0 mass % or more based on the total mass of HFO-1132 (E) and HFO-1234yf, Refrigerant 1 has a refrigerating capacity equivalent to or higher than that of R404A. Moreover, since Refrigerant 1 comprises HFO-1132 (E) in an amount of 65.0 mass % or less based on the total mass of HFO-1132 (E) and HFO-1234yf, the saturation pressure of Refrigerant 1 at a saturation temperature of 40° C. in the refrigeration cycle can be maintained within a suitable range (in particular 2.10 Mpa or less).

Refrigerant 1 may have a refrigerating capacity of 95% or more, preferably 98% or more, more preferably 100% or more, even more preferably 101% or more, and particularly preferably 102% or more, relative to that of R404A.

Since the GWP is 100 or less, Refrigerant 1 can notably reduce the burden on the environment from a global warming perspective, compared with other general-purpose refrigerants.

In Refrigerant 1, the ratio of refrigerating capacity to power consumed in a refrigeration cycle (coefficient of performance (COP)) relative to that of R404A is preferably high, from the viewpoint of energy consumption efficiency. Specifically, the COP relative to that of R404A is preferably 98% or more, more preferably 100% or more, and particularly preferably 102% or more.

In Refrigerant 1, it is preferred that HFO-1132 (E) be present in an amount of 40.5 to 59.0 mass %, and HFO-1234yf be present in an amount of 59.5 to 41.0 mass %, based on the total mass of HFO-1132 (E) and HFO-1234yf. In this case, Refrigerant 1 has a GWP of 100 or less, a COP of 101% or more relative to that of R404A, and a refrigerating capacity of 99% or more relative to that of R404A. Further, in this case, Refrigerant 1 has a saturation pressure of 1.75 MPa or more and 2.00 MPa or less at a saturation temperature of 40° C., and is thus applicable to commercially available refrigeration apparatuses for R404A without significant design change.

In Refrigerant 1, it is more preferred that HFO-1132 (E) be present in an amount of 41.3 to 59.0 mass %, and HFO-1234yf be present in an amount of 58.7 to 41.0 mass %, based on the total mass of HFO-1132 (E) and HFO-1234yf. In this case, Refrigerant 1 has a GWP of 100 or less, a COP of 101% or more relative to that of R404A, and a refrigerating capacity of 99.5% or more relative to that of R404A. Further, in this case, Refrigerant 1 has a saturation pressure of 1.76 MPa or more and 2.00 MPa or less at a saturation temperature of 40° C., and is thus applicable to commercially available refrigeration apparatuses for R404A without significant design change.

In Refrigerant 1, it is further preferred that HFO-1132 (E) be present in an amount of 41.3 to 55.0 mass %, and HFO-1234yf be present in an amount of 58.7 to 45.0 mass %, based on the total mass of HFO-1132 (E) and HFO-1234yf. In this case, Refrigerant 1 has a GWP of 100 or less, a COP of 101% or more relative to that of R404A, and a refrigerating capacity of 99.5% or more relative to that of R404A. Further, in this case, Refrigerant 1 has a saturation pressure of 1.76 MPa or more and 1.95 MPa or less at a saturation temperature of 40° C., and is thus applicable to commercially available refrigeration apparatuses for R404A without significant design change.

In Refrigerant 1, it is particularly preferred that HFO-1132 (E) be present in an amount of 41.3 to 53.5 mass %, and HFO-1234yf be present in an amount of 58.7 to 46.5 mass %, based on the total mass of HFO-1132 (E) and HFO-1234yf. In this case, Refrigerant 1 has characteristics of having a GWP of 100 or less, a COP of 102% or more relative to that of R404A, and a refrigerating capacity of 99.5% or more relative to that of R404A, as well as being slightly flammable according to ASHRAE Standards (Class 2L). Further, in this case, Refrigerant 1 has a saturation pressure of 1.76 MPa or more and 1.94 MPa or less at a saturation temperature of 40° C., and is thus applicable to commercially available refrigeration apparatuses for R404A without significant design change.

In Refrigerant 1, it is particularly preferred that HFO-1132 (E) be present in an amount of 41.3 to 51.0 mass %, and HFO-1234yf be present in an amount of 58.7 to 49.0 mass %, based on the total mass of HFO-1132 (E) and HFO-1234yf. In this case, Refrigerant 1 has characteristics of having a GWP of 100 or less, a COP of 102% or more relative to that of R404A, and a refrigerating capacity of 99% or more relative to that of R404A, as well as being slightly flammable according to ASHRAE Standards (Class 2L). Further, in this case, Refrigerant 1 has a saturation pressure of 1.76 MPa or more and 1.90 MPa or less at a saturation temperature of 40° C., and is thus applicable to commercially available refrigeration apparatuses for R404A without significant design change.

In Refrigerant 1, it is most preferred that HFO-1132 (E) be present in an amount of 41.3 to 49.2 mass %, and HFO-1234yf be present in an amount of 58.7 to 50.8 mass %, based on the total mass of HFO-1132 (E) and HFO-1234yf. In this case, Refrigerant 1 has characteristics of having a GWP of 100 or less, a COP of 102% or more relative to that of R404A, and a refrigerating capacity of 99.5% or more relative to that of R404A, as well as being slightly flammable according to ASHRAE Standards (Class 2L). Further, in this case, Refrigerant 1 has a saturation pressure of 1.76 MPa or more and 1.88 MPa or less at a saturation temperature of 40° C., and is thus applicable to commercially available refrigeration apparatuses for R404A without significant design change.

In Refrigerant 1, the saturation pressure at a saturation temperature of 40° C. is usually 2.10 MPa or less, preferably 2.00 MPa or less, more preferably 1.95 MPa or less, even more preferably 1.90 MPa or less, and particularly preferably 1.88 MPa or less. If the saturation pressure at a saturation temperature of 40° C. is within the above range, Refrigerant 1 is applicable to commercially available refrigeration apparatuses for R404A without significant design change.

In Refrigerant 1, the saturation pressure at a saturation temperature of 40° C. is usually 1.70 MPa or more, preferably 1.73 MPa or more, more preferably 1.74 MPa or more, even more preferably 1.75 MPa or more, and particularly preferably 1.76 MPa or more. If the saturation pressure at a saturation temperature of 40° C. is within the above range, Refrigerant 1 is applicable to commercially available refrigeration apparatuses for R404A without significant design change.

In the present disclosure, when Refrigerant 1 is used for operating a refrigeration cycle, the discharge temperature is preferably 150° C. or lower, more preferably 140° C. or lower, even more preferably 130° C. or lower, and particularly preferably 120° C. or lower, from the viewpoint of extending the life of the components of a commercially available refrigeration apparatus for R404A.

The use of Refrigerant 1 for operating a refrigeration cycle in which the evaporation temperature is −75 to −5° C. is advantageous in terms of ensuring a refrigerating capacity equivalent to or higher than that of R404A.

In a refrigeration cycle in which Refrigerant 1 according to the present disclosure is used, when the evaporation temperature exceeds −5° C., the compression ratio becomes less than 2.5, which reduces the efficiency of the refrigeration cycle. In a refrigeration cycle in which Refrigerant 1 according to the present disclosure is used, when the evaporation temperature is less than −75° C., the evaporation pressure becomes less than 0.02 MPa, which makes suction of the refrigerant into a compressor difficult. The compression ratio is calculated with the following equation.

Compression ratio=condensation pressure (Mpa)/evaporation pressure (Mpa).

In a refrigeration cycle in which Refrigerant 1 according to the present disclosure is used, the evaporation temperature is preferably −7.5° C. or lower, more preferably −10° C. or lower, and even more preferably −35° C. or lower.

In a refrigeration cycle in which Refrigerant 1 according to the present disclosure is used, the evaporation temperature is preferably −65° C. or more, more preferably −60° C. or more, even more preferably −55° C. or more, and particularly preferably −50° C. or more.

In a refrigeration cycle in which Refrigerant 1 according to the present disclosure is used, the evaporation temperature is preferably −65° C. or more and −5° C. or lower, more preferably −60° C. or more and −5° C. or lower, even more preferably −55° C. or more and −7.5° C. or lower, and particularly preferably −50° C. or more and −10° C. or lower.

In a refrigeration cycle in which Refrigerant 1 according to the present disclosure is used, the evaporation pressure is preferably 0.02 MPa or more, more preferably 0.03 MPa or more, even more preferably 0.04 MPa or more, and particularly preferably 0.05 MPa or more, from the viewpoint of improving the suction of the refrigerant into a compressor.

In a refrigeration cycle in which Refrigerant 1 according to the present disclosure is used, the compression ratio is preferably 2.5 or more, more preferably 3.0 or more, even more preferably 3.5 or more, and particularly preferably 4.0 or more, from the viewpoint of improving the efficiency of the refrigeration cycle. In a refrigeration cycle in which Refrigerant 1 according to the present disclosure is used, the compression ratio is preferably 200 or less, more preferably 150 or less, even more preferably 100 or less, and particularly preferably 50 or less, from the viewpoint of improving the efficiency of the refrigeration cycle.

Refrigerant 1 may comprise HFO-1132 (E) and HFO-1234yf in such amounts that the sum of their concentrations is usually 99.5 mass % or more. In the present disclosure, the total amount of HFO-1132 (E) and HFO-1234yf is preferably 99.7 mass % or more, more preferably 99.8 mass % or more, and even more preferably 99.9 mass % or more, of entire Refrigerant 1.

Refrigerant 1 may further comprise an additional refrigerant in addition to HFO-1132 (E) and HFO-1234yf as long as the above characteristics are not impaired. In this case, the content of the additional refrigerant is preferably 0.5 mass % or less, more preferably 0.3 mass % or less, even more preferably 0.2 mass % or less, and particularly preferably 0.1 mass % or less, of entire Refrigerant 1. The additional refrigerant is not limited and may be selected from a wide range of known refrigerants widely used in the field. Refrigerant 1 may comprise one additional refrigerant or two or more additional refrigerants.

It is particularly preferred that Refrigerant 1 consist of HFO-1132 (E) and HFO-1234yf. In other words, the total concentration of HFO-1132 (E) and HFO-1234yf in Refrigerant 1 is particularly preferably 100 mass % of entire Refrigerant 1.

When Refrigerant 1 consists of HFO-1132 (E) and HFO-1234yf, HFO-1132 (E) is usually present in an amount of 35.0 to 65.0 mass %, and HFO-1234yf is usually present in an amount of 65.0 to 35.0 mass %, based on the total mass of HFO-1132 (E) and HFO-1234yf. Refrigerant 1 has the above feature and thus has the following characteristics: (1) the GWP is sufficiently low (100 or less); (2) it has a COP equivalent to or higher than that of R404A; and (3) it has a refrigerating capacity equivalent to or higher than that of R404A.

When Refrigerant 1 consists of HFO-1132 (E) and HFO-1234yf, it is preferred that HFO-1132 (E) be present in an amount of 40.5 to 59.0 mass %, and HFO-1234yf be present in an amount of 59.5 to 41.0 mass %, based on the total mass of HFO-1132 (E) and HFO-1234yf. In this case, Refrigerant 1 has a GWP of 100 or less, a COP of 101% or more relative to that of R404A, and a refrigerating capacity of 99% or more relative to that of R404A. Further, in this case, Refrigerant 1 has a saturation pressure of 1.75 MPa or more and 2.00 MPa or less at a saturation temperature of 40° C., and is thus applicable to commercially available refrigeration apparatuses for R404A without significant design change.

When Refrigerant 1 consists of HFO-1132 (E) and HFO-1234yf, it is preferred that HFO-1132 (E) be present in an amount of 41.3 to 59.0 mass %, and HFO-1234yf be present in an amount of 58.7 to 41.0 mass %, based on the total mass of HFO-1132 (E) and HFO-1234yf. In this case, Refrigerant 1 has a GWP of 100 or less, a COP of 101% or more relative to that of R404A, and a refrigerating capacity of 99.5% or more relative to that of R404A. Further, in this case, Refrigerant 1 has a saturation pressure of 1.76 MPa or more and 2.00 MPa or less at a saturation temperature of 40° C., and is thus applicable to commercially available refrigeration apparatuses for R404A without significant design change.

When Refrigerant 1 consists of HFO-1132 (E) and HFO-1234yf, it is further preferred that HFO-1132 (E) be present in an amount of 41.3 to 55.0 mass %, and HFO-1234yf be present in an amount of 58.7 to 45.0 mass %, based on the total mass of HFO-1132 (E) and HFO-1234yf. In this case, Refrigerant 1 has a GWP of 100 or less, a COP of 101% or more relative to that of R404A, and a refrigerating capacity of 99.5% or more relative to that of R404A. Further, in this case, Refrigerant 1 has a saturation pressure of 1.76 MPa or more and 1.95 MPa or less at a saturation temperature of 40°

C., and is thus applicable to commercially available refrigeration apparatuses for R404A without significant design change.

When Refrigerant 1 consists of HFO-1132 (E) and HFO-1234yf, it is particularly preferred that HFO-1132 (E) be present in an amount of 41.3 to 53.5 mass %, and HFO-1234yf be present in an amount of 58.7 to 46.5 mass %, based on the total mass of HFO-1132 (E) and HFO-1234yf. In this case, Refrigerant 1 has characteristics of having a GWP of 100 or less, a COP of 102% or more relative to that of R404A, and a refrigerating capacity of 99.5% or more relative to that of R404A, as well as being slightly flammable according to ASHRAE Standards (Class 2L). Further, in this case, Refrigerant 1 has a saturation pressure of 1.76 MPa or more and 1.94 MPa or less at a saturation temperature of 40° C., and is thus applicable to commercially available refrigeration apparatuses for R404A without significant design change.

When Refrigerant 1 consists of HFO-1132 (E) and HFO-1234yf, it is particularly preferred that HFO-1132 (E) be present in an amount of 41.3 to 51.0 mass %, and HFO-1234yf be present in an amount of 58.7 to 49.0 mass %, based on the total mass of HFO-1132 (E) and HFO-1234yf. In this case, Refrigerant 1 has characteristics of having a GWP of 100 or less, a COP of 102% or more relative to that of R404A, and a refrigerating capacity of 99% or more relative to that of R404A, as well as being slightly flammable according to ASHRAE Standards (Class 2L). Further, in this case, Refrigerant 1 has a saturation pressure of 1.76 MPa or more and 1.90 MPa or less at a saturation temperature of 40° C., and is thus applicable to commercially available refrigeration apparatuses for R404A without significant design change.

When Refrigerant 1 consists of HFO-1132 (E) and HFO-1234yf, it is most preferred that HFO-1132 (E) be present in an amount of 41.3 to 49.2 mass %, and HFO-1234yf be present in an amount of 58.7 to 50.8 mass %, based on the total mass of HFO-1132 (E) and HFO-1234yf. In this case, Refrigerant 1 has characteristics of having a GWP of 100 or less, a COP of 102% or more relative to that of R404A, and a refrigerating capacity of 99.5% or more relative to that of R404A, as well as being slightly flammable according to ASHRAE Standards (Class 2L). Further, in this case, Refrigerant 1 has a saturation pressure of 1.76 MPa or more and 1.88 MPa or less at a saturation temperature of 40° C., and is thus applicable to commercially available refrigeration apparatuses for R404A without significant design change.

1.2 Refrigerant 2

In an embodiment, the refrigerant contained in the composition according to the present disclosure comprises HFO-1132 (E) and HFO-1234yf, wherein HFO-1132 (E) is present in an amount of 40.5 to 49.2 mass %, and HFO-1234yf is present in an amount of 59.5 to 50.8 mass %, based on the total mass of HFO-1132 (E) and HFO-1234yf. This refrigerant may be referred to as "Refrigerant 2."

Refrigerant 2 has the above feature and thus has the following characteristics: (1) the GWP is sufficiently low (100 or less); (2) it has a COP equivalent to or higher than that of R404A; (3) it has a refrigerating capacity equivalent to or higher than that of R404A; and (4) it is slightly flammable according to ASHRAE Standards (Class 2L). Further, in this case, Refrigerant 2 has a saturation pressure of 1.75 MPa or more and 1.88 MPa or less at a saturation temperature of 40° C., and is thus applicable to commercially available refrigeration apparatuses for R404A without significant design change.

Since Refrigerant 2 comprises HFO-1132 (E) in an amount of 40.5 mass % or more based on the total mass of HFO-1132 (E) and HFO-1234yf, Refrigerant 2 has a refrigerating capacity equivalent to or higher than that of R404A. Moreover, since Refrigerant 2 comprises HFO-1132 (E) in an amount of 49.2 mass % or less based on the total mass of HFO-1132 (E) and HFO-1234yf, the saturation pressure of Refrigerant 2 at a saturation temperature of 40° C. in the refrigeration cycle can be maintained within a suitable range (in particular 2.10 Mpa or less).

Refrigerant 2 may have a refrigerating capacity of 99% or more, preferably 100% or more, more preferably 101% or more, even more preferably 102% or more, and particularly preferably 103% or more, relative to that of R404A.

Since the GWP is 100 or less, Refrigerant 2 can notably reduce the burden on the environment from a global warming perspective, compared with other general-purpose refrigerants.

In Refrigerant 2, the ratio of refrigerating capacity to power consumed in a refrigeration cycle (coefficient of performance (COP)) relative to that of R404A is preferably high, from the viewpoint of energy consumption efficiency. Specifically, the COP relative to that of R404A is preferably 98% or more, more preferably 100% or more, even more preferably 101% or more, and particularly preferably 102% or more.

In Refrigerant 2, it is preferred that HFO-1132 (E) be present in an amount of 41.3 to 49.2 mass %, and HFO-1234yf be present in an amount of 58.7 to 50.8 mass %, based on the total mass of HFO-1132 (E) and HFO-1234yf. In this case, Refrigerant 2 has characteristics of having a GWP of 100 or less, a COP of 102% or more relative to that of R404A, and a refrigerating capacity of 99.5% or more relative to that of R404A, as well as being slightly flammable according to ASHRAE Standards (Class 2L). Further, in this case, Refrigerant 2 has a saturation pressure of 1.76 MPa or more and 1.88 MPa or less at a saturation temperature of 40° C., and is thus applicable to commercially available refrigeration apparatuses for R404A without significant design change.

In Refrigerant 2, it is preferred that HFO-1132 (E) be present in an amount of 43.0 to 49.2 mass %, and HFO-1234yf be present in an amount of 57.0 to 50.8 mass %, based on the total mass of HFO-1132 (E) and HFO-1234yf. In this case, Refrigerant 2 has characteristics of having a GWP of 100 or less, a COP of 102% or more relative to that of R404A, and a refrigerating capacity of 101% or more relative to that of R404A, as well as being slightly flammable according to ASHRAE Standards (Class 2L). Further, in this case, Refrigerant 2 has a saturation pressure of 1.78 MPa or more and 1.88 MPa or less at a saturation temperature of 40° C., and is thus applicable to commercially available refrigeration apparatuses for R404A without significant design change.

In Refrigerant 2, it is further preferred that HFO-1132 (E) be present in an amount of 44.0 to 49.2 mass %, and HFO-1234yf be present in an amount of 56.0 to 50.8 mass %, based on the total mass of HFO-1132 (E) and HFO-1234yf. In this case, Refrigerant 2 has characteristics of having a GWP of 100 or less, a COP of 102% or more relative to that of R404A, and a refrigerating capacity of 101% or more relative to that of R404A, as well as being slightly flammable according to ASHRAE Standards (Class 2L). Further, in this case, Refrigerant 2 has a saturation pressure of 1.80 MPa or more and 1.88 MPa or less at a saturation temperature of 40° C., and is thus applicable to commercially available refrigeration apparatuses for R404A without significant design change.

In Refrigerant 2, it is particularly preferred that HFO-1132 (E) be present in an amount of 45.0 to 49.2 mass %, and HFO-1234yf be present in an amount of 55.0 to 50.8 mass %, based on the total mass of HFO-1132 (E) and HFO-1234yf. In this case, Refrigerant 2 has characteristics of having a GWP of 100 or less, a COP of 102% or more relative to that of R404A, and a refrigerating capacity of 102% or more relative to that of R404A, as well as being slightly flammable according to ASHRAE Standards (Class 2L). Further, in this case, Refrigerant 2 has a saturation pressure of 1.81 MPa or more and 1.88 MPa or less at a saturation temperature of 40° C., and is thus applicable to commercially available refrigeration apparatuses for R404A without significant design change.

In Refrigerant 2, it is particularly preferred that HFO-1132 (E) be present in an amount of 45.0 to 48.0 mass %, and HFO-1234yf be present in an amount of 55.0 to 52.0 mass %, based on the total mass of HFO-1132 (E) and HFO-1234yf. In this case, Refrigerant 2 has characteristics of having a GWP of 100 or less, a COP of 102.5% or more relative to that of R404A, and a refrigerating capacity of 102.5% or more relative to that of R404A, as well as being slightly flammable according to ASHRAE Standards (Class 2L). Further, in this case, Refrigerant 2 has a saturation pressure of 1.81 MPa or more and 1.87 MPa or less at a saturation temperature of 40° C., and is thus applicable to commercially available refrigeration apparatuses for R404A without significant design change.

In Refrigerant 2, it is most preferred that HFO-1132 (E) be present in an amount of 45.0 to 47.0 mass %, and HFO-1234yf be present in an amount of 55.0 to 53.0 mass %, based on the total mass of HFO-1132 (E) and HFO-1234yf. In this case, Refrigerant 2 has characteristics of having a GWP of 100 or less, a COP of 102.5% or more relative to that of R404A, and a refrigerating capacity of 102.5% or more relative to that of R404A, as well as being slightly flammable according to ASHRAE Standards (Class 2L). Further, in this case, Refrigerant 2 has a saturation pressure of 1.81 MPa or more and 1.85 MPa or less at a saturation temperature of 40° C., and is thus applicable to commercially available refrigeration apparatuses for R404A without significant design change.

In Refrigerant 2, the saturation pressure at a saturation temperature of 40° C. is usually 2.10 MPa or less, preferably 2.00 MPa or less, more preferably 1.95 MPa or less, even more preferably 1.90 MPa or less, and particularly preferably 1.88 MPa or less. If the saturation pressure at a saturation temperature of 40° C. is within the above range, Refrigerant 2 is applicable to commercially available refrigeration apparatuses for R404A without significant design change.

In Refrigerant 2, the saturation pressure at a saturation temperature of 40° C. is usually 1.70 MPa or more, preferably 1.73 MPa or more, more preferably 1.74 MPa or more, even more preferably 1.75 MPa or more, and particularly preferably 1.76 MPa or more. If the saturation pressure at a saturation temperature of 40° C. is within the above range, Refrigerant 2 is applicable to commercially available refrigeration apparatuses for R404A without significant design change.

In the present disclosure, when Refrigerant 2 is used for operating a refrigeration cycle, the discharge temperature is preferably 150° C. or lower, more preferably 140° C. or lower, even more preferably 130° C. or lower, and particularly preferably 120° C. or lower, from the viewpoint of extending the life of the components of a commercially available refrigeration apparatus for R404A.

In the present disclosure, Refrigerant 2 is preferably used for operating a refrigeration cycle in which the evaporation temperature is −75 to 15° C. from the viewpoint of obtaining a refrigerating capacity equivalent to or higher than that of R404A.

In a refrigeration cycle in which Refrigerant 2 according to the present disclosure is used, the evaporation temperature is preferably 15° C. or lower, more preferably 5° C. or lower, even more preferably 0° C. or lower, and particularly preferably −5° C. or lower.

In a refrigeration cycle in which Refrigerant 2 according to the present disclosure is used, the evaporation temperature is preferably −65° C. or more, more preferably −60° C. or more, even more preferably −55° C. or more, and particularly preferably −50° C. or more.

In a refrigeration cycle in which Refrigerant 2 according to the present disclosure is used, the evaporation temperature is preferably −65° C. or more and 10° C. or lower, more preferably −60° C. or more and 5° C. or lower, even more preferably −55° C. or more and 0° C. or lower, and particularly preferably −50° C. or more and −5° C. or lower.

In a refrigeration cycle in which Refrigerant 2 according to the present disclosure is used, the evaporation pressure is preferably 0.02 MPa or more, more preferably 0.03 MPa or more, even more preferably 0.04 MPa or more, and particularly preferably 0.05 MPa or more, from the viewpoint of improving the suction of the refrigerant into a compressor.

In a refrigeration cycle in which Refrigerant 2 according to the present disclosure is used, the compression ratio is preferably 2.5 or more, more preferably 3.0 or more, even more preferably 3.5 or more, and particularly preferably 4.0 or more, from the viewpoint of improving the efficiency of the refrigeration cycle.

Refrigerant 2 may comprise HFO-1132 (E) and HFO-1234yf in such amounts that the sum of their concentrations is usually 99.5 mass % or more. In the present disclosure, the total amount of HFO-1132 (E) and HFO-1234yf is preferably 99.7 mass % or more, more preferably 99.8 mass % or more, and even more preferably 99.9 mass % or more, of entire Refrigerant 2.

Refrigerant 2 may further comprise an additional refrigerant in addition to HFO-1132 (E) and HFO-1234yf as long as the above characteristics are not impaired. In this case, the content of the additional refrigerant is preferably 0.5 mass % or less, more preferably 0.3 mass % or less, even more preferably 0.2 mass % or less, and particularly preferably 0.1 mass % or less, of entire Refrigerant 2. The additional refrigerant is not limited and may be selected from a wide range of known refrigerants widely used in the field. Refrigerant 2 may comprise one additional refrigerant or two or more additional refrigerants.

It is particularly preferred that Refrigerant 2 consist of HFO-1132 (E) and HFO-1234yf. In other words, the total concentration of HFO-1132 (E) and HFO-1234yf in Refrigerant 2 is particularly preferably 100 mass % of entire Refrigerant 2.

When Refrigerant 2 consists of HFO-1132 (E) and HFO-1234yf, HFO-1132 (E) is usually present in an amount of 40.5 to 49.2 mass %, and HFO-1234yf is usually present in an amount of 59.5 to 50.8 mass %, based on the total mass of HFO-1132 (E) and HFO-1234yf. Refrigerant 2 has the above feature and thus has the following characteristics: (1) the GWP is sufficiently low (100 or less); (2) it has a COP equivalent to or higher than that of R404A; (3) it has a refrigerating capacity equivalent to or higher than that of R404A; and (4) it is slightly flammable according to ASHRAE Standards (Class 2L). Further, in this case, Refrigerant 2 has a saturation pressure of 1.75 MPa or more and 1.88 MPa or less at a saturation temperature of 40° C., and is thus applicable to commercially available refrigeration apparatuses for R404A without significant design change.

When Refrigerant 2 consists of HFO-1132 (E) and HFO-1234yf, it is preferred that HFO-1132 (E) be present in an amount of 41.3 to 49.2 mass %, and HFO-1234yf be present in an amount of 58.7 to 50.8 mass %, based on the total mass of HFO-1132 (E) and HFO-1234yf. In this case, Refrigerant 2 has characteristics of having a GWP of 100 or less, a COP of 102% or more relative to that of R404A, and a refrigerating capacity of 99.5% or more relative to that of R404A, as well as being slightly flammable according to ASHRAE Standards (Class 2L). Further, in this case, Refrigerant 2 has a saturation pressure of 1.76 MPa or more and 1.88 MPa or less at a saturation temperature of 40° C., and is thus applicable to commercially available refrigeration apparatuses for R404A without significant design change.

When Refrigerant 2 consists of HFO-1132 (E) and HFO-1234yf, it is preferred that HFO-1132 (E) be present in an amount of 43.0 to 49.2 mass %, and HFO-1234yf be present in an amount of 57.0 to 50.8 mass %, based on the total mass of HFO-1132 (E) and HFO-1234yf. In this case, Refrigerant 2 has characteristics of having a GWP of 100 or less, a COP of 102% or more relative to that of R404A, and a refrigerating capacity of 101% or more relative to that of R404A, as well as being slightly flammable according to ASHRAE Standards (Class 2L). Further, in this case, Refrigerant 2 has a saturation pressure of 1.78 MPa or more and 1.88 MPa or less at a saturation temperature of 40° C., and is thus applicable to commercially available refrigeration apparatuses for R404A without significant design change.

When Refrigerant 2 consists of HFO-1132 (E) and HFO-1234yf, it is further preferred that HFO-1132 (E) be present in an amount of 44.0 to 49.2 mass %, and HFO-1234yf be present in an amount of 56.0 to 50.8 mass %, based on the total mass of HFO-1132 (E) and HFO-1234yf. In this case, Refrigerant 2 has characteristics of having a GWP of 100 or less, a COP of 102% or more relative to that of R404A, and a refrigerating capacity of 101% or more relative to that of R404A, as well as being slightly flammable according to ASHRAE Standards (Class 2L). Further, in this case, Refrigerant 2 has a saturation pressure of 1.80 MPa or more and 1.88 MPa or less at a saturation temperature of 40° C., and is thus applicable to commercially available refrigeration apparatuses for R404A without significant design change.

When Refrigerant 2 consists of HFO-1132 (E) and HFO-1234yf, it is particularly preferred that HFO-1132 (E) be present in an amount of 45.0 to 49.2 mass %, and HFO-1234yf be present in an amount of 55.0 to 50.8 mass %, based on the total mass of HFO-1132 (E) and HFO-1234yf. In this case, Refrigerant 2 has characteristics of having a GWP of 100 or less, a COP of 102% or more relative to that of R404A, and a refrigerating capacity of 102% or more relative to that of R404A, as well as being slightly flammable according to ASHRAE Standards (Class 2L). Further, in this case, Refrigerant 2 has a saturation pressure of 1.81 MPa or more and 1.88 MPa or less at a saturation temperature of 40° C., and is thus applicable to commercially available refrigeration apparatuses for R404A without significant design change.

When Refrigerant 2 consists of HFO-1132 (E) and HFO-1234yf, it is particularly preferred that HFO-1132 (E) be present in an amount of 45.0 to 48.0 mass %, and HFO-1234yf be present in an amount of 55.0 to 52.0 mass %, based on the total mass of HFO-1132 (E) and HFO-1234yf. In this case, Refrigerant 2 has characteristics of having a GWP of 100 or less, a COP of 102.5% or more relative to that of R404A, and a refrigerating capacity of 102.5% or more relative to that of R404A, as well as being slightly flammable according to ASHRAE Standards (Class 2L). Further, in this case, Refrigerant 2 has a saturation pressure of 1.81 MPa or more and 1.87 MPa or less at a saturation temperature of 40° C., and is thus applicable to commercially available refrigeration apparatuses for R404A without significant design change.

1.3 Refrigerant 3

In an embodiment, the refrigerant contained in the composition according to the present disclosure comprises HFO-1132 (E) and HFO-1234yf, wherein HFO-1132 (E) is present in an amount of 31.1 to 39.8 mass %, and HFO-1234yf is present in an amount of 68.9 to 60.2 mass %, based on the total mass of HFO-1132 (E) and HFO-1234yf. This refrigerant may be referred to as "Refrigerant 3."

Refrigerant 3 has the above feature and thus has the following characteristics: (1) the GWP is sufficiently low (100 or less); (2) it has a COP almost equivalent to that of R134a; (3) it has a refrigerating capacity of 150% or more relative to that of R134a; and (4) the discharge temperature is 90° C. or less.

Since Refrigerant 3 comprises HFO-1132 (E) in an amount of 31.1 mass % or more based on the total mass of HFO-1132 (E) and HFO-1234yf, Refrigerant 3 has a refrigerating capacity of 150% or more relative to that of R134a. Moreover, since Refrigerant 3 comprises HFO-1132 (E) in an amount of 39.8 mass % or less based on the total mass of HFO-1132 (E) and HFO-1234yf, the discharge temperature of Refrigerant 3 in a refrigeration cycle can be maintained at 90° C. or less, and long life of the components of a refrigeration apparatus for R134a can be ensured.

Refrigerant 3 may have a refrigerating capacity of 150% or more, preferably 151% or more, more preferably 152% or more, even more preferably 153% or more, and particularly preferably 154% or more, relative to that of R134a.

Refrigerant 3 has a discharge temperature of preferably 90.0° C. or less, more preferably 89.7° C. or less, even more preferably 89.4° C. or less, and particularly preferably 89.0° C. or less, in a refrigeration cycle.

Since the GWP is 100 or less, Refrigerant 3 can notably reduce the burden on the environment from a global warming perspective, compared with other general-purpose refrigerants.

In Refrigerant 3, the ratio of refrigerating capacity to power consumed in a refrigeration cycle (coefficient of performance (COP)) relative to that of R134a is preferably high, from the viewpoint of energy consumption efficiency. Specifically, the COP relative to that of R134a is preferably 90% or more, more preferably 91% or more, even more preferably 91.5% or more, and particularly preferably 92% or more.

In Refrigerant 3, HFO-1132 (E) is usually present in an amount of 31.1 to 39.8 mass %, and HFO-1234yf is usually present in an amount of 68.9 to 60.2 mass %, based on the total mass of HFO-1132 (E) and HFO-1234yf. Refrigerant 3 has the above feature and thus has the following characteristics: (1) the GWP is sufficiently low (100 or less); (2) it has a COP almost equivalent to that of R134a; (3) it has a refrigerating capacity of 150% or more relative to that of R134a; and (4) the discharge temperature is 90.0° C. or less.

In Refrigerant 3, it is preferred that HFO-1132 (E) be present in an amount of 31.1 to 37.9 mass %, and HFO-1234yf be present in an amount of 68.9 to 62.1 mass %, based on the total mass of HFO-1132 (E) and HFO-1234yf. In this case, Refrigerant 3 has the above feature and thus has the following characteristics: (1) the GWP is sufficiently low (100 or less); (2) it has an COP of 92% or more relative to that of R134a; (3) it has a refrigerating capacity of 150% or more relative to that of R134a; (4) the discharge temperature is 90.0° C. or less; and (5) the critical temperature is 81° C. or more.

In Refrigerant 3, it is more preferred that HFO-1132 (E) be present in an amount of 32.0 to 37.9 mass %, and HFO-1234yf be present in an amount of 68.0 to 62.1 mass %, based on the total mass of HFO-1132 (E) and HFO-1234yf. In this case, Refrigerant 3 has the above feature and thus has the following characteristics: (1) the GWP is sufficiently low (100 or less); (2) it has a COP of 92% or more relative to that of R134a; (3) it has a refrigerating capacity of 151% or more relative to that of R134a; (4) the discharge temperature is 90.0° C. or less, and (5) the critical temperature is 81° C. or more.

In Refrigerant 3, it is further preferred that HFO-1132 (E) be present in an amount of 33.0 to 37.9 mass %, and HFO-1234yf be present in an amount of 67.0 to 62.1 mass %, based on the total mass of HFO-1132 (E) and HFO-1234yf. In this case, Refrigerant 3 has the above feature and thus has the following characteristics: (1) the GWP is sufficiently low (100 or less); (2) it has a COP of 92% or more relative to that of R134a; (3) it has a refrigerating capacity of 152% or more relative to that of R134a; (4) the discharge temperature is 90.0° C. or less; and (5) the critical temperature is 81° C. or more.

In Refrigerant 3, it is even more preferred that HFO-1132 (E) be present in an amount of 34.0 to 37.9 mass %, and HFO-1234yf be present in an amount of 66.0 to 62.1 mass %, based on the total mass of HFO-1132 (E) and HFO-1234yf. In this case, Refrigerant 3 has the above feature and thus has the following characteristics: (1) the GWP is sufficiently low (100 or less); (2) it has a COP of 92% or more relative to that of R134a; (3) it has a refrigerating capacity of 153% or more relative to that of R134a; (4) the discharge temperature is 90.0° C. or less; and (5) the critical temperature is 81° C. or more.

In Refrigerant 3, it is particularly preferred that HFO-1132 (E) be present in an amount of 35.0 to 37.9 mass %, and HFO-1234yf be present in an amount of 65.0 to 62.1 mass %, based on the total mass of HFO-1132 (E) and HFO-1234yf. In this case, Refrigerant 3 has the above feature and thus has the following characteristics: (1) the GWP is sufficiently low (100 or less); (2) it has a COP of 92% or more relative to that of R134a; (3) it has a refrigerating capacity of 155% or more relative to that of R134a; (4) the discharge temperature is 90.0° C. or less; and (5) the critical temperature is 81° C. or more.

In the present disclosure, when Refrigerant 3 is used for operating a refrigeration cycle, the discharge temperature is preferably 90.0° C. or less, more preferably 89.7° C. or less, even more preferably 89.4° C. or less, and particularly preferably 89.0° C. or less, from the viewpoint of extending the life of the components of a commercially available refrigeration apparatus for R134a.

In the present disclosure, when Refrigerant 3 is used for operating a refrigeration cycle, the refrigeration cycle requires the process of liquefying (condensing) the refrigerant; thus, the critical temperature needs to be notably higher than the temperature of cooling water or cooling air for liquefying the refrigerant. From this viewpoint, in a refrigeration cycle in which Refrigerant 3 according to the present disclosure is used, the critical temperature is preferably 80° C. or more, more preferably 81° C. or more, even more preferably 81.5° C. or more, and particularly preferably 82° C. or more.

In the present disclosure, Refrigerant 3 is usually used for operating a refrigeration cycle in which the evaporation temperature is −75 to 15° C., from the viewpoint of obtaining a refrigerating capacity of 150% or more relative to that of R134a.

In a refrigeration cycle in which Refrigerant 3 according to the present disclosure is used, the evaporation temperature is preferably 15° C. or less, more preferably 5° C. or less, even more preferably 0° C. or less, and particularly preferably −5° C. or less.

In a refrigeration cycle in which Refrigerant 3 according to the present disclosure is used, the evaporation temperature is preferably −65° C. or more, more preferably −60° C. or more, even more preferably −55° C. or more, and particularly preferably −50° C. or more.

In a refrigeration cycle in which Refrigerant 3 according to the present disclosure is used, the evaporation temperature is preferably −65° C. or more and 15° C. or less, more preferably −60° C. or more and 5° C. or less, even more preferably −55° C. or more and 0° C. or less, and particularly preferably −50° C. or more and −5° C. or less.

In a refrigeration cycle in which Refrigerant 3 according to the present disclosure is used, the critical temperature of the refrigerant is preferably 80° C. or more, more preferably 81° C. or more, even more preferably 81.5° C. or more, and particularly preferably 82° C. or more, from the viewpoint of improving the performance.

Refrigerant 3 may comprise HFO-1132 (E) and HFO-1234yf in such amounts that the sum of their concentrations is usually 99.5 mass % or more. In the present disclosure, the total amount of HFO-1132 (E) and HFO-1234yf is preferably 99.7 mass % or more, more preferably 99.8 mass % or more, and even more preferably 99.9 mass % or more, of entire Refrigerant 3.

Refrigerant 3 may further comprise an additional refrigerant in addition to HFO-1132 (E) and HFO-1234yf as long as the above characteristics are not impaired. In this case, the content of the additional refrigerant is preferably 0.5 mass % or less, more preferably 0.3 mass % or less, even more preferably 0.2 mass % or less, and particularly preferably 0.1 mass % or less, of entire Refrigerant 3. The additional refrigerant is not limited and may be selected from a wide range of known refrigerants widely used in the field. Refrigerant 3 may comprise one additional refrigerant or two or more additional refrigerants.

It is particularly preferred that Refrigerant 3 consist of HFO-1132 (E) and HFO-1234yf. In other words, the total concentration of HFO-1132 (E) and HFO-1234yf in Refrigerant 3 is particularly preferably 100 mass % of entire Refrigerant 3.

When Refrigerant 3 consists of HFO-1132 (E) and HFO-1234yf, HFO-1132 (E) is usually present in an amount of 31.1 to 39.8 mass %, and HFO-1234yf is usually present in an amount of 68.9 to 60.2 mass %, based on the total mass of HFO-1132 (E) and HFO-1234yf. Refrigerant 3 has the above feature and thus has the following characteristics: (1) the GWP is sufficiently low (100 or less); (2) it has a COP almost equivalent to that of R134a; (3) it has a refrigerating capacity of 150% or more relative to that of R134a; and (4) the discharge temperature is 90° C. or less.

When Refrigerant 3 consists of HFO-1132 (E) and HFO-1234yf, it is preferred that HFO-1132 (E) be present in an amount of 31.1 to 37.9 mass %, and HFO-1234yf be present in an amount of 68.9 to 62.1 mass %, based on the total mass of HFO-1132 (E) and HFO-1234yf. In this case, Refrigerant 3 has the above feature and thus has the following characteristics: (1) the GWP is sufficiently low (100 or less); (2) it has a COP of 92% or more relative to that of R134a; (3) it has a refrigerating capacity of 150% or more relative to that of R134a; (4) the discharge temperature is 90.0° C. or less; and (5) the critical temperature is 81° C. or more.

When Refrigerant 3 consists of HFO-1132 (E) and HFO-1234yf, it is more preferred that HFO-1132 (E) be present in an amount of 32.0 to 37.9 mass %, and HFO-1234yf be present in an amount of 68.0 to 62.1 mass %, based on the total mass of HFO-1132 (E) and HFO-1234yf. In this case, Refrigerant 3 has the above feature and thus has the following characteristics: (1) the GWP is sufficiently low (100 or less); (2) it has a COP of 92% or more relative to that of R134a; (3) it has a refrigerating capacity of 151% or more relative to that of R134a; (4) the discharge temperature is 90.0° C. or less; and (5) the critical temperature is 81° C. or more.

When Refrigerant 3 consists of HFO-1132 (E) and HFO-1234yf, it is even more preferred that HFO-1132 (E) be present in an amount of 33.0 to 37.9 mass %, and HFO-1234yf be present in an amount of 67.0 to 62.1 mass %, based on the total mass of HFO-1132 (E) and HFO-1234yf. In this case, Refrigerant 3 has the above feature and thus has the following characteristics: (1) the GWP is sufficiently low (100 or less); (2) it has a COP of 92% or more relative to that of R134a; (3) it has a refrigerating capacity of 152% or more relative to that of R134a; (4) the discharge temperature is 90.0° C. or less; and (5) the critical temperature is 81° C. or more.

When Refrigerant 3 consists of HFO-1132 (E) and HFO-1234yf, it is further preferred that HFO-1132 (E) be present in an amount of 34.0 to 37.9 mass %, and HFO-1234yf be present in an amount of 66.0 to 62.1 mass %, based on the total mass of HFO-1132 (E) and HFO-1234yf. In this case, Refrigerant 3 has the above feature and thus has the following characteristics: (1) the GWP is sufficiently low (100 or less); (2) it has a COP of 92% or more relative to that of R134a; (3) it has a refrigerating capacity of 153% or more relative to that of R134a; (4) the discharge temperature is 90.0° C. or less; and (5) the critical temperature is 81° C. or more.

When Refrigerant 3 consists of HFO-1132 (E) and HFO-1234yf, it is particularly preferred that HFO-1132(E) be present in an amount of 35.0 to 37.9 mass %, and HFO-1234yf be present in an amount of 65.0 to 62.1 mass %, based on the total mass of HFO-1132 (E) and HFO-1234yf. In this case, Refrigerant 3 has the above feature and thus has the following characteristics: (1) the GWP is sufficiently low (100 or less); (2) it has a COP of 92% or more relative to that of R134a; (3) it has a refrigerating capacity of 155% or more relative to that of R134a; (4) the discharge temperature is 90.0° C. or less; and (5) the critical temperature is 81° C. or more.

1.4 Refrigerant 4

In an embodiment, the refrigerant contained in the composition according to the present disclosure comprises HFO-1132 (E) and HFO-1234yf, wherein HFO-1132 (E) is present in an amount of 21.0 to 28.4 mass %, and HFO-1234yf is present in an amount of 79.0 to 71.6 mass %, based on the total mass of HFO-1132 (E) and HFO-1234yf. This refrigerant may be referred to as "Refrigerant 4."

Refrigerant 4 has the above feature and thus has the following characteristics: (1) the GWP is sufficiently low (100 or less); (2) it has a COP almost equivalent to that of R1234yf; (3) it has a refrigerating capacity of 140% or more relative to that of R1234yf; and (4) it is slightly flammable according to ASHRAE standards (Class 2L). Further, in this case, Refrigerant 4 has a saturation pressure of 0.380 MPa or more and 0.420 MPa or less at a saturation temperature of −10° C., and is thus applicable to commercially available refrigeration apparatuses for R1234yf without significant design change.

Since Refrigerant 4 comprises HFO-1132 (E) in an amount of 21.0 mass % or more based on the total mass of HFO-1132 (E) and HFO-1234yf, Refrigerant 4 has a refrigerating capacity of 140% or more relative to that of R1234yf. Moreover, Refrigerant 4 comprises HFO-1132 (E) in an amount of 28.4 mass % or less based on the total mass of HFO-1132 (E) and HFO-1234yf. This makes it easy to ensure a critical temperature of 83.5° C. or more.

Refrigerant 4 may have a refrigerating capacity of 140% or more, preferably 142% or more, more preferably 143% or more, even more preferably 145% or more, and particularly preferably 146% or more, relative to that of R1234yf.

Since the GWP is 100 or less, Refrigerant 4 can notably reduce the burden on the environment from a global warming perspective, compared with other general-purpose refrigerants.

In Refrigerant 4, the ratio of refrigerating capacity to power consumed in a refrigeration cycle (coefficient of performance (COP)) relative to that of R1234yf is preferably high from the viewpoint of energy consumption efficiency. Specifically, the COP relative to that of R1234yf is preferably 95% or more, more preferably 96% or more, even more preferably 97% or more, and particularly preferably 98% or more.

In Refrigerant 4, it is preferred that HFO-1132 (E) be present in an amount of 21.5 to 28.0 mass %, and HFO-1234yf be present in an amount of 78.5 to 72.0 mass %, based on the total mass of HFO-1132 (E) and HFO-1234yf. In this case, Refrigerant 4 has the following characteristics: the GWP is 100 or less; it has a COP of 98% or more relative to that of R1234yf; it has a refrigerating capacity of 140% or more relative to that of R1234yf; it is slightly flammable according to ASHRAE standards (Class 2L); the discharge temperature is 65.0° C. or less; and the critical temperature is 83.5° C. or more. Further, in this case, Refrigerant 4 has a saturation pressure of 0.383 MPa or more and 0.418 MPa or less at a saturation temperature of −10° C., and is thus applicable to commercially available refrigeration apparatuses for R1234yf without significant design change.

In Refrigerant 4, it is more preferred that HFO-1132 (E) be present in an amount of 22.0 to 27.7 mass %, and HFO-1234yf be present in an amount of 78.0 to 72.3 mass %, based on the total mass of HFO-1132 (E) and HFO-1234yf. In this case, Refrigerant 4 has the following characteristics: the GWP is 100 or less; it has a COP of 98% or more relative to that of R1234yf; it has a refrigerating capacity of 140% or more relative to that of R1234yf; it is slightly flammable according to ASHRAE standards (Class 2L); the discharge temperature is 65.0° C. or less; and the critical temperature is 83.5° C. or more. Further, in this case, Refrigerant 4 has a saturation pressure of 0.385 MPa or more and 0.417 MPa or less at a saturation temperature of −10° C., and is thus applicable to commercially available refrigeration apparatuses for R1234yf without significant design change.

In Refrigerant 4, it is even more preferred that HFO-1132 (E) be present in an amount of 22.5 to 27.5 mass %, and HFO-1234yf be present in an amount of 77.5 to 72.5 mass %, based on the total mass of HFO-1132 (E) and HFO-1234yf. In this case, Refrigerant 4 has the following characteristics: the GWP is 100 or less; it has a COP of 98% or more relative to that of R1234yf; it has a refrigerating capacity of 140% or more relative to that of R1234yf; it is slightly flammable according to ASHRAE standards (Class 2L); the discharge temperature is 64.8° C. or less; and the critical temperature is 83.8° C. or more. Further, in this case, Refrigerant 4 has a saturation pressure of 0.388 MPa or more and 0.414 MPa or less at a saturation temperature of −10° C., and is thus applicable to commercially available refrigeration apparatuses for R1234yf without significant design change.

In Refrigerant 4, it is particularly preferred that HFO-1132 (E) be present in an amount of 23.0 to 27.2 mass %, and HFO-1234yf be present in an amount of 77.0 to 72.8 mass %, based on the total mass of HFO-1132 (E) and HFO-1234yf. In this case, Refrigerant 4 has the following characteristics: the GWP is 100 or less; it has a COP of 98% or more relative to that of R1234yf; it has a refrigerating capacity of 141% or more relative to that of R1234yf; it is slightly flammable according to ASHRAE standards (Class 2L); the discharge temperature is 64.8° C. or less; and the critical temperature is 83.8° C. or more. Further, in this case, Refrigerant 4 has a saturation pressure of 0.390 MPa or more and 0.414 MPa or less at a saturation temperature of −10° C., and is thus applicable to commercially available refrigeration apparatuses for R1234yf without significant design change.

In Refrigerant 4, it is further particularly preferred that HFO-1132 (E) be present in an amount of 23.5 to 27.0 mass %, and HFO-1234yf be present in an amount of 76.5 to 73.0 mass %, based on the total mass of HFO-1132 (E) and HFO-1234yf. In this case, Refrigerant 4 has the following characteristics: the GWP is 100 or less; it has a COP of 98% or more relative to that of R1234yf; it has a refrigerating capacity of 142% or more relative to that of R1234yf; it is slightly flammable according to ASHRAE standards (Class 2L); the discharge temperature is 64.8° C. or less; and the critical temperature is 83.8° C. or more. Further, in this case, Refrigerant 4 has a saturation pressure of 0.390 MPa or more and 0.414 MPa or less at a saturation temperature of −10° C., and is thus applicable to commercially available refrigeration apparatuses for R1234yf without significant design change.

In Refrigerant 4, it is most preferred that HFO-1132 (E) be present in an amount of 24.0 to 26.7 mass %, and HFO-1234yf be present in an amount of 76.0 to 73.3 mass %, based on the total mass of HFO-1132 (E) and HFO-1234yf. In this case, Refrigerant 4 has the following characteristics: the GWP is 100 or less; it has a COP of 98% or more relative to that of R1234yf; it has a refrigerating capacity of 144% or more relative to that of R1234yf; it is slightly flammable according to ASHRAE standards (Class 2L); the discharge temperature is 64.6° C. or less; and the critical temperature is 84.0° C. or more. Further, in this case, Refrigerant 4 has a saturation pressure of 0.396 MPa or more and 0.411 MPa or less at a saturation temperature of −10° C., and is thus applicable to commercially available refrigeration apparatuses for R1234yf without significant design change.

In Refrigerant 4, the saturation pressure at a saturation temperature of −10° C. is usually 0.420 MPa or less, preferably 0.418 MPa or less, more preferably 0.417 MPa or less, even more preferably 0.415 MPa or less, and particularly preferably 0.413 MPa or less. When the saturation pressure is within this range, Refrigerant 4 is applicable to commercially available refrigeration apparatuses for R1234yf without significant design change.

In Refrigerant 4, the saturation pressure at a saturation temperature of −10° C. is usually 0.380 MPa or more, preferably 0.385 MPa or more, more preferably 0.390 MPa or more, even more preferably 0.400 MPa or more, and particularly preferably 0.410 MPa or more. In these cases, Refrigerant 4 is applicable to commercially available refrigeration apparatuses for R1234yf without significant design change.

In the present disclosure, when Refrigerant 4 is used for operating a refrigeration cycle, the discharge temperature is preferably 65° C. or less, more preferably 64.8° C. or less, even more preferably 64.7° C. or less, and particularly preferably 64.5° C. or less, from the viewpoint of extending the life of the components of a commercially available refrigeration apparatus for R1234yf.

In the present disclosure, Refrigerant 4 is preferably used for operating a refrigeration cycle in which the evaporation temperature is −75 to 20° C., from the viewpoint of obtaining a refrigerating capacity of 140% or more relative to that of R1234yf.

In a refrigeration cycle in which Refrigerant 4 according to the present disclosure is used, the evaporation temperature is preferably 20° C. or less, more preferably 15° C. or less, even more preferably 10° C. or less, and particularly preferably 5° C. or less, from the viewpoint of obtaining a refrigerating capacity of 140% or more relative to that of R1234yf.

In a refrigeration cycle in which Refrigerant 4 according to the present disclosure is used, the evaporation temperature is preferably −75° C. to 20° C., more preferably −65° C. to 15° C., even more preferably −60° C. to 10° C., further preferably −55° C. to 7.5° C., and particularly preferably −50° C. to 5° C., from the viewpoint of obtaining a refrigerating capacity of 140% or more relative to that of R1234yf.

In a refrigeration cycle in which Refrigerant 4 according to the present disclosure is used, the evaporation temperature is preferably −75° C. or more and 20° C. or less, more preferably −65° C. or more and 10° C. or less, further preferably −60° C. or more and 5° C. or less, even more preferably −55° C. or more and 0° C. or less, and particularly preferably −50° C. or more and −5° C. or less, from the viewpoint of obtaining a refrigerating capacity of 140% or more relative to that of R1234yf.

In a refrigeration cycle in which Refrigerant 4 according to the present disclosure is used, the discharge temperature is preferably 65.0° C. or less, more preferably 64.9° C. or less, even more preferably 64.8° C. or less, and particularly preferably 64.7° C. or less, from the viewpoint of extending the life of the components of a commercially available refrigeration apparatus for R1234yf.

In the present disclosure, when Refrigerant 4 is used for operating a refrigeration cycle, the refrigeration cycle requires the process of liquefying (condensing) the refrigerant; thus, the critical temperature needs to be notably higher than the temperature of cooling water or cooling air for liquefying the refrigerant. From this viewpoint, in a refrigeration cycle in which Refrigerant 4 according to the present disclosure is used, the critical temperature is preferably 83.5° C. or more, more preferably 83.8° C. or more, even more preferably 84.0° C. or more, and particularly preferably 84.5° C. or more.

Refrigerant 4 may further comprise an additional refrigerant in addition to HFO-1132 (E) and HFO-1234yf as long as the above characteristics are not impaired. In this case, the content of the additional refrigerant is preferably 0.5 mass % or less, more preferably 0.3 mass % or less, even more preferably 0.2 mass % or less, and particularly preferably 0.1 mass % or less, of entire Refrigerant 4. The additional refrigerant is not limited and may be selected from a wide range of known refrigerants widely used in the field. Refrigerant 4 may comprise one additional refrigerant or two or more additional refrigerants.

It is particularly preferred that Refrigerant 4 consist of HFO-1132 (E) and HFO-1234yf. In other words, the total concentration of HFO-1132 (E) and HFO-1234yf in Refrigerant 4 is particularly preferably 100 mass % of entire Refrigerant 4.

When Refrigerant 4 consists of HFO-1132 (E) and HFO-1234yf, HFO-1132 (E) is usually present in an amount of 21.0 to 28.4 mass %, and HFO-1234yf is usually present in an amount of 79.0 to 71.6 mass %, based on the total mass of HFO-1132 (E) and HFO-1234yf. Refrigerant 4 has the above feature and thus has the following characteristics: (1) the GWP is sufficiently low (100 or less); (2) it has a COP almost equivalent to that of R1234yf; (3) it has a refrigerating capacity of 140% or more relative to that of R1234yf; and (4) it is slightly flammable according to ASHRAE standards (Class 2L). Further, in this case, Refrigerant 4 has a saturation pressure of 0.380 MPa or more and 0.420 MPa or less at a saturation temperature of −10° C. and is thus applicable to commercially available refrigeration apparatuses for R1234yf without significant design change.

When Refrigerant 4 consists of HFO-1132 (E) and HFO-1234yf, it is preferred that HFO-1132 (E) be present in an amount of 21.5 to 28.0 mass %, and HFO-1234yf be present in an amount of 78.5 to 72.0 mass %, based on the total mass of HFO-1132 (E) and HFO-1234yf. In this case, Refrigerant 4 has the following characteristics: the GWP is 100 or less; it has a COP of 98% or more relative to that of R1234yf; it has a refrigerating capacity of 140% or more relative to that of R1234yf; it is slightly flammable according to ASHRAE standards (Class 2L); the discharge temperature is 65.0° C. or less; and the critical temperature is 83.5° C. or more. Further, in this case, Refrigerant 4 has a saturation pressure of 0.383 MPa or more and 0.418 MPa or less at a saturation temperature of −10° C. and is thus applicable to commercially available refrigeration apparatuses for R1234yf without significant design change.

When Refrigerant 4 consists of HFO-1132 (E) and HFO-1234yf, it is more preferred that HFO-1132 (E) be present in an amount of 22.0 to 27.7 mass %, and HFO-1234yf be present in an amount of 78.0 to 72.3 mass %, based on the total mass of HFO-1132 (E) and HFO-1234yf. In this case, Refrigerant 4 has the following characteristics: the GWP is 100 or less; it has a COP of 98% or more relative to that of R1234yf; it has a refrigerating capacity of 140% or more relative to that of R1234yf; it is slightly flammable according to ASHRAE standards (Class 2L); the discharge temperature is 65.0° C. or less; and the critical temperature is 83.5° C. or more. Further, in this case, Refrigerant 4 has a saturation pressure of 0.385 MPa or more and 0.417 MPa or less at a saturation temperature of −10° C., and is thus applicable to commercially available refrigeration apparatuses for R1234yf without significant design change.

When Refrigerant 4 consists of HFO-1132 (E) and HFO-1234yf, it is even more preferred that HFO-1132 (E) be present in an amount of 22.5 to 27.5 mass %, and HFO-1234yf be present in an amount of 77.5 to 72.5 mass %, based on the total mass of HFO-1132 (E) and HFO-1234yf. In this case, Refrigerant 4 has the following characteristics: the GWP is 100 or less; it has a COP of 98% or more relative to that of R1234yf; it has a refrigerating capacity of 140% or more relative to that of R1234yf; it is slightly flammable according to ASHRAE standards (Class 2L); the discharge temperature is 64.8° C. or less; and the critical temperature is 83.8° C. or more. Further, in this case, Refrigerant 4 has a saturation pressure of 0.388 MPa or more and 0.414 MPa or less at a saturation temperature of −10° C., and is thus applicable to commercially available refrigeration apparatuses for R1234yf without significant design change.

When Refrigerant 4 consists of HFO-1132 (E) and HFO-1234yf, it is particularly preferred that HFO-1132 (E) be present in an amount of 23.0 to 27.2 mass %, and HFO-1234yf be present in an amount of 77.0 to 72.8 mass %, based on the total mass of HFO-1132 (E) and HFO-1234yf. In this case, Refrigerant 4 has the following characteristics: the GWP is 100 or less; it has a COP of 98% or more relative to that of R1234yf; it has a refrigerating capacity of 141% or more relative to that of R1234yf; it is slightly flammable according to ASHRAE standards (Class 2L); the discharge temperature is 64.8° C. or less; and the critical temperature is 83.8° C. or more. Further, in this case, Refrigerant 4 has a saturation pressure of 0.390 MPa or more and 0.414 MPa or less at a saturation temperature of −10° C., and is thus applicable to commercially available refrigeration apparatuses for R1234yf without significant design change.

When Refrigerant 4 consists of HFO-1132 (E) and HFO-1234yf, it is further particularly preferred that HFO-1132 (E) be present in an amount of 23.5 to 27.0 mass %, and HFO-1234yf be present in an amount of 76.5 to 73.0 mass %, based on the total mass of HFO-1132 (E) and HFO-1234yf. In this case, Refrigerant 4 has the following characteristics: the GWP is 100 or less; it has a COP of 98% or more relative to that of R1234yf; it has a refrigerating capacity of 142% or more relative to that of R1234yf; it is slightly flammable according to ASHRAE standards (Class 2L); the discharge temperature is 64.8° C. or less; and the critical temperature is 83.8° C. or more. Further, in this case, Refrigerant 4 has a saturation pressure of 0.390 MPa or more and 0.414 MPa or less at a saturation temperature of −10° C., and is thus applicable to commercially available refrigeration apparatuses for R1234yf without significant design change. When Refrigerant 4 consists of HFO-1132 (E) and HFO-1234yf, it is most preferred that HFO-1132 (E) be present in an amount of 24.0 to 26.7 mass %, and HFO-1234yf be present in an amount of 76.0 to 73.3 mass %, based on the total mass of HFO-1132 (E) and HFO-1234yf. In this case, Refrigerant 4 has the following characteristics: the GWP is 100 or less; it has a COP of 98% or more relative to that of R1234yf; it has a refrigerating capacity of 144% or more relative to that of R1234yf; it is slightly flammable according to ASHRAE standards (Class 2L); the discharge temperature is 64.6° C. or less; and the critical temperature is 84.0° C. or more. Further, in this case, Refrigerant 4 has a saturation pressure of 0.396 MPa or more and 0.411 MPa or less at a saturation temperature of −10° C., and is thus applicable to commercially available refrigeration apparatuses for R1234yf without significant design change.

Refrigerant 5 according to the present disclosure is described below.

Technical Description

First, before describing Refrigerant 5, the difference between gasoline vehicles and electric vehicles, and the advantages of heat pumps, are explained.

Difference Between Gasoline Vehicles and Electric Vehicles

Gasoline vehicles reuse engine exhaust heat to provide warm air for the heating function, whereas electric vehicles do not have a heat source to be reused and thus use electrical power for heating. In conventional air conditioners using an electric heater, the use of the heater directly leads to power consumption, which significantly reduces the actual driving range. Heat pumps, which warm the interior using the temperature difference between a refrigerant and the outside air, achieve a heating effect that is higher than the power consumed, making it possible to warm the interior of a vehicle with less power than before.

Advantages of Heat Pumps

During heating, the following steps are taken: (a) a step of compressing refrigerant gas, which is evaporated by absorbing heat from the outside in a heat exchanger, in a compressor to form high-temperature, high-pressure gas, and (b) converting the cold air inside a vehicle into warm air by heat exchange and blowing the warm air into the vehicle from the air-conditioner vents. This corresponds to the reverse cycle to a cycle in which heat absorbed from the interior of a vehicle is released from an outdoor heat exchanger to provide a cooling and heating function in the summer. Heat pumps, which can be used for both cooling and heating with one refrigerant circuit, are characterized by a higher coefficient of performance (COP) than that of heating with conventional electric heaters.

1.5 Refrigerant 5

In an embodiment, the refrigerant contained in the composition according to the present disclosure comprises HFO-1132 (E) and HFO-1234yf, wherein HFO-1132 (E) is present in an amount of 12.1 to 72.0 mass %, and HFO-1234yf is present in an amount of 87.9 to 28.0 mass %, based on the total mass of HFO-1132 (E) and HFO-1234yf. This refrigerant may be referred to as "Refrigerant 5."

In the present disclosure, Refrigerant 5 is used for an air-conditioning system for vehicles.

Refrigerant 5 has the above feature and thus has the following characteristics: (1) the GWP is sufficiently low (100 or less); (2) it has a COP almost equivalent to that of R1234yf; (3) it has a refrigerating capacity of 128% or more relative to that of R1234yf; and (4) the burning rate is less than 10.0 cm/s.

Refrigerant 5 comprises HFO-1132 (E) in an amount of 12.1 mass % or more based on the total mass of HFO-1132 (E) and HFO-1234yf. This makes it possible to ensure a boiling point of −40° C. or less, which is advantageous when an electric vehicle is heated using a heat pump. A boiling point of −40° C. or less means that the saturation pressure is equal to or higher than atmospheric pressure at −40° C. For the above application, a lower boiling point that is not higher than −40° C. is preferred.

Since the boiling point of HFO-1234yf is −29° C., the saturation pressure at an evaporation temperature of −30° C. or lower is equal to or less than atmospheric pressure. Therefore, there is a problem in that heating operation cannot be performed using a heat pump in an electric vehicle. Even if heating operation can be performed, there is a problem in that the suction pressure to the compressor is very low, which results in insufficient refrigeration capacity, thus taking a long period of time for heating. In this case, since a heat pump, which is highly efficient for heating, cannot be used in electric vehicles, there is a problem in that heating must be performed using an inefficient electric heater. In contrast, with a refrigerant having a boiling point of −40° C. or lower, heating operation can be performed using a heat pump in electric vehicles at an evaporation temperature up to −40° C. Therefore, heating operation using a heat pump can be made possible in electric vehicles in almost every region of the world.

Refrigerant 5 comprises HFO-1132 (E) in an amount of 72.0 mass % or less based on the total mass of HFO-1132 (E) and HFO-1234yf. This makes it possible to ensure a burning rate of less than 10.0 cm/s, which contributes to safety when used for an air-conditioning system for vehicles.

Refrigerant 5 may have a refrigerating capacity of 128% or more, preferably 130% or more, more preferably 140% or more, even more preferably 150% or more, and particularly preferably 160% or more, relative to that of R1234yf.

Since the GWP is 5 or more and 100 or less, Refrigerant 5 can notably reduce the burden on the environment from a global warming perspective, compared with other general-purpose refrigerants.

In Refrigerant 5, the ratio of refrigerating capacity to power consumed in a refrigeration cycle (coefficient of performance (COP)) relative to that of R1234yf may be 100% or more from the viewpoint of energy consumption efficiency.

The use of Refrigerant 5 for an air-conditioning system for vehicles enables heating with a heat pump, which consumes less power than electric heaters.

The air-conditioning system for which Refrigerant 5 is used is preferably for gasoline vehicles, hybrid vehicles, electric vehicles, or hydrogen vehicles. From the viewpoint of improving the travel distance of a vehicle while the interior of the vehicle is heated with a heat pump, the air-conditioning system for which Refrigerant 5 is used is particularly preferably for electric vehicles among these. Specifically, in the present disclosure, Refrigerant 5 is particularly preferably used for electric vehicles.

In the present disclosure, Refrigerant 5 is used for air-conditioning systems for vehicles. In the present disclosure, Refrigerant 5 is preferably used for air-conditioning systems for gasoline vehicles, air-conditioning systems for hybrid vehicles, air-conditioning systems for electric vehicles, or air-conditioning systems for hydrogen vehicles. In the present disclosure, Refrigerant 5 is particularly preferably used for air-conditioning systems for electric vehicles.

In the present disclosure, Refrigerant 5 is preferably used for the refrigeration apparatus for vehicles, such as gasoline vehicles, hybrid vehicles, plug-in hybrid vehicles, electric vehicles, hydrogen vehicles, and fuel cell vehicles. Of these, Refrigerant 5 is particularly preferably used for the refrigeration apparatus for electric vehicles, in which engine exhaust heat cannot be used.

Further, in a situation in which the engine exhaust heat cannot be used due to, for example, defects in the thermostat when the engine starts, the use of heat pump heating with Refrigerant 5 can immediately warm the inside of vehicles even when the vehicles are gasoline vehicles, hybrid vehicles, plug-in hybrid vehicles, hydrogen vehicles, and fuel cell vehicles.

In the present disclosure, Refrigerant 5 has a boiling point of preferably −51.2 to −40.0° C., more preferably −50.0 to −42.0° C., and even more preferably −48.0 to −44.0° C., since a pressure equal to or higher than atmospheric pressure at −40° C. is required when the interior of a vehicle is heated using a heat pump.

In Refrigerant 5, it is preferred that HFO-1132 (E) be present in an amount of 15.0 to 65.0 mass %, and HFO-1234yf be present in an amount of 85.0 to 35.0 mass %, based on the total mass of HFO-1132 (E) and HFO-1234yf.

In Refrigerant 5, it is more preferred that HFO-1132 (E) be present in an amount of 20.0 to 55.0 mass %, and HFO-1234yf be present in an amount of 80.0 to 45.0 mass %, based on the total mass of HFO-1132 (E) and HFO-1234yf.

In Refrigerant 5, it is even more preferred that HFO-1132 (E) be present in an amount of 25.0 to 50.0 mass %, and HFO-1234yf be present in an amount of 75.0 to 50.0 mass %, based on the total mass of HFO-1132 (E) and HFO-1234yf.

In Refrigerant 5, it is particularly preferred that HFO-1132 (E) be present in an amount of 30.0 to 45.0 mass %, and HFO-1234yf be present in an amount of 70.0 to 55.0 mass %, based on the total mass of HFO-1132 (E) and HFO-1234yf.

In Refrigerant 5, it is most preferred that HFO-1132 (E) be present in an amount of 35.0 to 40.0 mass %, and HFO-1234yf be present in an amount of 65.0 to 60.0 mass %, based on the total mass of HFO-1132 (E) and HFO-1234yf.

In the present disclosure, the burning rate of Refrigerant 5 is preferably less than 10.0 cm/s, more preferably less than 5.0 cm/s, even more preferably less than 3.0 cm/s, and particularly preferably less than 2.0 cm/s.

In the present disclosure, Refrigerant 5 is preferably used for operating a refrigeration cycle in which the evaporation temperature is −40 to 10° C. from the viewpoint of obtaining a refrigerating capacity equivalent to or higher than that of R1234yf.

In the present disclosure, when Refrigerant 5 is used for operating a refrigeration cycle, the discharge temperature is preferably 79° C. or less, more preferably 75° C. or less, even more preferably 70° C. or less, and particularly preferably 67° C. or less.

Refrigerant 5 may comprise HFO-1132 (E) and HFO-1234yf in such amounts that the sum of their concentrations is usually 99.5 mass % or more. In the present disclosure, the total amount of HFO-1132 (E) and HFO-1234yf is preferably 99.7 mass % or more, more preferably 99.8 mass % or more, and even more preferably 99.9 mass % or more, of entire Refrigerant 5.

Refrigerant 5 may further comprise an additional refrigerant in addition to HFO-1132 (E) and HFO-1234yf as long as the above characteristics are not impaired. In this case, the content of the additional refrigerant is preferably 0.5 mass % or less, more preferably 0.3 mass % or less, even more preferably 0.2 mass % or less, and particularly preferably 0.1 mass % or less, of entire Refrigerant 5. The additional refrigerant is not limited and may be selected from a wide range of known refrigerants widely used in the field. Refrigerant 5 may comprise one additional refrigerant or two or more additional refrigerants.

It is particularly preferred that Refrigerant 5 consist of HFO-1132 (E) and HFO-1234yf. In other words, the total concentration of HFO-1132 (E) and HFO-1234yf in Refrigerant 5 is particularly preferably 100 mass % of entire Refrigerant 5.

When Refrigerant 5 consists of HFO-1132 (E) and HFO-1234yf, HFO-1132 (E) is usually present in an amount of 12.1 to 72.0 mass %, and HFO-1234yf is usually present in an amount of 87.9 to 28.0 mass %, based on the total mass of HFO-1132 (E) and HFO-1234yf.

When Refrigerant 5 consists of HFO-1132 (E) and HFO-1234yf, it is preferred that HFO-1132 (E) be present in an amount of 15.0 to 65.0 mass %, and HFO-1234yf be present in an amount of 85.0 to 35.0 mass %, based on the total mass of HFO-1132 (E) and HFO-1234yf.

When Refrigerant 5 consists of HFO-1132 (E) and HFO-1234yf, it is more preferred that HFO-1132 (E) be present in an amount of 20.0 to 55.0 mass %, and HFO-1234yf be present in an amount of 80.0 to 45.0 mass %, based on the total mass of HFO-1132 (E) and HFO-1234yf.

When Refrigerant 5 consists of HFO-1132 (E) and HFO-1234yf, it is even more preferred that HFO-1132 (E) be present in an amount of 25.0 to 50.0 mass %, and HFO-1234yf be present in an amount of 75.0 to 50.0 mass %, based on the total mass of HFO-1132 (E) and HFO-1234yf.

When Refrigerant 5 consists of HFO-1132 (E) and HFO-1234yf, it is particularly preferred that HFO-1132 (E) be present in an amount of 30.0 to 45.0 mass %, and HFO-1234yf be present in an amount of 70.0 to 55.0 mass %, based on the total mass of HFO-1132 (E) and HFO-1234yf.

When Refrigerant 5 consists of HFO-1132 (E) and HFO-1234yf, it is most preferred that HFO-1132 (E) be present in an amount of 35.0 to 40.0 mass %, and HFO-1234yf be present in an amount of 65.0 to 60.0 mass %, based on the total mass of HFO-1132 (E) and HFO-1234yf.

1.6 Application

The composition containing the refrigerant according to the present disclosure can be widely used as a working fluid for known refrigerant applications in 1) a refrigeration method comprising operating a refrigeration cycle and 2) a method for operating a refrigeration apparatus that operates a refrigeration cycle.

The refrigeration cycle herein means performing energy conversion by circulating in the refrigeration apparatus the refrigerant (Refrigerant 1, 2, 3, 4, or 5 according to the present disclosure) in the state of the single refrigerant, or in the state of a refrigerant composition or a refrigerant-oil-containing working fluid explained below, through a compressor.

The composition containing the refrigerant according to the present disclosure is not limited; however, it is suitably used in a vapor-compression refrigeration cycle. A vapor-compression refrigeration cycle comprises a series of cycles of (1) compressing a refrigerant in a gaseous state in a compressor, (2) cooling the refrigerant to convert it into a high-pressure liquid state in a condenser, (3) reducing the pressure with an expansion valve, and (4) evaporating the liquid refrigerant at a low temperature in an evaporator and removing heat by the heat of evaporation. Depending on the system of compressing gaseous refrigerants, vapor-compression refrigeration cycles can be classified into a turbo (centrifugal) cycle, a reciprocating cycle, a twin-screw cycle, a single-screw cycle, a scroll compressor cycle, etc., and can be selected according to heat capacity, compression ratio, and size.

The composition containing the refrigerant according to the present disclosure is not limited, and is suitable as a refrigerant used for large chiller refrigerators, and particularly turbo (centrifugal) compressors.

The present disclosure includes use of the refrigerant (or composition comprising the refrigerant) according to the present disclosure in a refrigeration method, use of the refrigerant (or composition comprising the refrigerant) according to the present disclosure in a method of operating a refrigeration apparatus etc., and a refrigeration apparatus or the like comprising the refrigerant (or composition comprising the refrigerant) according to the present disclosure.

The composition comprising Refrigerant 1 according to the present disclosure is used for operating a refrigeration cycle in which the evaporation temperature is −75 to −5° C.

By using the composition comprising Refrigerant 1 according to the present disclosure for operating a refrigeration cycle in which the evaporation temperature is −75 to −5° C., there is an advantage that a refrigerating capacity that is equivalent to or higher than that of R404A can be obtained. In the refrigeration cycle in which the composition comprising Refrigerant 1 according to the present disclosure is used, the evaporation temperature is preferably −65° C. to −5° C., more preferably −60° C. to −7.5° C., even more preferably −55° C. to −10° C., and particularly preferably −50° C. to −35° C.

In the refrigeration cycle in which the composition comprising Refrigerant 1 according to the present disclosure is used, the evaporation temperature is preferably −7.5° C. or less, more preferably −10° C. or less, even more preferably −35° C. or less.

In the refrigeration cycle in which the composition comprising Refrigerant 1 according to the present disclosure is used, the evaporation temperature is preferably −65° C. or more, more preferably −60° C. or more, even more preferably −55° C. or more, and particularly preferably −50° C. or more.

From the viewpoint of obtaining a refrigerating capacity that is equivalent to or higher than R404A, the composition comprising Refrigerant 2 according to the present disclosure is preferably used for operating a refrigeration cycle in which the evaporation temperature is −75 to 15° C. In the refrigeration cycle in which the composition comprising Refrigerant 2 according to the present disclosure is used, the evaporation temperature is preferably −65° C. to 10° C., more preferably −60° C. to 5° C., even more preferably −55° C. to 0° C., and particularly preferably −50° C. to −5° C.

In the refrigeration cycle in which the composition comprising Refrigerant 2 according to the present disclosure is used, the evaporation temperature is preferably 15° C. or less, more preferably 5° C. or less, even more preferably 0° C. or less, and particularly preferably −5° C. or less.

In the refrigeration cycle in which the composition comprising Refrigerant 2 according to the present disclosure is used, the evaporation temperature is preferably −65° C. or more, more preferably −60° C. or more, even more preferably −55° C. or more, and particularly preferably −50° C. or more.

From the viewpoint of obtaining a refrigerating capacity that is equivalent to or higher than R134a, the composition comprising Refrigerant 3 according to the present disclosure is preferably used for operating a refrigeration cycle in which the evaporation temperature is −75 to 15° C. In the refrigeration cycle in which the composition comprising Refrigerant 3 according to the present disclosure is used, the evaporation temperature is preferably −65° C. to 15° C., more preferably −60° C. to 5° C., even more preferably −55° C. to 0° C., and particularly preferably −50° C. to −5° C.

In the refrigeration cycle in which the composition comprising Refrigerant 3 according to the present disclosure is used, the evaporation temperature is preferably 15° C. or less, more preferably 5° C. or less, even more preferably 0° C. or less, and particularly preferably −5° C. or less.

In the refrigeration cycle in which the composition comprising Refrigerant 3 according to the present disclosure is used, the evaporation temperature is preferably −65° C. or more, more preferably −60° C. or more, even more preferably −55° C. or more, and particularly preferably −50° C. or more.

In the refrigeration cycle in which the composition comprising Refrigerant 3 according to the present disclosure is used, the evaporation temperature is preferably −65° C. or more to 15° C. or less, more preferably −60° C. or more to 5° C. or less, even more preferably −55° C. or more to 0° C. or less, and particularly preferably −50° C. or more to −5° C. or less.

From the viewpoint of obtaining a refrigerating capacity of 140% or more relative to that of R1234yf, the composition comprising Refrigerant 4 according to the present disclosure is preferably used for operating a refrigeration cycle in which the evaporation temperature is −75 to 20° C. In the refrigeration cycle in which the composition comprising Refrigerant 4 according to the present disclosure is used, the evaporation temperature is preferably −65° C. to 15° C., more preferably −60° C. to 10° C., even more preferably −55° C. to 7.5° C., and particularly preferably −50° C. to 5° C.

From the viewpoint of obtaining a refrigerating capacity of 140% or more relative to that of R1234yf, in the refrigeration cycle in which the composition comprising Refrigerant 4 according to the present disclosure is used, the evaporation temperature is preferably 20° C. or less, more preferably 15° C. or less, even more preferably 10° C. or less, and particularly preferably 5° C. or less.

From the viewpoint of obtaining a refrigerating capacity of 140% or more relative to that of R1234yf, in the refrigeration cycle in which the composition comprising Refrigerant 4 according to the present disclosure is used, the evaporation temperature is preferably −75° C. or more, more preferably −60° C. or more, even more preferably −55° C. or more, and particularly preferably −50° C. or more.

Preferable examples of refrigeration apparatuses in which Refrigerant 1, 2, 3, or 4 (or a composition containing the refrigerant) according to the present disclosure can be used include air-conditioning systems, refrigerators, freezers, water coolers, ice makers, refrigerated showcases, freezing showcases, freezing and refrigerating units, refrigerating machines for freezing and refrigerating warehouses, air-conditioning systems for vehicles, turbo refrigerating machines, or screw refrigerating machines. Of these, air-conditioning systems for vehicles are preferred. Of the air-conditioning systems for vehicles, air-conditioning systems for gas vehicles, air-conditioning systems for hybrid vehicles, air-conditioning systems for electric vehicles, and air-conditioning systems for hydrogen vehicles are more preferred. Of the air-conditioning systems for vehicles, air-conditioning systems for electric vehicles are particularly preferred.

The composition comprising Refrigerant 1 or 2 according to the present disclosure is suitably used as an alternative refrigerant for R12, R22, R134a, R404A, R407A, R407C, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R465A, R502, R507, or R513A. The composition comprising Refrigerant 1 or 2 according to the present disclosure is suitably used as an alternative refrigerant for R22, R404A, R407F, R407H, R448A, R449A, R454C, R455A, or R465A. Additionally, since the composition comprising Refrigerant 1 or 2 according to the present disclosure has a refrigerating capacity equivalent to R404A, which has been widely used, and a sufficiently low GWP, it is particularly suitable as an alternative refrigerant for R404A.

The composition comprising Refrigerant 3 according to the present disclosure is suitably used as an alternative refrigerant for R134a, R1234yf, or $CO_2$. The composition comprising Refrigerant 3 according to the present disclosure is suitably used as an alternative refrigerant for R134a. Additionally, since the composition comprising Refrigerant 3 according to the present disclosure has a refrigerating capacity of 150% or more relative to that of R134a, which has been widely used, and a sufficiently low GWP, it is particularly suitable as an alternative refrigerant for R134a.

The composition comprising Refrigerant 4 according to the present disclosure is suitably used as an alternative refrigerant for R12, R22, R134a, R404A, R407A, R407C, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R465A, R502, R507, R513A, R1234yf, or R1234ze. The composition comprising Refrigerant 4 according to the present disclosure is suitably used as an alternative refrigerant for R12, R134a, R404A, R407C, R449C, R454C, R1234yf, or R1234ze. Additionally, since the composition comprising Refrigerant 4 according to the present disclosure has a refrigerating capacity of 140% or more relative to that of R1234yf, which has been widely used, and a sufficiently low GWP, it is particularly suitable as an alternative refrigerant for R1234yf.

The composition comprising Refrigerant 5 according to the present disclosure is suitably used as an alternative refrigerant for R12, R22, R134a, R404A, R407A, R407C, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R465A, R502, R507, R513A, R1234yf, or R1234ze. The composition comprising Refrigerant 5 according to the present disclosure is suitably used as an alternative refrigerant for R12, R134a, or R1234yf. Additionally, since the composition comprising Refrigerant 5 according to the present disclosure has a refrigerating capacity of 140% or more relative to that of R1234yf, which has been widely used, and a sufficiently low GWP, it is particularly suitable as an alternative refrigerant for R1234yf.

The composition comprising Refrigerant 5 according to the present disclosure is preferably used in air-conditioning systems for vehicles. The air-conditioning systems for vehicles are preferably air-conditioning systems for gas vehicles, air-conditioning systems for hybrid vehicles, air-conditioning systems for electric vehicles, or air-conditioning systems for hydrogen vehicles. Of these, the air-conditioning systems for vehicles are particularly preferably air-conditioning systems for electric vehicles. That is, in the present disclosure, the composition comprising Refrigerant 5 is particularly preferably used for electric vehicles.

2. Refrigerant Composition

The refrigerant composition of the present invention at least includes the refrigerant according to the present disclosure and can be used for the same applications as the refrigerant of the present disclosure.

Further, the refrigerant composition according to the present disclosure is mixed with at least a refrigerant oil. The refrigerant composition can thereby be used for obtaining a working fluid for a refrigeration apparatus.

The refrigerant composition according to the present disclosure further comprises at least one other component in addition to the refrigerant of the present disclosure. The refrigerant composition according to the present disclosure may optionally comprise at least one of the other components describes below.

As described above, when the refrigerant composition according to the present disclosure is used as a working fluid for a refrigeration apparatus, it is usually mixed with at least a refrigerant oil for use.

Preferably, the refrigerant composition according to the present disclosure is substantially free from refrigerant oil. Specifically, in the refrigerant composition according to the present disclosure, the amount of refrigerant oil relative to the entire refrigerant composition is preferably 0 to 1 mass %, more preferably 0 to 0.5 mass %, even more preferably 0 to 0.25 mass %, and particularly preferably 0 to 0.1 mass %.

2.1 Water

The refrigerant composition according to the present disclosure may comprise a small amount of water.

The water content in the refrigerant composition is preferably 0 to 0.1 mass %, more preferably 0 to 0.075 mass %, even more preferably 0 to 0.05 mass %, and particularly preferably 0 to 0.025 mass % relative to the entire refrigerant.

A small amount of water contained in the refrigerant composition stabilizes double bonds in the molecules of unsaturated fluorocarbon-based compounds that can be present in the refrigerant; and makes it less likely that the unsaturated fluorocarbon-based compounds will be oxidized, thus increasing the stability of the refrigerant composition. To attain the above effects that are obtained by containing water, the lower limit of the water content is about 0.001 mass %. For example, the water content can be adjusted in a range of 0.001 to 0.1 mass %, 0.001 to 0.075 mass %, 0001 to 0.05 mass %, and 0.001 to 0.025 mass %.

2.2 Tracer

A tracer is added to the refrigerant composition according to the present disclosure at a detectable concentration so that when the composition has been diluted, contaminated, or undergone some other changes, the tracer can trace the changes.

The refrigerant composition according to the present disclosure may comprise a single tracer, or two or more tracers.

The tracer is not limited, and can be suitably selected from typically used tracers. Preferably, a compound that cannot become an impurity inevitably mixed into the refrigerant of the present disclosure can be selected as a tracer.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxides ($N_2O$). Of these, hydrofluorocarbons, hydrochlorofluorocarbons, chlorofluorocarbons, hydrochlorocarbons, fluorocarbons, and fluoroethers are preferred.

Specifically, the following compounds (hereinbelow sometimes referred to as "tracer compounds") are more preferred as tracers.

HCC-40 (chloromethane, $CH_3Cl$), HFC-41 (fluoromethane, $CH_3F$), HFC-161 (fluoroethane, $CH_3CH_2F$), HFC-245fa (1,1,1,3,3-pentafluoropropane, $CF_3CH_2CHF_2$), HFC-236fa (1,1,1,3,3,3-hexafluoropropane, $CF_3CH_2CF_3$), HFC-236ea (1,1,1,2,3,3-hexafluoropropane, $CF_3CHFCHF_2$), HCFC-22 (chlorodifluoromethane, $CHClF_2$), HCFC-31 (chlorofluoromethane, $CH_2ClF$), CFC-1113 (chlorotrifluoroethylene, $CF_2\!=\!CClF$), HFE-125 (trifluoromethyl difluoro methyl ether, $CF_3OCHF_2$), HFE-134a (trifluoromethyl fluoromethyl ether, $CF_3OCH_2F$), HFE-143a (trifluoromethyl methyl ether, $CF_3OCH_3$), HFE-227ea (trifluoromethyl tetrafluoro ethyl ether, $CF_3OCHFCF_3$), and HFE-236fa (trifluoromethyl trifluoroethyl ether, $CF_3OCH_2CF_3$).

The tracer compound can be present in the refrigerant composition in a total concentration of 10 to 1000 ppm. The tracer compound is preferably present in the refrigerant composition in a total concentration of 30 to 500 ppm, more preferably 50 to 300 ppm, even more preferably 75 to 250 ppm, and particularly preferably 100 to 200 ppm.

2.3 Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from typically used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. Of these, naphthalimide and coumarin are preferred.

The amount of the ultraviolet fluorescent dye is not limited, and is usually 0.01 to 5 mass %, preferably 0.05 to 3 mass %, more preferably 0.1 to 2 mass %, even more preferably 0.25 to 1.5 mass %, and particularly preferably 0.5 to 1 mass %, relative to the entire refrigerant.

2.4 Stabilizer

The refrigerant composition according to the present disclosure may comprise a single stabilizer, or two or more stabilizers.

The stabilizer is not limited, and can be suitably selected from typically used stabilizers.

Examples of stabilizers include nitro compounds, ethers, and amines.

Examples of nitro compounds include aliphatic nitro compounds, such as nitromethane and nitroethane, and aromatic nitro compounds, such as nitro benzene and nitro styrene.

Examples of ethers include 1,4-dioxane.

Examples of amines include 2,2,3,3,3-pentafluoropropylamine and diphenyl amine.

Examples of stabilizers also include butylhydroxyxylene and benzotriazole in addition to nitro compounds, ethers, and amines.

The amount of the stabilizer is not limited. The amount of the stabilizer is usually 0.01 to 5 mass %, preferably 0.05 to 3 mass %, more preferably 0.1 to 2 mass %, even more preferably 0.25 to 1.5 mass %, and particularly preferably 0.5 to 1 mass %, relative to the entire refrigerant.

The stability of the refrigerant composition according to the present disclosure can be evaluated by a commonly used method without limitation. Examples of such methods include an evaluation method using the amount of free fluorine ions as an index according to ASHRAE Standard 97-2007, and the like. There is, for example, another evaluation method using the total acid number as an index. This method can be performed, for example, according to ASTM D 974-06.

2.5 Polymerization Inhibitor

The refrigerant composition according to the present disclosure may comprise a single polymerization inhibitor, or two or more polymerization inhibitors.

The polymerization inhibitor is not limited, and can be suitably selected from typically used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The amount of the polymerization inhibitor is not limited. The amount of the polymerization inhibitor is usually 0.01 to 5 mass %, preferably 0.05 to 3 mass %, more preferably 0.1 to 2 mass %, even more preferably 0.25 to 1.5 mass %, and particularly preferably 0.5 to 1 mass %, relative to the entire refrigerant.

2.6 Other Components that can be Contained in Refrigerant Composition

The refrigerant composition according to the present disclosure can also contain the following components.

For example, fluorinated hydrocarbons that are different from the refrigerants mentioned above can be contained. Examples of fluorinated hydrocarbons used as other components are not limited. At least one fluorinated hydrocarbon selected from the group consisting of HCFC-1122, HCFC-124, and CFC-1113 can be used.

As another component, at least one halogenated organic compound represented by formula (A): $C_mH_nX_p$, wherein each X is independently fluorine, chlorine, or bromine; m is 1 or 2; 2m+2 is greater than or equal to n+p; and p is greater than or equal to 1 can be contained. The halogenated organic compound is not limited, and preferable examples include difluorochloromethane, chloromethane, 2-chloro-1,1,1,2,2-pentafluoroethane, 2-chloro-1,1,1,2-tetrafluoroethane, 2-chloro-1,1-difluoroethylene, and trifluoroethylene.

As another component, at least one organic compound represented by formula (B): $C_mH_nX_p$, wherein each X is independently an atom other than a halogen atom; m is 1 or 2; 2m+2 is greater than or equal to n+p; and p is greater than or equal to 1 can be contained. The organic compound is not limited, and preferable examples include propane and isobutane.

The amounts of the fluorinated hydrocarbon, halogenated organic compound represented by formula (A), and organic compound represented by formula (B) are not limited. The total amount of these is preferably 0.5 mass % or less, more preferably 0.3 mass % or less, and particularly preferably 0.1 mass % or less, relative to the total amount of the refrigerant composition.

3. Refrigerant-Oil-Containing Working Fluid

The refrigerant-oil-containing working fluid according to the present disclosure at least includes the refrigerant or the refrigerant composition according to the present disclosure, and a refrigerant oil, and is used as a working fluid in a refrigeration apparatus. Specifically, the refrigerant-oil-containing working fluid according to the present disclosure can be obtained by mixing together the refrigerant or refrigerant composition with a refrigerant oil used in a compressor of a refrigeration apparatus.

The amount of the refrigerant oil is not limited, and is usually 10 to 50 mass %, preferably 12.5 to 45 mass %, more preferably 15 to 40 mass %, even more preferably 17.5 to 35 mass %, and particularly preferably 20 to 30 mass %, relative to the entire refrigerant-oil-containing working fluid.

3.1 Refrigerant Oil

The composition according to the present disclosure may comprise a single refrigerant oil or two or more refrigerant oils.

The refrigerant oil is not limited, and can be suitably selected from typically used refrigerant oils. In this case, refrigerant oils that are superior in increasing action on the miscibility with the mixture of the refrigerant according to the present disclosure (mixed refrigerant according to the present disclosure) and stability of the mixed refrigerant, for example, are suitably selected as necessary.

The base oil of the refrigerant oil is preferably, for example, at least one member selected from the group consisting of polyalkylene glycols (PAG), polyol esters (POE), and polyvinyl ethers (PVE).

The refrigerant oil may further comprise an additive in addition to the base oil.

The additive may be at least one member selected from the group consisting of antioxidants, extreme-pressure agents, acid scavengers, oxygen scavengers, copper deactivators, anticorrosive agents, oily agents, and antifoaming agents.

A refrigerant oil with a kinematic viscosity of 5 to 400 cSt at 40° C. is preferable from the standpoint of lubrication.

The refrigerant-oil-containing working fluid according to the present disclosure may further optionally comprise at least one additive. Examples of additives include compatibilizing agents described below.

3.2 Compatibilizing Agent

The refrigerant-oil-containing working fluid according to the present disclosure may comprise a single compatibilizing agent or two or more compatibilizing agents.

The compatibilizing agent is not limited, and can be suitably selected from typically used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkane. Of these, a polyoxyalkylene glycol ether is preferred.

EXAMPLES

More specific explanation is given below with reference to Examples. However, the present disclosure is not limited to the following Examples.

Test Example 1-1

The GWP of each mixed refrigerant shown in Examples 1-1 to 1-13, Comparative Examples 1-1 to 1-2, and Reference Example 1-1 (R404A) was evaluated based on the values in the IPCC fourth report.

The COP, refrigerating capacity, discharge temperature, saturation pressure at a saturation temperature of 40° C., condensation pressure, and evaporation pressure of each of the mixed refrigerants were determined by performing refrigeration cycle theoretical calculations for the mixed refrigerants by using the National Institute of Science and Technology (NIST) and Reference Fluid Thermodynamic and Transport Properties Database (Refprop 10.0) under the following conditions.

Evaporation temperature: −50° C.
Condensation temperature: 40° C.
Superheating temperature: 20 K
Supercooling temperature: 0 K
Compressor efficiency: 70%

The "evaporation temperature of −50° C." means that the evaporation temperature of the mixed refrigerant in the evaporator provided in the refrigeration apparatus is −50° C. Further, the "condensation temperature of 40° C." means that the condensation temperature of the mixed refrigerant in the condenser provided in the refrigeration apparatus is 40° C.

Table 1 shows the results of Test Example 1-1. Table 1 shows Examples and Comparative Examples with regard to a Refrigerant 1 of the present disclosure. In Table 1, the "COP ratio" and the "refrigerating capacity ratio" refer to a ratio (%) relative to R404A. In Table 1, the "saturation pressure (40° C.)" refers to a saturation pressure at a saturation temperature of 40° C. In Table 1, the "discharge temperature (° C.)" refers to a temperature at which the refrigerant has the highest temperature in the refrigeration cycle according to the refrigeration cycle theoretical calculations of the mixed refrigerant.

The coefficient of performance (COP) was calculated according to the following equation.

COP=(refrigerating capacity or heating capacity)/ amount of electrical power consumed The compression ratio was calculated according to the following equation.

Compression ratio=condensation pressure (Mpa)/ evaporation pressure (Mpa)

The flammability of the mixed refrigerant was determined by specifying the fractionation of the mixed refrigerant to the WCF concentration and measuring the burning rate according to ANSI/ASHRAE Standard 34-2013. The one with a burning rate of 0 cm/s to 10 cm/s was classified as Class 2L (slightly flammable), the one with a burning rate of more than 10 cm/s was classified as Class 2 (weakly flammable), and the one with no flame propagation was classified as Class 1 (non-flammable). In Table 1, the ASHRAE flammability classification shows the results based on these criteria.

The burning rate test was performed as follows. First, a mixed refrigerant having a purity of 99.5% or more was used, and the mixed refrigerant was deaerated by repeating a cycle of freezing, pumping, and thawing until no trace of air was observed on the vacuum gauge. The burning rate was measured by a closed method. The initial temperature was the ambient temperature. The ignition was performed by generating an electrical spark between the electrodes in the center of the sample cell. The duration of the discharge was 1.0 to 9.9 ms, and the ignition energy was typically about 0.1 to 1.0 J. The spread of the flame was visualized by using a schlieren photograph. A cylindrical container (inner diameter: 155 mm, length: 198 mm) having two acrylic windows that transmit light was used as a sample cell, and a xenon lamp was used as a light source. The schlieren image of the flame was recorded using a high-speed digital video camera at a frame speed of 600 fps, and stored in a PC.

The flammable range of the mixed refrigerant was measured using a measurement device according to ASTM E681-09 (see FIG. 1).

More specifically, a 12-L spherical glass flask was used so that the combustion state could be visually observed and photographically recorded. When excessive pressure was generated by combustion in the glass flask, gas was allowed to escape from the upper lid. Ignition was achieved by electric discharge from electrodes disposed at one-third the distance from the bottom.

Test Conditions

Test vessel: 280-mm ϕ spherical (internal volume: 12 liters)
Test temperature: 60° C.±3° C.
Pressure: 101.3 kPa±0.7 kPa
Water: 0.0088 g±0.0005 g (water content at a relative humidity of 50% at 23° C.) per gram of dry air
Mixing ratio of refrigerant composition/air: 1 vol. % increments±0.2 vol. %
Mixture of refrigerant composition: ±0.1 mass %
Ignition method: AC discharge, voltage: 15 kV, electric current: 30 mA, neon transformer
Electrode spacing: 6.4 mm (¼ inch)
Spark: 0.4 seconds±0.05 seconds Evaluation Criteria:

When the flame spread at an angle of more than 90° from the ignition point, it was evaluated that flame propagation was present (flammable).

When the flame spread at an angle of 90° or less from the ignition point, it was evaluated that flame propagation was absent (non-flammable).

TABLE 1

| Item | | Unit | Reference Example 1-1 (R404A) | Comparative Example 1-1 | Example 1-1 | Example 1-2 | Example 1-3 | Example 1-4 | Example 1-5 | Example 1-6 |
|---|---|---|---|---|---|---|---|---|---|---|
| Composition ratio | HFO-1132 (E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 40 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | °C. | 100.6 | 108.6 | 114.7 | 115.0 | 115.5 | 116.5 | 117.6 | 118.8 |
| Saturation pressure (40° C.) | | MPa | 1.822 | 1.592 | 1.745 | 1.752 | 1.764 | 1.788 | 1.817 | 1.844 |
| Evaporation pressure | | MPa | 0.082 | 0.063 | 0.072 | 0.073 | 0.074 | 0.075 | 0.077 | 0.079 |
| Compression ratio | | — | 22.2 | 25.3 | 24.1 | 24.0 | 23.9 | 23.8 | 23.6 | 23.4 |
| COP ratio (relative to R404A) | | % | 100 | 106.2 | 106.2 | 106.2 | 106.2 | 106.2 | 106.2 | 106.2 |
| Refrigerating capacity ratio (relative to R404A) | | % | 100 | 86.2 | 98.5 | 99.1 | 100 | 102.1 | 104.5 | 106.9 |
| ASHRAE flammability classification | | — | Class 1 | Class 2L | Class 2L | Class 2L | Class 2L | Class 2L | Class 2L | Class 2L |

| Item | | Example 1-7 | Example 1-8 | Example 1-9 | Example 1-10 | Example 1-11 | Example 1-12 | Example 1-13 | Comparative Example 1-2 |
|---|---|---|---|---|---|---|---|---|---|
| Composition ratio | HFO-1132 (E) | 49.2 | 51.0 | 53.5 | 55.0 | 57.0 | 59.0 | 60.0 | 70.0 |
| | HFO-1234yf | 50.8 | 49.0 | 46.5 | 45.0 | 43.0 | 41.0 | 40.0 | 30.0 |
| | HFC-134a | 0 | 0 | 0 | 0 | 0 | 0 | 0 | 0 |
| | HFC-143a | 0 | 0 | 0 | 0 | 0 | 0 | 0 | 0 |
| | HFC-125 | 0 | 0 | 0 | 0 | 0 | 0 | 0 | 0 |
| GWP (AR4) | | 7 | 7 | 7 | 7 | 7 | 8 | 8 | 8 |
| Discharge temperature | | 120.0 | 121.0 | 122.4 | 123.3 | 124.4 | 125.5 | 126.0 | 131.7 |
| Saturation pressure (40° C.) | | 1.874 | 1.898 | 1.931 | 1.950 | 1.975 | 2.000 | 2.012 | 2.128 |
| Evaporation pressure | | 0.081 | 0.083 | 0.085 | 0.086 | 0.088 | 0.090 | 0.091 | 0.099 |
| Compression ratio | | 23.1 | 23.0 | 22.8 | 22.6 | 22.5 | 22.3 | 22.2 | 21.6 |
| COP ratio (relative to R404A) | | 106.2 | 106.3 | 106.3 | 106.3 | 106.3 | 106.4 | 106.4 | 106.7 |
| Refrigerating capacity ratio (relative to R404A) | | 109.5 | 111.7 | 114.6 | 116.4 | 118.7 | 121 | 122.2 | 133.3 |
| ASHRAE flammability classification | | Class 2L | Class 2L | Class 2L | Class 2 | Class 2 | Class 2 | Class 2 | Class 2 |

Test Example 1-2

The GWP of each mixed refrigerant shown in Examples 1-14 to 1-26, Comparative Examples 1-3 to 1-4, and Reference Example 1-2 (R404A) was evaluated based on the values in the IPCC fourth report.

The COP, refrigerating capacity, discharge temperature, saturation pressure at a saturation temperature of 40° C., condensation pressure, and evaporation pressure of each of the mixed refrigerants were determined by performing refrigeration cycle theoretical calculations for the mixed refrigerants by using NIST and Refprop 10.0 under the following conditions.
Evaporation temperature: −35° C.
Condensation temperature: 40° C.
Superheating temperature: 20 K
Supercooling temperature: 0 K
Compressor efficiency: 70%

The definitions of the terms are the same as those in Test Example 1-1.

Table 2 shows the results of Test Example 1-2. Table 2 shows Examples and Comparative Examples with regard to a Refrigerant 1 of the present disclosure. In Table 2, the definitions of the terms are the same as those in Test Example 1-1.

The coefficient of performance (COP) and the compression ratio were determined as in Test Example 1-1.

The flammability of the mixed refrigerant was evaluated as in Test Example 1-1. The burning rate test was performed as in Test Example 1-1.

The flammable range of the mixed refrigerant was measured in the same manner and under the same conditions as in Test Example 1-1 by using a measurement device according to ASTM E681-09 (see FIG. 1).

TABLE 2

| Item | | Unit | Reference Example 1-2 (R404A) | Comparative Example 1-3 | Example 1-14 | Example 1-15 | Example 1-16 | Example 1-17 | Example 1-18 | Example 1-19 |
|---|---|---|---|---|---|---|---|---|---|---|
| Composition ratio | HFO-1132 (E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |

TABLE 2-continued

| | | | | | | | | |
|---|---|---|---|---|---|---|---|---|
| GWP (AR4) | — | 3922 | 6 | 6 | 6 | 6 | 7 | 7 | 7 |
| Discharge temperature | ° C. | 89.1 | 95.8 | 100.6 | 100.8 | 101.2 | 102.0 | 102.9 | 103.8 |
| Saturation pressure (40° C.) | MPa | 1.822 | 1.592 | 1.745 | 1.752 | 1.764 | 1.788 | 1.817 | 1.844 |
| Evaporation pressure | MPa | 0.165 | 0.131 | 0.148 | 0.149 | 0.151 | 0.154 | 0.157 | 0.160 |
| Compression ratio | — | 11.0 | 12.2 | 11.8 | 11.7 | 11.7 | 11.6 | 11.6 | 11.5 |
| COP ratio (relative to R404A) | % | 100 | 105.1 | 104.8 | 104.7 | 104.7 | 104.7 | 104.6 | 104.5 |
| Refrigerating capacity ratio (relative to R404A) | % | 100 | 87.7 | 98.5 | 99.0 | 99.8 | 101.6 | 103.7 | 105.7 |
| ASHRAE flammability classification | — | Class 1 | Class 2L | Class 2L | Class 2L | Class 2L | Class 2L | Class 2L | Class 2L |

| | Item | Example 1-20 | Example 1-21 | Example 1-22 | Example 1-23 | Example 1-24 | Example 1-25 | Example 1-26 | Comparative Example 1-4 |
|---|---|---|---|---|---|---|---|---|---|
| Composition ratio | HFO-1132 (E) | 49.2 | 51.0 | 53.5 | 55.0 | 57.0 | 59.0 | 60.0 | 70.0 |
| | HFO-1234yf | 50.8 | 49.0 | 46.5 | 45.0 | 43.0 | 41.0 | 40.0 | 30.0 |
| | HFC-134a | 0 | 0 | 0 | 0 | 0 | 0 | 0 | 0 |
| | HFC-143a | 0 | 0 | 0 | 0 | 0 | 0 | 0 | 0 |
| | HFC-125 | 0 | 0 | 0 | 0 | 0 | 0 | 0 | 0 |
| GWP (AR4) | | 7 | 7 | 7 | 7 | 7 | 8 | 8 | 8 |
| Discharge temperature | | 104.7 | 105.5 | 106.6 | 107.3 | 108.1 | 109.0 | 109.5 | 113.9 |
| Saturation pressure (40° C.) | | 1.874 | 1.898 | 1.931 | 1.950 | 1.975 | 2.000 | 2.012 | 2.128 |
| Evaporation pressure | | 0.164 | 0.167 | 0.171 | 0.174 | 0.177 | 0.180 | 0.181 | 0.196 |
| Compression ratio | | 11.4 | 11.4 | 11.3 | 11.2 | 11.2 | 11.1 | 11.1 | 10.8 |
| COP ratio (relative to R404A) | | 104.5 | 104.4 | 104.4 | 104.4 | 104.3 | 104.3 | 104.3 | 104.3 |
| Refrigerating capacity ratio (relative to R404A) | | 108.0 | 109.8 | 112.3 | 113.8 | 115.7 | 117.7 | 118.6 | 128.0 |
| ASHRAE flammability classification | | Class 2L | Class 2L | Class 2L | Class 2 | Class 2 | Class 2 | Class 2 | Class 2 |

Test Example 1-3

The GWP of each mixed refrigerant shown in Examples 1-27 to 1-39, Comparative Examples 1-5 to 1-6, and Reference Example 1-3 (R404A) was evaluated based on the values in the IPCC fourth report.

The COP, refrigerating capacity, discharge temperature, saturation pressure at a saturation temperature of 40° C., condensation pressure, and evaporation pressure of each of the mixed refrigerants were determined by performing refrigeration cycle theoretical calculations for the mixed refrigerants by using NIST and Refprop 10.0 under the following conditions.
Evaporation temperature: −10° C.
Condensation temperature: 40° C.
Superheating temperature: 20 K
Supercooling temperature: 0 K
Compressor efficiency: 70%

The definitions of the terms are the same as those in Test Example 1-1.

Table 3 shows the results of Test Example 1-3. Table 3 shows Examples and Comparative Examples with regard to a Refrigerant 1 of the present disclosure. In Table 3, the definitions of the terms are the same as those in Test Example 1-1.

The coefficient of performance (COP) and the compression ratio were determined as in Test Example 1-1.

The flammability of the mixed refrigerant was evaluated as in Test Example 1-1. The burning rate test was performed as in Test Example 1-1.

The flammable range of the mixed refrigerant was measured in the same manner and under the same conditions as in Test Example 1-1 by using a measurement device according to ASTM E681-09 (see FIG. 1).

TABLE 3

| | Item | Unit | Reference Example 1-3 (R404A) | Comparative Example 1-5 | Example 1-27 | Example 1-28 | Example 1-29 | Example 1-30 | Example 1-31 | Example 1-32 |
|---|---|---|---|---|---|---|---|---|---|---|
| Composition ratio | HFO-1132 (E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 75.8 | 80.8 | 83.7 | 83.9 | 84.1 | 84.5 | 85.1 | 85.6 |
| Saturation pressure (40° C.) | | MPa | 1.822 | 1.592 | 1.745 | 1.752 | 1.764 | 1.788 | 1.817 | 1.844 |
| Evaporation pressure | | MPa | 0.434 | 0.357 | 0.399 | 0.401 | 0.404 | 0.411 | 0.419 | 0.427 |
| Compression ratio | | — | 4.2 | 4.5 | 4.4 | 4.4 | 4.4 | 4.3 | 4.3 | 4.3 |
| COP ratio (relative to R404A) | | % | 100 | 103.8 | 102.9 | 102.9 | 102.8 | 102.7 | 102.5 | 102.4 |

TABLE 3-continued

| | | | | | | | | |
|---|---|---|---|---|---|---|---|---|
| Refrigerating capacity ratio (relative to R404A) | % | 100 | 89.8 | 98.7 | 99.1 | 99.8 | 101.2 | 102.8 | 104.5 |
| ASHRAE flammability classification | — | Class 1 | Class 2L | Class 2L | Class 2L | Class 2L | Class 2L | Class 2L | Class 2L |

| | Item | Example 1-33 | Example 1-34 | Example 1-35 | Example 1-36 | Example 1-37 | Example 1-38 | Example 1-39 | Comparative Example 1-6 |
|---|---|---|---|---|---|---|---|---|---|
| Composition ratio | HFO-1132 (E) | 49.2 | 51.0 | 53.5 | 55.0 | 57.0 | 59.0 | 60.0 | 70.0 |
| | HFO-1234yf | 50.8 | 49.0 | 46.5 | 45.0 | 43.0 | 41.0 | 40.0 | 30.0 |
| | HFC-134a | 0 | 0 | 0 | 0 | 0 | 0 | 0 | 0 |
| | HFC-143a | 0 | 0 | 0 | 0 | 0 | 0 | 0 | 0 |
| | HFC-125 | 0 | 0 | 0 | 0 | 0 | 0 | 0 | 0 |
| GWP (AR4) | | 7 | 7 | 7 | 7 | 7 | 8 | 8 | 8 |
| Discharge temperature | | 86.2 | 86.6 | 87.3 | 87.7 | 88.2 | 88.7 | 88.9 | 91.5 |
| Saturation pressure (40° C.) | | 1.874 | 1.898 | 1.931 | 1.950 | 1.975 | 2.000 | 2.012 | 2.128 |
| Evaporation pressure | | 0.436 | 0.443 | 0.452 | 0.457 | 0.465 | 0.472 | 0.475 | 0.509 |
| Compression ratio | | 4.3 | 4.3 | 4.3 | 4.3 | 4.3 | 4.2 | 4.2 | 4.2 |
| COP ratio (relative to R404A) | | 102.2 | 102.1 | 102.0 | 101.9 | 101.8 | 101.7 | 101.6 | 101.3 |
| Refrigerating capacity ratio (relative to R404A) | | 106.2 | 107.7 | 109.6 | 110.8 | 112.3 | 113.8 | 114.5 | 121.7 |
| ASHRAE flammability classification | | Class 2L | Class 2L | Class 2L | Class 2 | Class 2 | Class 2 | Class 2 | Class 2 |

Test Example 1-4

The GWP of each mixed refrigerant shown in Comparative Examples 1-7 to 1-21 and Reference Example 1-4 (R404A) was evaluated based on the values in the IPCC fourth report.

The COP, refrigerating capacity, discharge temperature, saturation pressure at a saturation temperature of 40° C., condensation pressure, and evaporation pressure of each of the mixed refrigerants were determined by performing refrigeration cycle theoretical calculations for the mixed refrigerants using NIST and Refprop 10.0 under the following conditions.
Evaporation temperature: −80° C.
Condensation temperature: 40° C.
Superheating temperature: 20 K
Supercooling temperature: 0 K
Compressor efficiency: 70%

The definitions of the terms are the same as those in Test Example 1-1.

Table 4 shows the results of Test Example 1-4. Table 4 shows Comparative Examples with regard to the Refrigerant 1 of the present disclosure. In Table 4, the definitions of the terms are the same as those in Test Example 1-1.

The coefficient of performance (COP) and the compression ratio were determined as in Test Example 1-1.

The flammability of the mixed refrigerant was evaluated as in Test Example 1-1. The burning rate test was performed as in Test Example 1-1.

The flammable range of the mixed refrigerant was measured in the same manner and under the same conditions as in Test Example 1-1 by using a measurement device according to ASTM E681-09 (see FIG. 1).

TABLE 4

| | Item | Unit | Reference Example 1-4 (R404A) | Comp. Ex. 1-7 | Comp. Ex. 1-8 | Comp. Ex. 1-9 | Comp. Ex. 1-10 | Comp. Ex. 1-11 | Comp. Ex. 1-12 | Comp. Ex. 1-13 |
|---|---|---|---|---|---|---|---|---|---|---|
| Composition ratio | HFO-1132 (E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 136.7 | 146.0 | 157.7 | 158.1 | 158.8 | 160.4 | 162.1 | 163.9 |
| Saturation pressure (40° C.) | | MPa | 1.822 | 1.592 | 1.745 | 1.752 | 1.764 | 1.788 | 1.817 | 1.844 |
| Evaporation pressure | | MPa | 0.014 | 0.011 | 0.012 | 0.012 | 0.012 | 0.012 | 0.013 | 0.013 |
| Compression ratio | | — | 134.6 | 149.1 | 150.8 | 150.2 | 149.3 | 147.2 | 145.0 | 142.8 |
| COP ratio (relative to R404A) | | % | 100 | 112.6 | 110.3 | 110.3 | 110.4 | 110.6 | 110.8 | 111.0 |
| Refrigerating capacity ratio (relative to R404A) | | % | 100 | 91.7 | 99.3 | 100.2 | 101.5 | 104.4 | 107.8 | 111.3 |
| ASHRAE flammability classification | | — | Class 1 | Class 2L | Class 2L | Class 2L | Class 2L | Class 2L | Class 2L | Class 2L |

TABLE 4-continued

| Item | | Comp. Ex. 1-14 | Comp. Ex. 1-15 | Comp. Ex. 1-16 | Comp. Ex. 1-17 | Comp. Ex. 1-18 | Comp. Ex. 1-19 | Comp. Ex. 1-20 | Comp. Ex. 1-21 |
|---|---|---|---|---|---|---|---|---|---|
| Composition ratio | HFO-1132 (E) | 49.2 | 51.0 | 53.5 | 55.0 | 57.0 | 59.0 | 60.0 | 70.0 |
| | HFO-1234yf | 50.8 | 49.0 | 46.5 | 45.0 | 43.0 | 41.0 | 40.0 | 30.0 |
| | HFC-134a | 0 | 0 | 0 | 0 | 0 | 0 | 0 | 0 |
| | HFC-143a | 0 | 0 | 0 | 0 | 0 | 0 | 0 | 0 |
| | HFC-125 | 0 | 0 | 0 | 0 | 0 | 0 | 0 | 0 |
| GWP (AR4) | | 7 | 7 | 7 | 7 | 7 | 8 | 8 | 8 |
| Discharge temperature | | 165.8 | 167.4 | 169.6 | 170.9 | 172.6 | 174.3 | 175.2 | 184.0 |
| Saturation pressure (40° C.) | | 1.874 | 1.898 | 1.931 | 1.950 | 1.975 | 2.000 | 2.012 | 2.128 |
| Evaporation pressure | | 0.013 | 0.014 | 0.014 | 0.014 | 0.015 | 0.015 | 0.015 | 0.017 |
| Compression ratio | | 140.5 | 138.7 | 136.3 | 134.9 | 133.2 | 131.5 | 130.7 | 123.8 |
| COP ratio (relative to R404A) | | 111.3 | 111.4 | 111.7 | 111.9 | 112.1 | 112.3 | 112.4 | 113.5 |
| Refrigerating capacity ratio (relative to R404A) | | 115.1 | 118.2 | 122.5 | 125.2 | 128.6 | 132.1 | 133.8 | 151.0 |
| ASHRAE flammability classification | | Class 2L | Class 2L | Class 2L | Class 2 | Class 2 | Class 2 | Class 2 | Class 2 |

Test Example 1-5

The GWP of each mixed refrigerant shown in Comparative Examples 1-22 to 1-36 and Reference Example 1-5 (R404A) was evaluated based on the values in the IPCC fourth report.

The COP, refrigerating capacity, discharge temperature, saturation pressure at a saturation temperature of 40° C., condensation pressure, and evaporation pressure of each of the mixed refrigerants were determined by performing refrigeration cycle theoretical calculations for the mixed refrigerants using NIST and Refprop 10.0 under the following conditions.

Evaporation temperature: 10° C.
Condensation temperature: 40° C.
Superheating temperature: 20 K
Supercooling temperature: 0 K
Compressor efficiency: 70%

The definitions of the terms are the same as those in Test Example 1-1.

Table 5 shows the results of Test Example 1-5. Table 5 shows Comparative Examples with regard to the Refrigerant 1 of the present disclosure. In Table 5, the definitions of the terms are the same as those in Test Example 1-1.

The coefficient of performance (COP) and the compression ratio were determined as in Test Example 1-1.

The flammability of the mixed refrigerant was evaluated as in Test Example 1-1. The burning rate test was performed as in Test Example 1-1.

The flammable range of the mixed refrigerant was measured in the same manner and under the same conditions as in Test Example 1-1 by using a measurement device according to ASTM E681-09 (see FIG. 1).

TABLE 5

| Item | | Unit | Reference Example 1-5 (R404A) | Comp. Ex. 1-22 | Comp. Ex. 1-23 | Comp. Ex. 1-24 | Comp. Ex. 1-25 | Comp. Ex. 1-26 | Comp. Ex. 1-27 | Comp. Ex. 1-28 |
|---|---|---|---|---|---|---|---|---|---|---|
| Composition ratio | HFO-1132 (E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 68.5 | 72.4 | 74.0 | 74.1 | 74.2 | 74.4 | 74.7 | 74.9 |
| Saturation pressure (40° C.) | | MPa | 1.822 | 1.592 | 1.745 | 1.752 | 1.764 | 1.788 | 1.817 | 1.844 |
| Evaporation pressure | | MPa | 0.820 | 0.694 | 0.768 | 0.772 | 0.777 | 0.789 | 0.803 | 0.817 |
| Compression ratio | | — | 2.2 | 2.3 | 2.3 | 2.3 | 2.3 | 2.3 | 2.3 | 2.3 |
| COP ratio (relative to R404A) | | % | 100.0 | 103.1 | 101.9 | 101.8 | 101.7 | 101.5 | 101.3 | 101.1 |
| Refrigerating capacity ratio (relative to R404A) | | % | 100.0 | 91.2 | 98.9 | 99.3 | 99.8 | 101.0 | 102.5 | 103.8 |
| ASHRAE flammability classification | | — | Class 1 | Class 2L | Class 2L | Class 2L | Class 2L | Class 2L | Class 2L | Class 2L |

| Item | | Comp. Ex. 1-29 | Comp. Ex. 1-30 | Comp. Ex. 1-31 | Comp. Ex. 1-32 | Comp. Ex. 1-33 | Comp. Ex. 1-34 | Comp. Ex. 1-35 | Comp. Ex. 1-36 |
|---|---|---|---|---|---|---|---|---|---|
| Composition ratio | HFO-1132 (E) | 49.2 | 51.0 | 53.5 | 55.0 | 57.0 | 59.0 | 60.0 | 70.0 |
| | HFO-1234yf | 50.8 | 49.0 | 46.5 | 45.0 | 43.0 | 41.0 | 40.0 | 30.0 |
| | HFC-134a | 0 | 0 | 0 | 0 | 0 | 0 | 0 | 0 |
| | HFC-143a | 0 | 0 | 0 | 0 | 0 | 0 | 0 | 0 |
| | HFC-125 | 0 | 0 | 0 | 0 | 0 | 0 | 0 | 0 |

TABLE 5-continued

|  | | | | | | | | |
|---|---|---|---|---|---|---|---|---|
| GWP (AR4) | 7 | 7 | 7 | 7 | 7 | 8 | 8 | 8 |
| Discharge temperature | 75.2 | 75.5 | 75.8 | 76.0 | 76.2 | 76.5 | 76.6 | 77.9 |
| Saturation pressure (40° C.) | 1.874 | 1.898 | 1.931 | 1.950 | 1.975 | 2.000 | 2.012 | 2.128 |
| Evaporation pressure | 0.832 | 0.844 | 0.860 | 0.870 | 0.882 | 0.895 | 0.901 | 0.959 |
| Compression ratio | 2.3 | 2.2 | 2.2 | 2.2 | 2.2 | 2.2 | 2.2 | 2.2 |
| COP ratio (relative to R404A) | 100.9 | 100.8 | 100.6 | 100.4 | 100.3 | 100.1 | 100.1 | 99.5 |
| Refrigerating capacity ratio (relative to R404A) | 105.3 | 106.5 | 108.2 | 109.1 | 110.4 | 111.6 | 112.3 | 118.2 |
| ASHRAE flammability classification | Class 2L | Class 2L | Class 2L | Class 2 | Class 2 | Class 2 | Class 2 | Class 2 |

Test Example 2-1

The GWP of each mixed refrigerant shown in Examples 2-1 to 2-6, Comparative Examples 2-1 to 2-9, and Reference Example 2-1 (R404A) was evaluated based on the values in the IPCC fourth report.

The COP, refrigerating capacity, discharge temperature, saturation pressure at a saturation temperature of 40° C., condensation pressure, and evaporation pressure of each of the mixed refrigerants were determined by performing refrigeration cycle theoretical calculations for the mixed refrigerants by using the National Institute of Science and Technology (NIST) and Reference Fluid Thermodynamic and Transport Properties Database (Refprop 10.0) under the following conditions.

Evaporation temperature: −50° C.
Condensation temperature: 40° C.
Superheating temperature: 20 K
Supercooling temperature: 0 K
Compressor efficiency: 70%

The "evaporation temperature of −50° C." means that the evaporation temperature of the mixed refrigerant in the evaporator provided in the refrigeration apparatus is −50° C. Further, the "condensation temperature of 40° C." means that the condensation temperature of the mixed refrigerant in the condenser provided in the refrigeration apparatus is 40° C.

Table 6 shows the results of Test Example 2-1. Table 6 shows Examples and Comparative Examples with regard to a Refrigerant 2 of the present disclosure. In Table 6, the "COP ratio" and the "refrigerating capacity ratio" refer to a ratio (%) relative to R404A. In Table 6, the "saturation pressure (40° C.)" refers to a saturation pressure at a saturation temperature of 40° C. In Table 6, the "discharge temperature (° C.)" refers to a temperature at which the refrigerant has the highest temperature in the refrigeration cycle according to the refrigeration cycle theoretical calculations of the mixed refrigerant.

The coefficient of performance (COP) was calculated according to the following equation.

COP=(refrigerating capacity or heating capacity)/ amount of electrical power consumed The compression ratio was calculated according to the following equation.

Compression ratio=condensation pressure (Mpa)/ evaporation pressure (Mpa)

The flammability of the mixed refrigerant was determined by specifying the fractionation of the mixed refrigerant to the WCF concentration and measuring the burning rate according to ANSI/ASHRAE Standard 34-2013. The one with a burning rate of 0 cm/s to 10 cm/s was classified as Class 2L (slightly flammable), the one with a burning rate of more than 10 cm/s was classified as Class 2 (weakly flammable), and the one with no flame propagation was classified as Class 1 (non-flammable). In Table 6, the ASHRAE flammability classification shows the results based on these criteria.

The burning rate test was performed as follows. First, a mixed refrigerant having a purity of 99.5% or more was used, and the mixed refrigerant was deaerated by repeating a cycle of freezing, pumping, and thawing until no trace of air was observed on the vacuum gauge. The burning rate was measured by a closed method. The initial temperature was the ambient temperature. The ignition was performed by generating an electrical spark between the electrodes in the center of the sample cell. The duration of the discharge was 1.0 to 9.9 ms, and the ignition energy was typically about 0.1 to 1.0 J. The spread of the flame was visualized by using a schlieren photograph. A cylindrical container (inner diameter: 155 mm, length: 198 mm) having two acrylic windows that transmit light was used as a sample cell, and a xenon lamp was used as a light source. The schlieren image of the flame was recorded using a high-speed digital video camera at a frame speed of 600 fps, and stored in a PC.

The flammable range of the mixed refrigerant was measured using a measurement device according to ASTM E681-09 (see FIG. 1).

More specifically, a 12-L spherical glass flask was used so that the combustion state could be visually observed and photographically recorded. When excessive pressure was generated by combustion in the glass flask, gas was allowed to escape from the upper lid. Ignition was achieved by electric discharge from electrodes disposed at one-third the distance from the bottom.

Test Conditions
Test vessel: 280-mm φ spherical (internal volume: 12 liters)
Test temperature: 60° C.±3° C.
Pressure: 101.3 kPa±0.7 kPa
Water: 0.0088 g±0.0005 g (water content at a relative humidity of 50% at 23° C.) per gram of dry air
Mixing ratio of refrigerant composition/air: 1 vol. % increments±0.2 vol. %
Mixture of refrigerant composition: ±0.1 mass %
Ignition method: AC discharge, voltage: 15 kV, electric current: 30 mA, neon transformer
Electrode spacing: 6.4 mm (¼ inch)
Spark: 0.4 seconds±0.05 seconds
Evaluation Criteria:
When the flame spread at an angle of more than 90° from the ignition point, it was evaluated that flame propagation was present (flammable).
When the flame spread at an angle of 90° or less from the ignition point, it was evaluated that flame propagation was absent (non-flammable).

TABLE 6

| Item | | Unit | Reference Example 2-1 (R404A) | Comp. Ex. 2-1 | Comp. Ex. 2-2 | Example 2-1 | Example 2-2 | Example 2-3 | Example 2-4 | Example 2-5 |
|---|---|---|---|---|---|---|---|---|---|---|
| Composition ratio | HFO-1132 (E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | °C. | 100.6 | 108.6 | 114.7 | 115.0 | 115.5 | 116.5 | 117.6 | 118.8 |
| Saturation pressure (40° C.) | | MPa | 1.822 | 1.592 | 1.745 | 1.752 | 1.764 | 1.788 | 1.817 | 1.844 |
| Evaporation pressure | | MPa | 0.082 | 0.063 | 0.072 | 0.073 | 0.074 | 0.075 | 0.077 | 0.079 |
| Compression ratio | | — | 22.2 | 25.3 | 24.1 | 24.0 | 23.9 | 23.8 | 23.6 | 23.4 |
| COP ratio (relative to R404A) | | % | 100 | 106.2 | 106.2 | 106.2 | 106.2 | 106.2 | 106.2 | 106.2 |
| Refrigerating capacity ratio (relative to R404A) | | % | 100 | 86.2 | 98.5 | 99.1 | 100 | 102.1 | 104.5 | 106.9 |
| ASHRAE flammability classification | | — | Class 1 | Class 2L | Class 2L | Class 2L | Class 2L | Class 2L | Class 2L | Class 2L |

| Item | | Example 2-6 | Comp. Ex. 2-3 | Comp. Ex. 2-4 | Comp. Ex. 2-5 | Comp. Ex. 2-6 | Comp. Ex. 2-7 | Comp. Ex. 2-8 | Comp. Ex. 2-9 |
|---|---|---|---|---|---|---|---|---|---|
| Composition ratio | HFO-1132 (E) | 49.2 | 51.0 | 53.5 | 55.0 | 57.0 | 59.0 | 60.0 | 70.0 |
| | HFO-1234yf | 50.8 | 49.0 | 46.5 | 45.0 | 43.0 | 41.0 | 40.0 | 30.0 |
| | HFC-134a | 0 | 0 | 0 | 0 | 0 | 0 | 0 | 0 |
| | HFC-143a | 0 | 0 | 0 | 0 | 0 | 0 | 0 | 0 |
| | HFC-125 | 0 | 0 | 0 | 0 | 0 | 0 | 0 | 0 |
| GWP (AR4) | | 7 | 7 | 7 | 7 | 7 | 8 | 8 | 8 |
| Discharge temperature | | 120.0 | 121.0 | 122.4 | 123.3 | 124.4 | 125.5 | 126.0 | 131.7 |
| Saturation pressure (40° C.) | | 1.874 | 1.898 | 1.931 | 1.950 | 1.975 | 2.000 | 2.012 | 2.128 |
| Evaporation pressure | | 0.081 | 0.083 | 0.085 | 0.086 | 0.088 | 0.090 | 0.091 | 0.099 |
| Compression ratio | | 23.1 | 23.0 | 22.8 | 22.6 | 22.5 | 22.3 | 22.2 | 21.6 |
| COP ratio (relative to R404A) | | 106.2 | 106.3 | 106.3 | 106.3 | 106.3 | 106.4 | 106.4 | 106.7 |
| Refrigerating capacity ratio (relative to R404A) | | 109.5 | 111.7 | 114.6 | 116.4 | 118.7 | 121 | 122.2 | 133.3 |
| ASHRAE flammability classification | | Class 2L | Class 2L | Class 2L | Class 2 | Class 2 | Class 2 | Class 2 | Class 2 |

Test Example 2-2

The GWP of each mixed refrigerant shown in Examples 2-7 to 2-12, Comparative Examples 2-10 to 1-18, and Reference Example 2-2 (R404A) was evaluated based on the values in the IPCC fourth report.

The COP, refrigerating capacity, discharge temperature, saturation pressure at a saturation temperature of 40° C., condensation pressure, and evaporation pressure of each of the mixed refrigerants were determined by performing refrigeration cycle theoretical calculations for the mixed refrigerants by using NIST and Refprop 10.0 under the following conditions.

Evaporation temperature: −35° C.

Condensation temperature: 40° C.

Superheating temperature: 20 K

Supercooling temperature: 0 K

Compressor efficiency: 70%

The definitions of the terms are the same as those in Test Example 2-1.

Table 7 shows the results of Test Example 2-2. Table 7 shows Examples and Comparative Examples with regard to a Refrigerant 2 of the present disclosure. In Table 7, the definitions of the terms are the same as those in Test Example 2-1.

The coefficient of performance (COP) and the compression ratio were determined as in Test Example 2-1.

The flammability of the mixed refrigerant was evaluated as in Test Example 2-1. The burning rate test was performed as in Test Example 2-1.

The flammable range of the mixed refrigerant was measured in the same manner and under the same conditions as in Test Example 2-1 using a measurement device according to ASTM E681-09 (see FIG. 1).

TABLE 7

| Item | | Unit | Reference Example 2-2 (R404A) | Comp. Ex. 2-10 | Comp. Ex. 2-11 | Example 2-7 | Example 2-8 | Example 2-9 | Example 2-10 | Example 2-11 |
|---|---|---|---|---|---|---|---|---|---|---|
| Composition ratio | HFO-1132 (E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |

TABLE 7-continued

| | | | | | | | | |
|---|---|---|---|---|---|---|---|---|
| GWP (AR4) | — | 3922 | 6 | 6 | 6 | 6 | 7 | 7 | 7 |
| Discharge temperature | °C. | 89.1 | 95.8 | 100.6 | 100.8 | 101.2 | 102.0 | 102.9 | 103.8 |
| Saturation pressure (40° C.) | MPa | 1.822 | 1.592 | 1.745 | 1.752 | 1.764 | 1.788 | 1.817 | 1.844 |
| Evaporation pressure | MPa | 0.165 | 0.131 | 0.148 | 0.149 | 0.151 | 0.154 | 0.157 | 0.160 |
| Compression ratio | — | 11.0 | 12.2 | 11.8 | 11.7 | 11.7 | 11.6 | 11.6 | 11.5 |
| COP ratio (relative to R404A) | % | 100 | 105.1 | 104.8 | 104.7 | 104.7 | 104.7 | 104.6 | 104.5 |
| Refrigerating capacity ratio (relative to R404A) | % | 100 | 87.7 | 98.5 | 99.0 | 99.8 | 101.6 | 103.7 | 105.7 |
| ASHRAE flammability classification | — | Class 1 | Class 2L | Class 2L | Class 2L | Class 2L | Class 2L | Class 2L | Class 2L |

| | Item | Example 2-12 | Comp. Ex. 2-12 | Comp. Ex. 2-13 | Comp. Ex. 2-14 | Comp. Ex. 2-15 | Comp. Ex. 2-16 | Comp. Ex. 2-17 | Comp. Ex. 2-18 |
|---|---|---|---|---|---|---|---|---|---|
| Composition ratio | HFO-1132 (E) | 49.2 | 51.0 | 53.5 | 55.0 | 57.0 | 59.0 | 60.0 | 70.0 |
| | HFO-1234yf | 50.8 | 49.0 | 46.5 | 45.0 | 43.0 | 41.0 | 40.0 | 30.0 |
| | HFC-134a | 0 | 0 | 0 | 0 | 0 | 0 | 0 | 0 |
| | HFC-143a | 0 | 0 | 0 | 0 | 0 | 0 | 0 | 0 |
| | HFC-125 | 0 | 0 | 0 | 0 | 0 | 0 | 0 | 0 |
| GWP (AR4) | | 7 | 7 | 7 | 7 | 7 | 8 | 8 | 8 |
| Discharge temperature | | 104.7 | 105.5 | 106.6 | 107.3 | 108.1 | 109.0 | 109.5 | 113.9 |
| Saturation pressure (40° C.) | | 1.874 | 1.898 | 1.931 | 1.950 | 1.975 | 2.000 | 2.012 | 2.128 |
| Evaporation pressure | | 0.164 | 0.167 | 0.171 | 0.174 | 0.177 | 0.180 | 0.181 | 0.196 |
| Compression ratio | | 11.4 | 11.4 | 11.3 | 11.2 | 11.2 | 11.1 | 11.1 | 10.8 |
| COP ratio (relative to R404A) | | 104.5 | 104.4 | 104.4 | 104.4 | 104.3 | 104.3 | 104.3 | 104.3 |
| Refrigerating capacity ratio (relative to R404A) | | 108.0 | 109.8 | 112.3 | 113.8 | 115.7 | 117.7 | 118.6 | 128.0 |
| ASHRAE flammability classification | | Class 2L | Class 2L | Class 2L | Class 2 | Class 2 | Class 2 | Class 2 | Class 2 |

Test Example 2-3

The GWP of each mixed refrigerant shown in Examples 2-13 to 2-18, Comparative Examples 2-19 to 2-27, and Reference Example 2-3 (R404A) was evaluated based on the values in the IPCC fourth report.

The COP, refrigerating capacity, discharge temperature, saturation pressure at a saturation temperature of 40° C., condensation pressure, and evaporation pressure of each of the mixed refrigerants were determined by performing refrigeration cycle theoretical calculations for the mixed refrigerants using NIST and Refprop 10.0 under the following conditions.

Evaporation temperature: −10° C.

Condensation temperature: 40° C.

Superheating temperature: 20 K

Supercooling temperature: 0 K

Compressor efficiency: 70%

The definitions of the terms are the same as those in Test Example 2-1.

Table 8 shows the results of Test Example 2-3. Table 8 shows Examples and Comparative Examples with regard to a Refrigerant 2 of the present disclosure. In Table 8, the definitions of the terms are the same as those in Test Example 2-1.

The coefficient of performance (COP) and the compression ratio were determined as in Test Example 2-1.

The flammability of the mixed refrigerant was evaluated as in Test Example 2-1. The burning rate test was performed as in Test Example 2-1.

The flammable range of the mixed refrigerant was measured in the same manner and under the same conditions as in Test Example 2-1 by using a measurement device according to ASTM E681-09 (see FIG. 1).

TABLE 8

| | Item | Unit | Reference Example 2-3 (R404A) | Comp. Ex. 2-19 | Comp. Ex. 2-20 | Example 2-13 | Example 2-14 | Example 2-15 | Example 2-16 | Example 2-17 |
|---|---|---|---|---|---|---|---|---|---|---|
| Composition ratio | HFO-1132 (E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | °C. | 75.8 | 80.8 | 83.7 | 83.9 | 84.1 | 84.5 | 85.1 | 85.6 |
| Saturation pressure (40° C.) | | MPa | 1.822 | 1.592 | 1.745 | 1.752 | 1.764 | 1.788 | 1.817 | 1.844 |
| Evaporation pressure | | MPa | 0.434 | 0.357 | 0.399 | 0.401 | 0.404 | 0.411 | 0.419 | 0.427 |
| Compression ratio | | — | 4.2 | 4.5 | 4.4 | 4.4 | 4.4 | 4.3 | 4.3 | 4.3 |
| COP ratio (relative to R404A) | | % | 100 | 103.8 | 102.9 | 102.9 | 102.8 | 102.7 | 102.5 | 102.4 |

TABLE 8-continued

| | | | | | | | | | |
|---|---|---|---|---|---|---|---|---|---|
| Refrigerating capacity ratio (relative to R404A) | % | 100 | 89.8 | 98.7 | 99.1 | 99.8 | 101.2 | 102.8 | 104.5 |
| ASHRAE flammability classification | — | Class 1 | Class 2L | Class 2L | Class 2L | Class 2L | Class 2L | Class 2L | Class 2L |

| | Item | Example 2-18 | Comp. Ex. 2-21 | Comp. Ex. 2-22 | Comp. Ex. 2-23 | Comp. Ex. 2-24 | Comp. Ex. 2-25 | Comp. Ex. 2-26 | Comp. Ex. 2-27 |
|---|---|---|---|---|---|---|---|---|---|
| Composition ratio | HFO-1132 (E) | 49.2 | 51.0 | 53.5 | 55.0 | 57.0 | 59.0 | 60.0 | 70.0 |
| | HFO-1234yf | 50.8 | 49.0 | 46.5 | 45.0 | 43.0 | 41.0 | 40.0 | 30.0 |
| | HFC-134a | 0 | 0 | 0 | 0 | 0 | 0 | 0 | 0 |
| | HFC-143a | 0 | 0 | 0 | 0 | 0 | 0 | 0 | 0 |
| | HFC-125 | 0 | 0 | 0 | 0 | 0 | 0 | 0 | 0 |
| GWP (AR4) | | 7 | 7 | 7 | 7 | 7 | 8 | 8 | 8 |
| Discharge temperature | | 86.2 | 86.6 | 87.3 | 87.7 | 88.2 | 88.7 | 88.9 | 91.5 |
| Saturation pressure (40° C.) | | 1.874 | 1.898 | 1.931 | 1.950 | 1.975 | 2.000 | 2.012 | 2.128 |
| Evaporation pressure | | 0.436 | 0.443 | 0.452 | 0.457 | 0.465 | 0.472 | 0.475 | 0.509 |
| Compression ratio | | 4.3 | 4.3 | 4.3 | 4.3 | 4.3 | 4.2 | 4.2 | 4.2 |
| COP ratio (relative to R404A) | | 102.2 | 102.1 | 102.0 | 101.9 | 101.8 | 101.7 | 101.6 | 101.3 |
| Refrigerating capacity ratio (relative to R404A) | | 106.2 | 107.7 | 109.6 | 110.8 | 112.3 | 113.8 | 114.5 | 121.7 |
| ASHRAE flammability classification | | Class 2L | Class 2L | Class 2L | Class 2 | Class 2 | Class 2 | Class 2 | Class 2 |

Test Example 2-4

The GWP of each mixed refrigerant shown in Examples 2-19 to 2-24, Comparative Examples 2-28 to 2-36, and Reference Example 2-4 (R404A) was evaluated based on the values in the IPCC fourth report.

The COP, refrigerating capacity, discharge temperature, saturation pressure at a saturation temperature of 40° C., condensation pressure, and evaporation pressure of each of the mixed refrigerants were determined by performing refrigeration cycle theoretical calculations for the mixed refrigerants using NIST and Refprop 10.0 under the following conditions.

Evaporation temperature: −80° C.
Condensation temperature: 40° C.
Superheating temperature: 20 K
Supercooling temperature: 0 K
Compressor efficiency: 70%

The definitions of the terms are the same as those in Test Example 2-1.

Table 9 shows the results of Test Example 2-4. Table 9 shows Examples and Comparative Examples with regard to a Refrigerant 2 of the present disclosure. In Table 9, the definitions of the terms are the same as those in Test Example 2-1.

The coefficient of performance (COP) and the compression ratio were determined as in Test Example 2-1.

The flammability of the mixed refrigerant was evaluated as in Test Example 2-1. The burning rate test was performed as in Test Example 2-1.

The flammable range of the mixed refrigerant was measured in the same manner and under the same conditions as in Test Example 2-1 by using a measurement device according to ASTM E681-09 (see FIG. 1).

TABLE 9

| | Item | Unit | Reference Example 2-4 (R404A) | Comp. Ex. 2-28 | Comp. Ex. 2-29 | Example 2-19 | Example 2-20 | Example 2-21 | Example 2-22 | Example 2-23 |
|---|---|---|---|---|---|---|---|---|---|---|
| Composition ratio | HFO-1132 (E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 136.7 | 146.0 | 157.7 | 158.1 | 158.8 | 160.4 | 162.1 | 163.9 |
| Saturation pressure (40° C.) | | MPa | 1.822 | 1.592 | 1.745 | 1.752 | 1.764 | 1.788 | 1.817 | 1.844 |
| Evaporation pressure | | MPa | 0.014 | 0.011 | 0.012 | 0.012 | 0.012 | 0.012 | 0.013 | 0.013 |
| Compression ratio | | — | 134.6 | 149.1 | 150.8 | 150.2 | 149.3 | 147.2 | 145.0 | 142.8 |
| COP ratio (relative to R404A) | | % | 100 | 112.6 | 110.3 | 110.3 | 110.4 | 110.6 | 110.8 | 111.0 |
| Refrigerating capacity ratio (relative to R404A) | | % | 100 | 91.7 | 99.3 | 100.2 | 101.5 | 104.4 | 107.8 | 111.3 |
| ASHRAE flammability classification | | — | Class 1 | Class 2L | Class 2L | Class 2L | Class 2L | Class 2L | Class 2L | Class 2L |

TABLE 9-continued

| Item | | Example 2-24 | Comp. Ex. 2-30 | Comp. Ex. 2-31 | Comp. Ex. 2-32 | Comp. Ex. 2-33 | Comp. Ex. 2-34 | Comp. Ex. 2-35 | Comp. Ex. 2-36 |
|---|---|---|---|---|---|---|---|---|---|
| Composition ratio | HFO-1132(E) | 49.2 | 51.0 | 53.5 | 55.0 | 57.0 | 59.0 | 60.0 | 70.0 |
| | HFO-1234yf | 50.8 | 49.0 | 46.5 | 45.0 | 43.0 | 41.0 | 40.0 | 30.0 |
| | HFC-134a | 0 | 0 | 0 | 0 | 0 | 0 | 0 | 0 |
| | HFC-143a | 0 | 0 | 0 | 0 | 0 | 0 | 0 | 0 |
| | HFC-125 | 0 | 0 | 0 | 0 | 0 | 0 | 0 | 0 |
| GWP (AR4) | | 7 | 7 | 7 | 7 | 7 | 8 | 8 | 8 |
| Discharge temperature | | 165.8 | 167.4 | 169.6 | 170.9 | 172.6 | 174.3 | 175.2 | 184.0 |
| Saturation pressure (40° C.) | | 1.874 | 1.898 | 1.931 | 1.950 | 1.975 | 2.000 | 2.012 | 2.128 |
| Evaporation pressure | | 0.013 | 0.014 | 0.014 | 0.014 | 0.015 | 0.015 | 0.015 | 0.017 |
| Compression ratio | | 140.5 | 138.7 | 136.3 | 134.9 | 133.2 | 131.5 | 130.7 | 123.8 |
| COP ratio (relative to R404A) | | 111.3 | 111.4 | 111.7 | 111.9 | 112.1 | 112.3 | 112.4 | 113.5 |
| Refrigerating capacity ratio (relative to R404A) | | 115.1 | 118.2 | 122.5 | 125.2 | 128.6 | 132.1 | 133.8 | 151.0 |
| ASHRAE flammability classification | | Class 2L | Class 2L | Class 2L | Class 2 | Class 2 | Class 2 | Class 2 | Class 2 |

Test Example 2-5

The GWP of each mixed refrigerant shown in Examples 2-25 to 2-30, Comparative Examples 2-37 to 2-45, and Reference Example 2-5 (R404A) was evaluated based on the values in the IPCC fourth report.

The COP, refrigerating capacity, discharge temperature, saturation pressure at a saturation temperature of 40° C., condensation pressure, and evaporation pressure of each of the mixed refrigerants were determined by performing refrigeration cycle theoretical calculations for the mixed refrigerants by using NIST and Refprop 10.0 under the following conditions.

Evaporation temperature: 10° C.
Condensation temperature: 40° C.
Superheating temperature: 20 K
Supercooling temperature: 0 K
Compressor efficiency: 70%

The definitions of the terms are the same as those in Test Example 2-1.

Table 10 shows the results of Test Example 2-5. Table 10 shows Examples and Comparative Examples with regard to a Refrigerant 2 of the present disclosure. In Table 10, the definitions of the terms are the same as those in Test Example 2-1.

The coefficient of performance (COP) and the compression ratio were determined as in Test Example 2-1.

The flammability of the mixed refrigerant was evaluated as in Test Example 2-1. The burning rate test was performed as in Test Example 2-1.

The flammable range of the mixed refrigerant was measured in the same manner and under the same conditions as in Test Example 2-1 by using a measurement device according to ASTM E681-09 (see FIG. 1).

TABLE 10

| Item | | Unit | Reference Example 2-5 (R404A) | Comp. Ex. 2-37 | Comp. Ex. 2-38 | Example 2-25 | Example 2-26 | Example 2-27 | Example 2-28 | Example 2-29 |
|---|---|---|---|---|---|---|---|---|---|---|
| Composition ratio | HFO-1132(E) | mass % | 0 | 30.0 | 40.0 | 40.5 | 41.3 | 43.0 | 45.0 | 47.0 |
| | HFO-1234yf | mass % | 0 | 70.0 | 60.0 | 59.5 | 58.7 | 57.0 | 55.0 | 53.0 |
| | HFC-134a | mass % | 4.0 | 0 | 0 | 0 | 0 | 0 | 0 | 0 |
| | HFC-143a | mass % | 52.0 | 0 | 0 | 0 | 0 | 0 | 0 | 0 |
| | HFC-125 | mass % | 44.0 | 0 | 0 | 0 | 0 | 0 | 0 | 0 |
| GWP (AR4) | | — | 3922 | 6 | 6 | 6 | 6 | 7 | 7 | 7 |
| Discharge temperature | | ° C. | 68.5 | 72.4 | 74.0 | 74.1 | 74.2 | 74.4 | 74.7 | 74.9 |
| Saturation pressure (40° C.) | | MPa | 1.822 | 1.592 | 1.745 | 1.752 | 1.764 | 1.788 | 1.817 | 1.844 |
| Evaporation pressure | | MPa | 0.820 | 0.694 | 0.768 | 0.772 | 0.777 | 0.789 | 0.803 | 0.817 |
| Compression ratio | | — | 2.2 | 2.3 | 2.3 | 2.3 | 2.3 | 2.3 | 2.3 | 2.3 |
| COP ratio (relative to R404A) | | % | 100.0 | 103.1 | 101.9 | 101.8 | 101.7 | 101.5 | 101.3 | 101.1 |
| Refrigerating capacity ratio (relative to R404A) | | % | 100.0 | 91.2 | 98.9 | 99.3 | 99.8 | 101.0 | 102.5 | 103.8 |
| ASHRAE flammability classification | | — | Class 1 | Class 2L | Class 2L | Class 2L | Class 2L | Class 2L | Class 2L | Class 2L |

| Item | | Example 2-30 | Comp. Ex. 2-39 | Comp. Ex. 2-40 | Comp. Ex. 2-41 | Comp. Ex. 2-42 | Comp. Ex. 2-43 | Comp. Ex. 2-44 | Comp. Ex. 2-45 |
|---|---|---|---|---|---|---|---|---|---|
| Composition ratio | HFO-1132(E) | 49.2 | 51.0 | 53.5 | 55.0 | 57.0 | 59.0 | 60.0 | 70.0 |
| | HFO-1234yf | 50.8 | 49.0 | 46.5 | 45.0 | 43.0 | 41.0 | 40.0 | 30.0 |
| | HFC-134a | 0 | 0 | 0 | 0 | 0 | 0 | 0 | 0 |
| | HFC-143a | 0 | 0 | 0 | 0 | 0 | 0 | 0 | 0 |
| | HFC-125 | 0 | 0 | 0 | 0 | 0 | 0 | 0 | 0 |

TABLE 10-continued

|  |  |  |  |  |  |  |  |  |
|---|---|---|---|---|---|---|---|---|
| GWP (AR4) | 7 | 7 | 7 | 7 | 7 | 8 | 8 | 8 |
| Discharge temperature | 75.2 | 75.5 | 75.8 | 76.0 | 76.2 | 76.5 | 76.6 | 77.9 |
| Saturation pressure (40° C.) | 1.874 | 1.898 | 1.931 | 1.950 | 1.975 | 2.000 | 2.012 | 2.128 |
| Evaporation pressure | 0.832 | 0.844 | 0.860 | 0.870 | 0.882 | 0.895 | 0.901 | 0.959 |
| Compression ratio | 2.3 | 2.2 | 2.2 | 2.2 | 2.2 | 2.2 | 2.2 | 2.2 |
| COP ratio (relative to R404A) | 100.9 | 100.8 | 100.6 | 100.4 | 100.3 | 100.1 | 100.1 | 99.5 |
| Refrigerating capacity ratio (relative to R404A) | 105.3 | 106.5 | 108.2 | 109.1 | 110.4 | 111.6 | 112.3 | 118.2 |
| ASHRAE flammability classification | Class 2L | Class 2L | Class 2L | Class 2 | Class 2 | Class 2 | Class 2 | Class 2 |

Test Example 3

The GWP of each mixed refrigerant shown in Examples 3-1 to 3-5, Comparative Examples 3-1 to 3-5, and Reference Examples 3-1(R134a) and 3-2 (R404A) was evaluated based on the values in the IPCC fourth report.

The COP, refrigerating capacity, discharge temperature, saturation pressure at a saturation temperature of 45° C., condensation pressure, and evaporation pressure of each of the mixed refrigerants were determined by performing refrigeration cycle theoretical calculations for the mixed refrigerants by using the National Institute of Science and Technology (NIST) and Reference Fluid Thermodynamic and Transport Properties Database (Refprop 10.0) under the following conditions.

Evaporation temperature: −10° C.
Condensation temperature: 45° C.
Superheating temperature: 20 K
Supercooling temperature: 0 K
Compressor efficiency: 70%

The "evaporation temperature of −10° C." means that the evaporation temperature of the mixed refrigerant in the evaporator provided in the refrigeration apparatus is −10° C. Further, the "condensation temperature of 45° C." means that the condensation temperature of the mixed refrigerant in the condenser provided in the refrigeration apparatus is 45° C.

Table 11 shows the results of Test Example 3. Table 11 shows Examples and Comparative Examples with regard to a refrigerant 3 of the present disclosure. In Table 11, the "COP ratio" and the "refrigerating capacity ratio" refer to a ratio (%) relative to R134a. In Table 11, the "saturation pressure (45° C.)" refers to a saturation pressure at a saturation temperature of 45° C. In Table 11, the "discharge temperature (° C.)" refers to a temperature at which the refrigerant has the highest temperature in the refrigeration cycle according to the refrigeration cycle theoretical calculations of the mixed refrigerant.

The coefficient of performance (COP) was calculated according to the following equation.

COP=(refrigerating capacity or heating capacity)/
amount of electrical power consumed The critical temperature was determined by performing calculations using the National Institute of Science and Technology (NIST) and Reference Fluid Thermodynamic and Transport Properties Database (Refprop 10.0).

The flammability of the mixed refrigerant was determined by specifying the fractionation of the mixed refrigerant to the WCF concentration and measuring the burning rate according to ANSI/ASHRAE Standard 34-2013. The one with a burning rate of 0 cm/s to 10 cm/s was classified as Class 2L (slightly flammable), the one with a burning rate of more than 10 cm/s was classified as Class 2 (weakly flammable), and the one with no flame propagation was classified as Class 1 (non-flammable). In Table 11, the ASHRAE flammability classification shows the results based on these criteria.

The burning rate test was performed as follows. First, a mixed refrigerant having a purity of 99.5% or more was used, and the mixed refrigerant was deaerated by repeating a cycle of freezing, pumping, and thawing until no trace of air was observed on the vacuum gauge. The burning rate was measured by a closed method. The initial temperature was the ambient temperature. The ignition was performed by generating electrical spark between the electrodes in the center of the sample cell. The duration of the discharge was 1.0 to 9.9 ms, and the ignition energy was typically about 0.1 to 1.0 J. The spread of the flame was visualized by using a schlieren photograph. A cylindrical container (inner diameter: 155 mm, length: 198 mm) having two acrylic windows that transmit light was used as a sample cell, and a xenon lamp was used as a light source. The schlieren image of the flame was recorded using a high-speed digital video camera at a frame speed of 600 fps, and stored in a PC.

The flammable range of the mixed refrigerant was measured using a measurement device according to ASTM E681-09 (see FIG. 1).

More specifically, a 12-L spherical glass flask was used so that the combustion state could be visually observed and photographically recorded. When excessive pressure was generated by combustion in the glass flask, gas was allowed to escape from the upper lid. Ignition was achieved by electric discharge from electrodes disposed at one-third the distance from the bottom.

Test Conditions
Test vessel: 280 mm φ spherical (internal volume: 12 liters)
Test temperature: 60° C.±3° C.
Pressure: 101.3 kPa±0.7 kPa
Water: 0.0088 g±0.0005 g (water content at a relative humidity of 50% at 23° C.) per gram of dry air
Mixing ratio of refrigerant composition/air: 1 vol. % increments±0.2 vol. %
Mixture of refrigerant composition: ±0.1 mass %
Ignition method: AC discharge, voltage: 15 kV, electric current: 30 mA, neon transformer
Electrode spacing: 6.4 mm (¼ inch)
Spark: 0.4 seconds±0.05 seconds
Evaluation Criteria:
When the flame spreads at an angle of more than 90° from the ignition point, it was evaluated that flame propagation was present (flammable).
When the flame spreads at an angle of 90° or less from the ignition point, it was evaluated that flame propagation was absent (non-flammable).

TABLE 11

| Item | | Unit | Reference Example 3-1 (R134a) | Comp. Ex. 3-1 | Comp. Ex. 3-2 | Example 3-1 | Example 3-2 | Example 3-3 |
|---|---|---|---|---|---|---|---|---|
| Composition ratio | HFO-1132 (E) | mass % | 0 | 20.0 | 30.0 | 31.1 | 33.0 | 35.0 |
| | HFO-1234yf | mass % | 0 | 80.0 | 70.0 | 68.9 | 67.0 | 65.0 |
| | HFC-134a | mass % | 100.0 | 0 | 0 | 0 | 0 | 0 |
| | HFC-143a | mass % | 0 | 0 | 0 | 0 | 0 | 0 |
| | HFC-125 | mass % | 0 | 0 | 0 | 0 | 0 | 0 |
| GWP (AR4) | | — | 1430 | 5 | 6 | 6 | 6 | 6 |
| Discharge temperature | | °C. | 86.9 | 86.3 | 86.9 | 87.2 | 87.9 | 88.5 |
| Saturation pressure (45° C.) | | MPa | 1.160 | 1.607 | 1.795 | 1.814 | 1.848 | 1.883 |
| Evaporation pressure | | MPa | 0.201 | 0.311 | 0.355 | 0.360 | 0.368 | 0.376 |
| Critical temperature | | °C. | 101.1 | 84.6 | 83.0 | 82.7 | 82.2 | 81.7 |
| COP ratio (relative to R134a) | | % | 100.0 | 93.6 | 92.7 | 92.6 | 92.4 | 92.2 |
| Refrigerating capacity ratio (relative to R134a) | | % | 100.0 | 132.3 | 148.3 | 150.0 | 152.8 | 155.8 |
| ASHRAE flammability classification | | — | Class 1 | Class 2L | Class 2L | Class 2L | Class 2L | Class 2L |

| Item | | Example 3-4 | Example 3-5 | Comp. Ex. 3-3 | Comp. Ex. 3-4 | Comp. Ex. 3-5 | Reference Example 3-2 (R404A) |
|---|---|---|---|---|---|---|---|
| Composition ratio | HFO-1132 (E) | 37.9 | 39.8 | 40.0 | 50.0 | 0.0 | 0 |
| | HFO-1234yf | 62.1 | 60.2 | 60.0 | 50.0 | 100.0 | 0 |
| | HFC-134a | 0 | 0 | 0 | 0 | 0 | 4.0 |
| | HFC-143a | 0 | 0 | 0 | 0 | 0 | 52.0 |
| | HFC-125 | 0 | 0 | 0 | 0 | 0 | 44.0 |
| GWP (AR4) | | 6 | 6 | 6 | 7 | 4 | 3922 |
| Discharge temperature | | 89.4 | 90.0 | 90.1 | 93.0 | 72.2 | 81.7 |
| Saturation pressure (45° C.) | | 1.930 | 1.963 | 1.966 | 2.123 | 1.154 | 2.052 |
| Evaporation pressure | | 0.388 | 0.397 | 0.397 | 0.437 | 0.222 | 0.434 |
| Critical temperature | | 81.0 | 80.5 | 80.5 | 78.7 | 94.7 | 72.0 |
| COP ratio (relative to R134a) | | 92.0 | 91.8 | 91.8 | 91.0 | 95.7 | 88.6 |
| Refrigerating capacity ratio (relative to R134a) | | 159.8 | 162.7 | 162.9 | 176.6 | 96.2 | 164.4 |
| ASHRAE flammability classification | | Class 2L | Class 2L | Class 2L | Class 2L | Class 2L | Class 1 |

Test Example 4

The GWP of each mixed refrigerant shown in Examples 4-1 to 4-7 and Comparative Examples 4-1 to 4-5 was evaluated based on the values in the IPCC fourth report.

The COP, refrigerating capacity, discharge temperature, and saturation pressure at a saturation temperature of −10° C. of each of the mixed refrigerants were determined by performing refrigeration cycle theoretical calculations for the mixed refrigerants using the National Institute of Science and Technology (NIST) and Reference Fluid Thermodynamic and Transport Properties Database (Refprop 10.0) under the following conditions.
Evaporation temperature: 5° C.
Condensation temperature: 45° C.
Superheating temperature: 5 K
Supercooling temperature: 5 K
Compressor efficiency: 70%

The "evaporation temperature of 5° C." means that the evaporation temperature of the mixed refrigerant in the evaporator provided in the refrigeration apparatus is 5° C. Further, the "condensation temperature of 45° C." means that the condensation temperature of the mixed refrigerant in the condenser provided in the refrigeration apparatus is 45° C.

Table 12 shows the results of Test Example 4. Table 12 shows Examples and Comparative Examples with regard to a refrigerant 4 of the present disclosure. In Table 12, the "COP ratio" and the "refrigerating capacity ratio" refer to a ratio (%) relative to R1234yf. In Table 12, the "saturation pressure (−10° C.)" refers to a saturation pressure at a saturation temperature of −10° C., which is a typical value of the evaporation temperature in the refrigeration condition. In Table 12, the "discharge temperature (° C.)" refers to a temperature at which the refrigerant has the highest temperature in the refrigeration cycle theoretical calculations of the mixed refrigerant.

The coefficient of performance (COP) was calculated according to the following equation.

COP=(refrigerating capacity or heating capacity)/
amount of electrical power consumed The critical temperature was determined by performing calculations using the National Institute of Science and Technology (NIST) and Reference Fluid Thermodynamic and Transport Properties Database (Refprop 10.0).

The flammability of the mixed refrigerant was determined by specifying the fractionation of the mixed refrigerant to the WCF concentration and measuring the burning rate according to ANSI/ASHRAE Standard 34-2013. The one with a burning rate of 0 cm/s to 10 cm/s was classified as Class 2L (slightly flammable), the one with a burning rate of more than 10 cm/s was classified as Class 2 (weakly flammable), and the one with no flame propagation was classified as Class 1 (non-flammable). In Table 12, the ASHRAE flammability classification shows the results based on these criteria.

The burning rate test was performed as follows. First, a mixed refrigerant having a purity of 99.5% or more was used, and the mixed refrigerant was deaerated by repeating a cycle of freezing, pumping, and thawing until no trace of air was observed on the vacuum gauge. The burning rate was measured by a closed method. The initial temperature was the ambient temperature. The ignition was performed by generating an electrical spark between the electrodes in the center of the sample cell. The duration of the discharge was 1.0 to 9.9 ms, and the ignition energy was typically about 0.1 to 1.0 J. The spread of the flame was visualized by using a schlieren photograph. A cylindrical container (inner diameter: 155 mm, length: 198 mm) having two acrylic windows that transmit light was used as a sample cell, and a xenon lamp was used as a light source. The schlieren image of the flame was recorded using a high-speed digital video camera at a frame speed of 600 fps, and stored in a PC.

The flammable range of the mixed refrigerant was measured using a measurement device according to ASTM E681-09 (see FIG. 1).

More specifically, a 12-L spherical glass flask was used so that the combustion state could be visually observed and photographically recorded. When excessive pressure was generated by combustion in the glass flask, gas was allowed to escape from the upper lid. Ignition was achieved by electric discharge from electrodes disposed at one-third the distance from the bottom.

Test Conditions

Test vessel: 280 mm φ spherical (internal volume: 12 liters)
Test temperature: 60° C.±3° C.
Pressure: 101.3 kPa±0.7 kPa
Water: 0.0088 g±0.0005 g (water content at a relative humidity of 50% at 23° C.) per gram of dry air
Mixing ratio of refrigerant composition/air: 1 vol. % increments±0.2 vol. %
Mixture of refrigerant composition: ±0.1 mass %
Ignition method: AC discharge, voltage: 15 kV, electric current: 30 mA, neon transformer
Electrode spacing: 6.4 mm (¼ inch)
Spark: 0.4 seconds±0.05 seconds
Evaluation Criteria:

When the flame spread at an angle of more than 90° from the ignition point, it was evaluated that flame propagation was present (flammable).

When the flame spread at an angle of 90° or less from the ignition point, it was evaluated that flame propagation was absent (non-flammable).

TABLE 12

| Item | | Unit | Comparative Example 4-1 | Comparative Example 4-2 | Example 4-1 | Example 4-2 | Example 4-3 | Example 4-4 |
|---|---|---|---|---|---|---|---|---|
| Composition | HFO-1132 (E) | mass % | 0 | 15.0 | 21.0 | 23.6 | 24.3 | 25.1 |
| ratio | HFO-1234yf | mass % | 100.0 | 85.0 | 79.0 | 76.4 | 75.7 | 74.9 |
| GWP (AR4) | | — | 4 | 5 | 5 | 5 | 5 | 6 |
| Discharge temperature | | ° C. | 54.4 | 61.3 | 63.1 | 63.8 | 64.0 | 64.2 |
| Saturation pressure (−10° C.) | | MPa | 0.222 | 0.350 | 0.383 | 0.396 | 0.400 | 0.403 |
| Critical temperature | | ° C. | 94.7 | 88.1 | 85.9 | 85.0 | 84.8 | 84.5 |
| COP ratio (relative to R1234yf) | | % | 100.0 | 99.1 | 98.8 | 98.6 | 98.5 | 98.4 |
| Refrigerating capacity ratio (relative to R1234yf) | | % | 100.0 | 129.8 | 140.0 | 144.2 | 145.4 | 146.6 |
| ASHRAE flammability classification | | — | Class 2L | Class 2L | Class 2L | Class 2L | Class 2L | Class 2L |

| Item | | Example 4-5 | Example 4-6 | Example 4-7 | Comparative Example 4-3 | Comparative Example 4-4 | Comparative Example 4-5 |
|---|---|---|---|---|---|---|---|
| Composition | HFO-1132 (E) | 26.7 | 27.5 | 28.4 | 30.0 | 40.0 | 50.0 |
| ratio | HFO-1234yf | 73.3 | 72.5 | 71.6 | 70.0 | 60.0 | 50.0 |
| GWP (AR4) | | 6 | 6 | 6 | 6 | 6 | 7 |
| Discharge temperature | | 64.6 | 64.8 | 65.0 | 65.4 | 67.5 | 69.4 |
| Saturation pressure (−10° C.) | | 0.411 | 0.414 | 0.418 | 0.425 | 0.461 | 0.492 |
| Critical temperature | | 84.0 | 83.8 | 83.5 | 83.0 | 80.5 | 78.7 |
| COP ratio (relative to R1234yf) | | 98.3 | 98.2 | 98.2 | 98.0 | 97.2 | 96.6 |
| Refrigerating capacity ratio (relative to R1234yf) | | 149.1 | 150.3 | 151.7 | 154.1 | 168.2 | 181.3 |
| ASHRAE flammability classification | | Class 2L | Class 2L | Class 2L | Class 2L | Class 2L | Class 2L |

Test Example 5

The GWP of each mixed refrigerant shown in Examples 5-1 to 5-13, Comparative Examples 5-1 to 5-3, and Reference Example 5-1 (R134a) was evaluated based on the values in the IPCC fourth report.

The COP, refrigerating capacity, boiling point, and discharge temperature of each of the mixed refrigerants were determined by performing refrigeration cycle theoretical calculations for the mixed refrigerants using the National Institute of Science and Technology (NIST) and Reference Fluid Thermodynamic and Transport Properties Database (Refprop 10.0) under the following conditions.

Evaporation temperature: −30° C.
Condensation temperature: 30° C.
Superheating temperature: 5 K
Supercooling temperature: 5 K
Compressor efficiency: 70%

The "evaporation temperature of −30° C." means that the evaporation temperature of the mixed refrigerant in the evaporator provided in the refrigeration apparatus is −30° C. Further, the "condensation temperature of 30° C." means that the condensation temperature of the mixed refrigerant in the condenser provided in the refrigeration apparatus is 30° C.

Table 13 shows the results of Test Example 5. Table 13 shows Examples and Comparative Examples with regard to a refrigerant 5 of the present disclosure. In Table 13, the "COP ratio" and the "refrigerating capacity ratio" refer to a ratio (%) relative to R1234yf. In Table 13, the "discharge temperature (° C.)" refers to a temperature at which the refrigerant has the highest temperature in the refrigeration cycle theoretical calculations of the mixed refrigerant. In Table 13, the "boiling point (° C.)" means a temperature at which the liquid phase of the mixed refrigerant has atmospheric pressure (101.33 kPa). In Table 13, the "motor power consumption amount (%)" refers to electrical energy used to enable an electric car to run, and is expressed as a ratio with respect to a power consumption amount when the refrigerant is HFO-1234yf. In Table 13, the "heater power consumption amount (%)" refers to electrical energy used to enable a heater to be driven, and is expressed as a ratio with respect to a power consumption amount when the refrigerant is HFO-1234yf. In Table 13, the "drivable distance" refers to a distance drivable by an electric car equipped with a rechargeable battery having a constant electric capacity while having a heater turned on, and is expressed as a ratio (%) relative to a drivable distance (100%) when the car is driven without a heater turned on (i.e., heater power consumption is 0).

The coefficient of performance (COP) was calculated according to the following equation.

COP=(refrigerating capacity or heating capacity)/ amount of electrical power consumed The flammability of the mixed refrigerant was determined by specifying the fractionation of the mixed refrigerant to the WCF concentration and measuring the burning rate according to ANSI/ASHRAE Standard 34-2013. The burning rate was measured as follows. First, a mixed refrigerant having a purity of 99.5% or more was used, and the mixed refrigerant was deaerated by repeating a cycle of freezing, pumping, and thawing until no trace of air was observed on the vacuum gauge. The burning rate was measured by a closed method. The initial temperature was the ambient temperature. The ignition was performed by generating an electrical spark between the electrodes in the center of the sample cell. The duration of the discharge was 1.0 to 9.9 ms, and the ignition energy was typically about 0.1 to 1.0 J. The spread of the flame was visualized by using a schlieren photograph. A cylindrical container (inner diameter: 155 mm, length: 198 mm) having two acrylic windows that transmit light was used as a sample cell, and a xenon lamp was used as a light source. The schlieren image of the flame was recorded using a high-speed digital video camera at a frame speed of 600 fps, and stored in a PC.

Heating was performed by using an electrical heater in the case of a refrigerant having a boiling point of more than −40° C., and using a heat pump in the case of a refrigerant having a boiling point of −40° C. or less.

The power consumption amount when the heater was used was calculated according to the following equation.

Power consumption amount when the heater was used=heating capacity/COP of heater The COP of the heater refers to heating efficiency.

With regard to the heating efficiency, the COP of the heater is 1 in an electric heater, and the heater consumes an electrode equivalent to the motor power. That is, the power consumption of the heater is E=E/(1+COP). In the case of a heat pump, the COP of the heater was determined by performing refrigeration cycle theoretical calculations for the mixed refrigerants using the National Institute of Science and Technology (NIST) and Reference Fluid Thermodynamic and Transport Properties Database (Refprop 10.0) under the following conditions.

Evaporation temperature: −30° C.
Condensation temperature: 30° C.
Superheating temperature: 5 K
Supercooling temperature: 5 K
Compressor efficiency: 70%

The drivable distance was calculated according to the following equation.

Drivable distance=(battery capacity)/(motor power consumption amount+heater power consumption amount)

TABLE 13

| Item | | Unit | Reference Example 5-1 | Comp. Ex. 5-1 | Comp. Ex. 5-2 | Example 5-1 | Example 5-2 | Example 5-3 | Example 5-4 | Example 5-5 | Example 5-6 |
|---|---|---|---|---|---|---|---|---|---|---|---|
| Composition ratio | HFO-1132 (E) | mass % | 0.0 | 0 | 10.0 | 12.1 | 15.0 | 20.0 | 25.0 | 30.0 | 35.0 |
| | HFO-1234yf | mass % | 0.0 | 100.0 | 90.0 | 87.9 | 85.0 | 80.0 | 75.0 | 70.0 | 65.0 |
| | HFC-134a | mass % | 100.0 | 0.0 | 0.0 | 0.0 | 0.0 | 0.0 | 0.0 | 0.0 | 0.0 |
| GWP (AR4) | | — | 1430 | 4 | 5 | 5 | 5 | 5 | 6 | 6 | 6 |
| COP ratio (relative to R1234yf) | | % | 105 | 100 | 100 | 100 | 100 | 100 | 100 | 100 | 100 |
| Refrigerating capacity ratio (relative to 1234yf) | | % | 99 | 100 | 123 | 128 | 134 | 145 | 155 | 165 | 175 |
| Motor power consumption amount | | % | 100 | 100 | 100 | 100 | 100 | 100 | 100 | 100 | 100 |
| Heater power consumption amount | | % | 95 | 100 | 100 | 33 | 33 | 33 | 33 | 33 | 33 |
| Drivable distance (without heater) | | % | 100 | 100 | 100 | 100 | 100 | 100 | 100 | 100 | 100 |
| Drivable distance (with heater) | | % | 50 | 50 | 50 | 84 | 84 | 84 | 84 | 84 | 84 |
| Discharge temperature | | ° C. | 66.0 | 48.0 | 54.8 | 56.0 | 57.5 | 59.8 | 61.9 | 63.9 | 65.8 |
| Combustion rate | | cm/s | 0.0 | 1.5 | 1.5 | 1.5 | 1.5 | 1.5 | 1.5 | 1.5 | 2.0 |

TABLE 13-continued

| | | | | | | | | | | |
|---|---|---|---|---|---|---|---|---|---|---|
| Boiling point | °C | -26.1 | -29.5 | -38.8 | -40.0 | -41.4 | -43.3 | -44.7 | -45.9 | -46.9 |
| Saturation pressure at -40° C. | kPaG | -50.1 | -39 | -4.4 | 0.9 | 7.5 | 17.2 | 25.3 | 32.3 | 38.4 |
| Heating method | System | Electric heater | Electric heater | Electric heater | Heat pump | Heat pump | Heat pump | Heat pump | Heat pump | Heat pump |

| | Item | Example 5-7 | Example 5-8 | Example 5-9 | Example 5-10 | Example 5-11 | Example 5-12 | Example 5-13 | Comp. Ex. 5-3 |
|---|---|---|---|---|---|---|---|---|---|
| Composition ratio | HFO-1132 (E) | 40.0 | 45.0 | 50.0 | 55.0 | 60.0 | 65.0 | 72.0 | 75.0 |
| | HFO-1234yf | 60.0 | 55.0 | 50.0 | 45.0 | 40.0 | 35.0 | 28.0 | 25.0 |
| | HFC-134a | 0.0 | 0.0 | 0.0 | 0.0 | 0.0 | 0.0 | 0.0 | 0.0 |
| GWP (AR4) | | 6 | 7 | 7 | 7 | 8 | 8 | 8 | 9 |
| COP ratio (relative to R1234yf) | | 100 | 100 | 100 | 100 | 100 | 100 | 100 | 100 |
| Refrigerating capacity ratio (relative to 1234yf) | | 185 | 194 | 203 | 212 | 220 | 229 | 240 | 245 |
| Motor power consumption amount | | 100 | 100 | 100 | 100 | 100 | 100 | 100 | 100 |
| Heater power consumption amount | | 33 | 33 | 33 | 33 | 33 | 33 | 33 | 33 |
| Drivable distance (without heater) | | 100 | 100 | 100 | 100 | 100 | 100 | 100 | 100 |
| Drivable distance (with heater) | | 84 | 84 | 84 | 84 | 84 | 84 | 84 | 84 |
| Discharge temperature | | 67.6 | 69.3 | 70.9 | 72.6 | 74.2 | 75.9 | 78.2 | 79.2 |
| Combustion rate | | 2.6 | 3.4 | 4.3 | 5.3 | 6.5 | 7.8 | 9.9 | 10.9 |
| Boiling point | | -47.7 | -48.4 | -49.1 | -49.6 | -50.2 | -50.5 | -51.2 | -51.4 |
| Saturation pressure at -40° C. | | 43.9 | 48.8 | 53.4 | 57.5 | 61.4 | 65.0 | 69.6 | 71.5 |
| Heating method | | Heat pump | Heat pump | Heat pump | Heat pump | Heat pump | Heat pump | Heat pump | Heat pump |

REFERENCE NUMERALS

1: Supply Line
2: Sampling Line
3: Thermometer
4: Pressure Gauge
5: Electrode
6: Stirring Blade (produced by PTFE)

The invention claimed is:

1. A refrigeration method comprising operating a refrigeration cycle using a composition comprising a refrigerant, said method comprising operating equipment designed for R1234yf with a refrigerant comprising trans-1,2-difluoroethylene (HFO-1132 (E)) and 2,3,3,3-tetrafluoropropene (HFO-1234yf),
wherein the refrigerant comprises HFO-1132 (E) and HFO-1234yf in such amounts that the sum of HFO-1132 (E) and HFO-1234yf is 99.7 mass % or more,
wherein HFO-1132 (E) is present in an amount of 12.1 to 72.0 mass %, and HFO-1234yf is present in an amount of 87.9 to 28.0 mass %, based on the total mass of HFO-1132 (E) and HFO-1234yf, and
wherein the refrigerant is an alternative refrigerant for R1234yf.

2. A refrigeration method comprising operating an air-conditioning system incorporated into a vehicle using a composition comprising a refrigerant,
the refrigerant comprising trans-1,2-difluoroethylene (HFO-1132 (E)) and 2,3,3,3-tetrafluoropropene (HFO-1234yf),
wherein the refrigerant comprises HFO-1132 (E) and HFO-1234yf in such amounts that the sum of HFO-1132 (E) and HFO-1234yf is 99.7 mass % or more,
wherein HFO-1132 (E) is present in an amount of 12.1 to 72.0 mass %, and HFO-1234yf is present in an amount of 87.9 to 28.0 mass %, based on the total mass of HFO-1132 (E) and HFO-1234yf,
wherein the vehicle is a gasoline vehicle, a hybrid vehicle, a plug-in hybrid vehicle, an electric vehicle, a hydrogen vehicle, or a fuel cell vehicle, and
wherein the refrigerant is an alternative refrigerant for R1234yf.

3. The refrigeration method according to claim 2, wherein the vehicle is an electric vehicle.

4. A refrigeration apparatus comprising a composition comprising a refrigerant as a working fluid,
the refrigerant comprising trans-1,2-difluoroethylene (HFO-1132 (E)) and 2,3,3,3-tetrafluoropropene (HFO-1234yf), and an additional refrigerant,
wherein the refrigerant comprises HFO-1132 (E) and HFO-1234yf in such amounts that the sum of HFO-1132 (E) and HFO-1234yf is 99.7 mass % or more,
wherein HFO-1132 (E) is present in an amount of 12.1 to 72.0 mass %, and HFO-1234yf is present in an amount of 87.9 to 28.0 mass %, based on the total mass of HFO-1132 (E) and HFO-1234yf,
wherein the additional refrigerant is present in an amount of 0.3 mass % or less, based on the total amount of HFO-1132 (E), HFO-1234yf, and the additional refrigerant taken as 100 mass %, and
wherein the refrigerant is an alternative refrigerant for R1234yf.

5. The refrigeration apparatus according to claim 4, which is an air-conditioning system, a refrigerator, a freezer, a water cooler, an ice maker, a refrigerated showcase, a freezing showcase, a freezing and refrigerating unit, a refrigerating machine for freezing and refrigerating warehouses, an air-conditioning system for vehicles, a turbo refrigerating machine, or a screw refrigerating machine.

* * * * *